(12) United States Patent
Wenzel et al.

(10) Patent No.: US 12,261,434 B2
(45) Date of Patent: Mar. 25, 2025

(54) CONTROL SYSTEM WITH MULTI-FACTOR CARBON EMISSIONS OPTIMIZATION

(71) Applicant: Johnson Controls Tyco IP Holdings LLP, Milwaukee, WI (US)

(72) Inventors: Michael J. Wenzel, Grafton, WI (US); Mohammad N. Elbsat, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 228 days.

(21) Appl. No.: 17/668,791

(22) Filed: Feb. 10, 2022

(65) Prior Publication Data

US 2023/0253787 A1    Aug. 10, 2023

(51) Int. Cl.
| | | |
|---|---|---|
| *H02J 3/00* | (2006.01) | |
| *F24D 3/00* | (2022.01) | |
| *F25B 27/02* | (2006.01) | |
| *H02J 3/14* | (2006.01) | |
| *H02J 3/46* | (2006.01) | |

(52) U.S. Cl.
CPC ............... *H02J 3/003* (2020.01); *F24D 3/00* (2013.01); *F25B 27/02* (2013.01); *H02J 3/144* (2020.01); *H02J 3/466* (2020.01)

(58) Field of Classification Search
CPC ....... F24D 19/1048; F24D 3/00; G06Q 50/06; H02J 3/466; G05B 2219/2642; G05B 13/042; G05B 13/048
See application file for complete search history.

(56) References Cited

U.S. PATENT DOCUMENTS

| | | |
|---|---|---|
| 5,497,452 A | 3/1996 | Shimizu et al. |
| 6,988,671 B2 | 1/2006 | Deluca |
| 7,025,281 B2 | 4/2006 | Deluca |
| 7,099,895 B2 | 8/2006 | Dempsey |

(Continued)

FOREIGN PATENT DOCUMENTS

| | | |
|---|---|---|
| CA | 2455689 A1 | 7/2005 |
| CA | 2957726 A1 | 3/2016 |

(Continued)

OTHER PUBLICATIONS

Invitation to Pay Additional Fees and, Where Applicable, Protest Fee on PCT Appl. No. PCT/US2022/031438 dated Sep. 2, 2022 (14 pages).

(Continued)

*Primary Examiner* — Vincent H Tran
(74) *Attorney, Agent, or Firm* — Foley & Lardner LLP

(57) ABSTRACT

A system includes a first subsystem configured to produce a resource by consuming electricity, a second subsystem configured to produce the resource by consuming a fuel, and a controller. The controller is configured to determine an allocation of a predicted demand for the resource over a future time period between the first subsystem and the second subsystem based on a first carbon emissions rate associated with off-site production of the electricity and a second carbon emissions rate associated with on-site consumption of the fuel. The controller is also configured to control the first subsystem and the second subsystem to produce the resource in accordance with the allocation during the future time period.

19 Claims, 24 Drawing Sheets

(56) References Cited

U.S. PATENT DOCUMENTS

| | | |
|---|---|---|
| 7,150,408 B2 | 12/2006 | Deluca |
| 7,222,494 B2 | 5/2007 | Peterson et al. |
| 7,311,752 B2 | 12/2007 | Tepper et al. |
| 7,394,370 B2 | 7/2008 | Chan |
| 7,580,775 B2 | 8/2009 | Kulyk et al. |
| 7,788,189 B2 | 8/2010 | Budike, Jr. |
| 7,817,046 B2 | 10/2010 | Coveley et al. |
| 7,894,946 B2 | 2/2011 | Kulyk et al. |
| 7,941,096 B2 | 5/2011 | Perkins et al. |
| 8,049,614 B2 | 11/2011 | Kahn et al. |
| 8,405,503 B2 | 3/2013 | Wong |
| 8,473,080 B2 | 6/2013 | Seem et al. |
| 8,527,108 B2 | 9/2013 | Kulyk et al. |
| 8,527,109 B2 | 9/2013 | Kulyk et al. |
| 8,862,448 B2 | 10/2014 | Holmes et al. |
| 8,867,993 B1 | 10/2014 | Perkins et al. |
| 8,918,223 B2 | 12/2014 | Kulyk et al. |
| 8,984,464 B1 | 3/2015 | Mihal et al. |
| 9,002,532 B2 | 4/2015 | Asmus |
| 9,075,909 B2 | 7/2015 | Almogy et al. |
| 9,110,647 B2 | 8/2015 | Kulyk et al. |
| 9,235,657 B1 | 1/2016 | Wenzel et al. |
| 9,383,736 B2 | 7/2016 | Honda et al. |
| 9,429,923 B2 | 8/2016 | Ward et al. |
| 9,436,179 B1 | 9/2016 | Turney et al. |
| 9,447,985 B2 | 9/2016 | Johnson |
| 9,465,392 B2 | 10/2016 | Bradley et al. |
| 9,547,353 B1 * | 1/2017 | Marr .................... G06F 1/3206 |
| 9,612,601 B2 | 4/2017 | Beyhaghi et al. |
| 9,618,224 B2 | 4/2017 | Emmons et al. |
| 9,696,054 B2 | 7/2017 | Asmus |
| 9,703,339 B2 | 7/2017 | Kulyk et al. |
| 9,741,233 B2 | 8/2017 | Laufer et al. |
| 9,778,639 B2 | 10/2017 | Boettcher et al. |
| 9,810,441 B2 | 11/2017 | Dean-Hendricks et al. |
| 9,852,481 B1 | 12/2017 | Turney et al. |
| 9,915,438 B2 | 3/2018 | Cheatham et al. |
| 9,982,903 B1 | 5/2018 | Ridder et al. |
| 10,007,259 B2 | 6/2018 | Turney et al. |
| 10,068,116 B2 | 9/2018 | Good et al. |
| 10,071,177 B1 | 9/2018 | Kellogg |
| 10,088,814 B2 | 10/2018 | Wenzel et al. |
| 10,101,730 B2 | 10/2018 | Wenzel et al. |
| 10,101,731 B2 | 10/2018 | Asmus et al. |
| 10,139,877 B2 | 11/2018 | Kulyk et al. |
| 10,175,681 B2 | 1/2019 | Wenzel et al. |
| 10,190,789 B2 | 1/2019 | Mueller et al. |
| 10,198,779 B2 | 2/2019 | Pittman et al. |
| 10,251,610 B2 | 4/2019 | Parthasarathy et al. |
| 10,302,318 B1 | 5/2019 | Chambers |
| 10,359,748 B2 | 7/2019 | Elbsat et al. |
| 10,418,833 B2 | 9/2019 | Wenzel et al. |
| 10,444,210 B2 | 10/2019 | Rawat et al. |
| 10,528,020 B2 | 1/2020 | Drees |
| 10,572,230 B2 | 2/2020 | Lucas et al. |
| 10,628,135 B2 | 4/2020 | Sharma et al. |
| 10,678,227 B2 | 6/2020 | Przybylski et al. |
| 10,706,375 B2 | 7/2020 | Wenzel et al. |
| 10,718,542 B2 | 7/2020 | Alanqar et al. |
| 10,871,756 B2 | 12/2020 | Johnson et al. |
| 10,884,398 B2 | 1/2021 | Elbsat et al. |
| 10,908,578 B2 | 2/2021 | Johnson et al. |
| 10,921,768 B2 | 2/2021 | Johnson et al. |
| 10,928,784 B2 | 2/2021 | Craig et al. |
| 10,977,010 B2 | 4/2021 | Sharma et al. |
| 11,068,821 B2 | 7/2021 | Wenzel et al. |
| 11,101,651 B2 | 8/2021 | Pavlak et al. |
| 11,137,163 B2 | 10/2021 | Nasis |
| 11,156,978 B2 | 10/2021 | Johnson et al. |
| 11,164,126 B2 | 11/2021 | Elbsat et al. |
| 11,181,289 B2 | 11/2021 | Federspiel et al. |
| 11,182,714 B2 | 11/2021 | Wenzel et al. |
| 11,193,691 B1 * | 12/2021 | Guyer .................... F24H 15/16 |
| 11,274,842 B2 | 3/2022 | Gamroth et al. |
| 11,436,386 B2 | 9/2022 | Motahar |
| 11,668,481 B2 | 6/2023 | Granger et al. |
| 2002/0165671 A1 | 11/2002 | Middya |
| 2003/0055798 A1 | 3/2003 | Hittle et al. |
| 2004/0011066 A1 | 1/2004 | Sugihara et al. |
| 2006/0271210 A1 | 11/2006 | Subbu et al. |
| 2007/0101688 A1 | 5/2007 | Wootton et al. |
| 2007/0150333 A1 | 6/2007 | Hurst et al. |
| 2007/0202798 A1 | 8/2007 | Billiotte et al. |
| 2007/0203860 A1 | 8/2007 | Golden et al. |
| 2007/0219645 A1 | 9/2007 | Thomas et al. |
| 2008/0206767 A1 | 8/2008 | Kreiswirth et al. |
| 2008/0243273 A1 | 10/2008 | Robert et al. |
| 2009/0065596 A1 | 3/2009 | Seem et al. |
| 2009/0078120 A1 | 3/2009 | Kummer et al. |
| 2009/0096416 A1 | 4/2009 | Tonegawa et al. |
| 2009/0117798 A1 | 5/2009 | Takashima et al. |
| 2009/0126382 A1 | 5/2009 | Rubino et al. |
| 2009/0173336 A1 | 7/2009 | Leifer et al. |
| 2009/0265106 A1 | 10/2009 | Bearman et al. |
| 2009/0292465 A1 | 11/2009 | Kaldewey et al. |
| 2009/0319090 A1 * | 12/2009 | Dillon .................... G06Q 50/06 700/291 |
| 2010/0017045 A1 | 1/2010 | Nesler et al. |
| 2010/0047115 A1 | 2/2010 | Krichtafovitch et al. |
| 2010/0063832 A1 | 3/2010 | Brown |
| 2010/0070093 A1 | 3/2010 | Harrod et al. |
| 2010/0175556 A1 | 7/2010 | Kummer et al. |
| 2010/0187443 A1 | 7/2010 | Leben |
| 2010/0198611 A1 | 8/2010 | Ruoff et al. |
| 2010/0274612 A1 | 10/2010 | Walker et al. |
| 2011/0011105 A1 | 1/2011 | Valiya Naduvath et al. |
| 2011/0018502 A1 | 1/2011 | Bianciotto et al. |
| 2011/0093249 A1 | 4/2011 | Holmes et al. |
| 2011/0106501 A1 | 5/2011 | Christian et al. |
| 2011/0172981 A1 | 7/2011 | Al-Hashimi et al. |
| 2011/0190946 A1 | 8/2011 | Wong et al. |
| 2011/0204720 A1 | 8/2011 | Ruiz et al. |
| 2011/0231320 A1 | 9/2011 | Irving |
| 2011/0276182 A1 | 11/2011 | Seem et al. |
| 2012/0042356 A1 * | 2/2012 | Kubota .................. G05B 15/02 726/2 |
| 2012/0053740 A1 * | 3/2012 | Venkatakrishnan ... G06Q 50/06 700/291 |
| 2012/0112883 A1 | 5/2012 | Wallace et al. |
| 2012/0130547 A1 | 5/2012 | Fadell et al. |
| 2012/0130556 A1 | 5/2012 | Marhoefer |
| 2012/0173293 A1 | 7/2012 | Motley et al. |
| 2012/0199003 A1 | 8/2012 | Melikov et al. |
| 2012/0203386 A1 | 8/2012 | Fakos et al. |
| 2012/0240113 A1 * | 9/2012 | Hur .................... G06F 9/45558 718/1 |
| 2013/0013123 A1 | 1/2013 | Ozaki |
| 2013/0085614 A1 | 4/2013 | Wenzel et al. |
| 2013/0110295 A1 | 5/2013 | Zheng et al. |
| 2013/0116803 A1 * | 5/2013 | Gmach ................ G05B 19/042 700/33 |
| 2013/0162037 A1 | 6/2013 | Kim et al. |
| 2013/0166268 A1 | 6/2013 | Leonard et al. |
| 2013/0204443 A1 | 8/2013 | Steven et al. |
| 2013/0238144 A1 | 9/2013 | Shahapurkar et al. |
| 2013/0245847 A1 | 9/2013 | Steven et al. |
| 2013/0247059 A1 | 9/2013 | Amsterdam et al. |
| 2013/0290511 A1 | 10/2013 | Tu et al. |
| 2013/0297084 A1 * | 11/2013 | Kubota ............... H01M 10/465 700/286 |
| 2014/0039689 A1 | 2/2014 | Honda et al. |
| 2014/0039709 A1 | 2/2014 | Steven et al. |
| 2014/0114867 A1 * | 4/2014 | Volkmann ............. G06Q 10/30 705/308 |
| 2014/0156093 A1 | 6/2014 | Brian et al. |
| 2014/0167917 A2 | 6/2014 | Wallace et al. |
| 2014/0236869 A1 | 8/2014 | Fujimaki et al. |
| 2014/0260692 A1 | 9/2014 | Sharp |
| 2014/0277603 A1 | 9/2014 | Ditlow et al. |
| 2014/0277767 A1 | 9/2014 | Othman |
| 2014/0283682 A1 | 9/2014 | Hamann et al. |
| 2014/0324404 A1 | 10/2014 | De La Torre-Bueno |
| 2014/0356229 A1 | 12/2014 | Farren |
| 2015/0028114 A1 | 1/2015 | Rosen |

(56) References Cited

U.S. PATENT DOCUMENTS

| | | |
|---|---|---|
| 2015/0053366 A1 | 2/2015 | Melsheimer |
| 2015/0097688 A1 | 4/2015 | Bruck et al. |
| 2015/0109442 A1 | 4/2015 | Derenne et al. |
| 2015/0149257 A1 | 5/2015 | Bielat et al. |
| 2015/0190538 A1 | 7/2015 | Olvera et al. |
| 2015/0227848 A1 | 8/2015 | Amid et al. |
| 2015/0278968 A1 | 10/2015 | Steven et al. |
| 2015/0316901 A1 | 11/2015 | Wenzel et al. |
| 2015/0316902 A1 | 11/2015 | Wenzel et al. |
| 2015/0316903 A1 | 11/2015 | Asmus et al. |
| 2015/0316907 A1 | 11/2015 | Elbsat et al. |
| 2015/0331972 A1 | 11/2015 | McClure et al. |
| 2015/0354874 A1 | 12/2015 | Cur et al. |
| 2016/0066068 A1 | 3/2016 | Schultz et al. |
| 2016/0079826 A1 | 3/2016 | Paiz et al. |
| 2016/0091904 A1 | 3/2016 | Horesh et al. |
| 2016/0109149 A1 | 4/2016 | Heller |
| 2016/0116181 A1 | 4/2016 | Aultman et al. |
| 2016/0147205 A1 | 5/2016 | Kaufman |
| 2016/0195866 A1 | 7/2016 | Turney et al. |
| 2016/0201933 A1 | 7/2016 | Hester et al. |
| 2016/0210337 A1 | 7/2016 | Constandt |
| 2016/0218543 A1 | 7/2016 | Ishida et al. |
| 2016/0306934 A1 | 10/2016 | Sperry et al. |
| 2016/0313019 A1 | 10/2016 | Mengle et al. |
| 2016/0313751 A1 | 10/2016 | Risbeck et al. |
| 2016/0377306 A1 | 12/2016 | Drees et al. |
| 2017/0003676 A1 | 1/2017 | Yoshida et al. |
| 2017/0011150 A1 | 1/2017 | Sons et al. |
| 2017/0016644 A1 | 1/2017 | Nagarathinam et al. |
| 2017/0031962 A1 | 2/2017 | Turney et al. |
| 2017/0039339 A1 | 2/2017 | Bitran et al. |
| 2017/0082305 A1 | 3/2017 | Law |
| 2017/0097163 A1 | 4/2017 | Law et al. |
| 2017/0097616 A1 | 4/2017 | Cozad et al. |
| 2017/0102162 A1 | 4/2017 | Drees et al. |
| 2017/0102675 A1 | 4/2017 | Drees |
| 2017/0103483 A1 | 4/2017 | Drees et al. |
| 2017/0104336 A1 | 4/2017 | Elbsat et al. |
| 2017/0104337 A1 | 4/2017 | Drees |
| 2017/0104342 A1 | 4/2017 | Elbsat et al. |
| 2017/0104343 A1 | 4/2017 | ElBsat et al. |
| 2017/0104345 A1 | 4/2017 | Wenzel et al. |
| 2017/0104449 A1 | 4/2017 | Drees |
| 2017/0123440 A1 | 5/2017 | Mangsuli et al. |
| 2017/0147722 A1 | 5/2017 | Greenwood |
| 2017/0176030 A1 | 6/2017 | Emmons et al. |
| 2017/0179716 A1 | 6/2017 | Vitullo et al. |
| 2017/0193792 A1 | 7/2017 | Bermudez Rodriguez et al. |
| 2017/0206334 A1 | 7/2017 | Huang |
| 2017/0211837 A1 | 7/2017 | Gupta et al. |
| 2017/0212488 A1 | 7/2017 | Kummer et al. |
| 2017/0234559 A1 | 8/2017 | Federspiel et al. |
| 2017/0241658 A1 | 8/2017 | Salsbury et al. |
| 2017/0246331 A1 | 8/2017 | Lloyd |
| 2017/0300657 A1 | 10/2017 | Barrett et al. |
| 2017/0312379 A1 | 11/2017 | Stibich et al. |
| 2017/0350611 A1 | 12/2017 | Su et al. |
| 2017/0351832 A1 | 12/2017 | Cahan et al. |
| 2017/0352119 A1 | 12/2017 | Pittman et al. |
| 2018/0004171 A1 | 1/2018 | Patel et al. |
| 2018/0004172 A1 | 1/2018 | Patel et al. |
| 2018/0004173 A1 | 1/2018 | Patel et al. |
| 2018/0011459 A1 | 1/2018 | Boettcher et al. |
| 2018/0031533 A1* | 2/2018 | Rawat .................. G06Q 50/06 |
| 2018/0052431 A1* | 2/2018 | Shaikh .................. H02J 3/003 |
| 2018/0052970 A1 | 2/2018 | Boss et al. |
| 2018/0075549 A1 | 3/2018 | Turney et al. |
| 2018/0087791 A1 | 3/2018 | Monkkonen et al. |
| 2018/0100663 A1 | 4/2018 | Crimins et al. |
| 2018/0110416 A1 | 4/2018 | Masuda et al. |
| 2018/0117209 A1 | 5/2018 | Clack et al. |
| 2018/0150601 A1 | 5/2018 | Astigarraga |
| 2018/0157535 A1 | 6/2018 | Dushok |
| 2018/0185533 A1 | 7/2018 | Lalicki |
| 2018/0196456 A1 | 7/2018 | Elbsat |
| 2018/0197253 A1 | 7/2018 | Elbsat et al. |
| 2018/0204162 A1 | 7/2018 | Endel et al. |
| 2018/0209674 A1 | 7/2018 | Ridder et al. |
| 2018/0209675 A1 | 7/2018 | Ridder |
| 2018/0224814 A1 | 8/2018 | Elbsat et al. |
| 2018/0254632 A1 | 9/2018 | Elbsat et al. |
| 2018/0259918 A1 | 9/2018 | Asmus et al. |
| 2018/0285800 A1 | 10/2018 | Wenzel et al. |
| 2018/0299151 A1 | 10/2018 | Ajax et al. |
| 2018/0306459 A1 | 10/2018 | Turney |
| 2018/0313563 A1 | 11/2018 | Turney et al. |
| 2018/0314220 A1 | 11/2018 | Kumar et al. |
| 2018/0318746 A1 | 11/2018 | Thomas |
| 2018/0329374 A1 | 11/2018 | Kelly et al. |
| 2018/0340704 A1 | 11/2018 | Turney et al. |
| 2018/0341255 A1 | 11/2018 | Turney et al. |
| 2018/0356770 A1 | 12/2018 | Elbsat et al. |
| 2018/0356782 A1 | 12/2018 | Elbsat et al. |
| 2018/0357577 A1 | 12/2018 | Elbsat et al. |
| 2018/0372355 A1 | 12/2018 | Mosamkar et al. |
| 2018/0372362 A1 | 12/2018 | Turney et al. |
| 2019/0011145 A1 | 1/2019 | Willmott et al. |
| 2019/0020203 A1 | 1/2019 | Lang et al. |
| 2019/0023099 A1 | 1/2019 | Li et al. |
| 2019/0025774 A1 | 1/2019 | Wenzel et al. |
| 2019/0032942 A1 | 1/2019 | Willmott et al. |
| 2019/0032943 A1 | 1/2019 | Willmott et al. |
| 2019/0032944 A1 | 1/2019 | Wenzel et al. |
| 2019/0032945 A1 | 1/2019 | Willmott et al. |
| 2019/0032947 A1 | 1/2019 | Willmott et al. |
| 2019/0032949 A1 | 1/2019 | Willmott et al. |
| 2019/0052120 A1 | 2/2019 | Huang et al. |
| 2019/0056126 A1 | 2/2019 | Law et al. |
| 2019/0066236 A1 | 2/2019 | Wenzel |
| 2019/0079473 A1 | 3/2019 | Kumar et al. |
| 2019/0096233 A1 | 3/2019 | Bruck et al. |
| 2019/0107825 A1 | 4/2019 | Wenzel et al. |
| 2019/0108746 A1 | 4/2019 | Chang et al. |
| 2019/0148023 A1 | 5/2019 | Sadilek et al. |
| 2019/0163213 A1 | 5/2019 | Ostrye et al. |
| 2019/0163216 A1 | 5/2019 | Ostrye |
| 2019/0182069 A1 | 6/2019 | Gervais |
| 2019/0209806 A1 | 7/2019 | Allen et al. |
| 2019/0213695 A1 | 7/2019 | Elbsat et al. |
| 2019/0216957 A1 | 7/2019 | Hawkins et al. |
| 2019/0219293 A1 | 7/2019 | Wenzel et al. |
| 2019/0235453 A1 | 8/2019 | Turney et al. |
| 2019/0245368 A1 | 8/2019 | Baumgartner et al. |
| 2019/0249897 A1 | 8/2019 | Alcala Perez et al. |
| 2019/0257544 A1 | 8/2019 | Alanqar et al. |
| 2019/0271978 A1 | 9/2019 | Elbsat et al. |
| 2019/0295034 A1 | 9/2019 | Wenzel et al. |
| 2019/0311332 A1 | 10/2019 | Turney et al. |
| 2019/0321504 A1 | 10/2019 | Dayton |
| 2019/0325368 A1 | 10/2019 | Turney et al. |
| 2019/0328920 A1 | 10/2019 | Stibich et al. |
| 2019/0331358 A1 | 10/2019 | Ritmanich et al. |
| 2019/0338974 A1 | 11/2019 | Turney et al. |
| 2019/0339661 A1 | 11/2019 | Pancholi et al. |
| 2019/0340709 A1 | 11/2019 | Elbsat et al. |
| 2019/0347622 A1 | 11/2019 | Elbsat et al. |
| 2020/0009280 A1 | 1/2020 | Kupa |
| 2020/0026249 A1 | 1/2020 | Przybylski et al. |
| 2020/0041158 A1 | 2/2020 | Turney et al. |
| 2020/0090089 A1 | 3/2020 | Aston et al. |
| 2020/0090289 A1 | 3/2020 | Elbsat et al. |
| 2020/0096958 A1 | 3/2020 | Kelly et al. |
| 2020/0096985 A1 | 3/2020 | Wenzel et al. |
| 2020/0103127 A1 | 4/2020 | Chen et al. |
| 2020/0110531 A1 | 4/2020 | Sarang et al. |
| 2020/0124307 A1 | 4/2020 | Ota et al. |
| 2020/0125045 A1 | 4/2020 | Risbeck et al. |
| 2020/0132328 A1 | 4/2020 | Boettcher et al. |
| 2020/0141734 A1 | 5/2020 | Casarez et al. |
| 2020/0149768 A1 | 5/2020 | Turney et al. |
| 2020/0176124 A1 | 6/2020 | Chatterjea et al. |
| 2020/0176125 A1 | 6/2020 | Chatterjea et al. |
| 2020/0193345 A1 | 6/2020 | Elbsat et al. |

(56) References Cited

U.S. PATENT DOCUMENTS

| | | |
|---|---|---|
| 2020/0193346 A1 | 6/2020 | Elbsat et al. |
| 2020/0200416 A1 | 6/2020 | Granger et al. |
| 2020/0218208 A1 | 7/2020 | Alanqar et al. |
| 2020/0218991 A1 | 7/2020 | Alanqar et al. |
| 2020/0227159 A1 | 7/2020 | Boisvert et al. |
| 2020/0301408 A1 | 9/2020 | Elbsat et al. |
| 2020/0319610 A1 | 10/2020 | Ray et al. |
| 2020/0327371 A1 | 10/2020 | Sharma et al. |
| 2020/0334967 A1 | 10/2020 | Sharma et al. |
| 2020/0348038 A1 | 11/2020 | Risbeck et al. |
| 2020/0355391 A1 | 11/2020 | Wenzel et al. |
| 2020/0356087 A1 | 11/2020 | Elbsat et al. |
| 2020/0371482 A1 | 11/2020 | Alanqar et al. |
| 2020/0372588 A1 | 11/2020 | Shi |
| 2020/0406778 A1 | 12/2020 | Langton et al. |
| 2021/0010701 A1 | 1/2021 | Nesler et al. |
| 2021/0011443 A1 | 1/2021 | McNamara et al. |
| 2021/0011444 A1 | 1/2021 | Risbeck et al. |
| 2021/0018211 A1 | 1/2021 | Ellis et al. |
| 2021/0025613 A1 | 1/2021 | Knatchbull-Hugessen et al. |
| 2021/0043330 A1 | 2/2021 | Ikeshima |
| 2021/0072742 A1 | 3/2021 | Wu et al. |
| 2021/0108821 A1 | 4/2021 | Turney et al. |
| 2021/0125114 A1 | 4/2021 | Lin et al. |
| 2021/0148592 A1 | 5/2021 | Turney et al. |
| 2021/0173366 A1 | 6/2021 | Turney et al. |
| 2021/0200807 A1 | 7/2021 | Ploegert et al. |
| 2021/0209532 A1 | 7/2021 | Wenzel et al. |
| 2021/0270490 A1 | 9/2021 | Turney et al. |
| 2021/0284040 A1 | 9/2021 | Grunkemeyer et al. |
| 2021/0302052 A1 | 9/2021 | Trinh |
| 2021/0313075 A1 | 10/2021 | McNamara et al. |
| 2021/0322613 A1 | 10/2021 | Lacaze et al. |
| 2021/0356916 A1 | 11/2021 | Wenzel et al. |
| 2021/0364181 A1 | 11/2021 | Risbeck et al. |
| 2021/0373973 A1* | 12/2021 | Ekins ............... G06F 9/5088 |
| 2021/0393834 A1 | 12/2021 | Wellig |
| 2022/0011731 A1 | 1/2022 | Risbeck et al. |
| 2022/0035326 A1 | 2/2022 | Peters et al. |
| 2022/0042704 A1 | 2/2022 | Drees et al. |
| 2022/0054687 A1 | 2/2022 | Forzani et al. |
| 2022/0062463 A1 | 3/2022 | Ramer et al. |
| 2022/0065479 A1 | 3/2022 | Douglas et al. |
| 2022/0092500 A1 | 3/2022 | Drees et al. |
| 2022/0118875 A1 | 4/2022 | Astorg et al. |
| 2022/0172830 A1 | 6/2022 | Brooks et al. |
| 2022/0203287 A1 | 6/2022 | Wenger et al. |
| 2022/0203288 A1 | 6/2022 | Wenger et al. |
| 2022/0205962 A1 | 6/2022 | Vanderkoy |
| 2022/0207215 A1 | 6/2022 | Liu et al. |
| 2022/0221184 A1 | 7/2022 | Gupta et al. |
| 2022/0228756 A1 | 7/2022 | Gupta et al. |
| 2022/0254483 A1 | 8/2022 | Boisvert et al. |
| 2022/0277851 A1 | 9/2022 | Wellig |
| 2022/0282886 A1 | 9/2022 | Hriljac et al. |
| 2022/0293261 A1 | 9/2022 | McBrady et al. |
| 2022/0305438 A1 | 9/2022 | Wenger et al. |
| 2022/0305881 A1 | 9/2022 | Neu et al. |
| 2022/0381471 A1 | 12/2022 | Wenzel et al. |
| 2022/0390137 A1 | 12/2022 | Wenzel et al. |
| 2022/0404049 A1* | 12/2022 | Chang ............... F24F 11/47 |
| 2022/0404051 A1* | 12/2022 | Chang ............... G05B 15/02 |
| 2023/0020417 A1 | 1/2023 | Elbsat et al. |
| 2023/0248869 A1 | 8/2023 | Bell |
| 2023/0250988 A1 | 8/2023 | Risbeck et al. |
| 2023/0324864 A1 | 10/2023 | Bursch et al. |
| 2024/0165286 A1 | 5/2024 | Bonutti et al. |

FOREIGN PATENT DOCUMENTS

| | | |
|---|---|---|
| CA | 3043996 A1 | 2/2018 |
| CN | 2644960 Y | 9/2004 |
| CN | 1916514 A | 2/2007 |
| CN | 101194129 A | 6/2008 |
| CN | 201173923 Y | 12/2008 |
| CN | 101387428 A | 3/2009 |
| CN | 101692025 A | 4/2010 |
| CN | 201517972 U | 6/2010 |
| CN | 201558243 U | 8/2010 |
| CN | 101861552 A | 10/2010 |
| CN | 202568950 U | 12/2012 |
| CN | 203727247 U | 7/2014 |
| CN | 105805888 A | 7/2016 |
| CN | 106415139 A | 2/2017 |
| CN | 106975279 A | 7/2017 |
| CN | 107250928 A | 10/2017 |
| CN | 107252594 A | 10/2017 |
| CN | 107477782 A | 12/2017 |
| CN | 107613895 A | 1/2018 |
| CN | 207035361 U | 2/2018 |
| CN | 107787469 A | 3/2018 |
| CN | 107917484 A | 4/2018 |
| CN | 108507057 A | 9/2018 |
| CN | 108779925 A | 11/2018 |
| CN | 108980988 A | 12/2018 |
| CN | 109196286 A | 1/2019 |
| CN | 109405151 A | 3/2019 |
| CN | 110529988 A | 12/2019 |
| CN | 110671798 A | 1/2020 |
| CN | 110822616 A | 2/2020 |
| CN | 110991764 A | 4/2020 |
| EP | 1 156 286 A2 | 11/2001 |
| EP | 3 186 687 A4 | 7/2017 |
| EP | 3 497 377 A1 | 6/2019 |
| FR | 3031800 A1 | 7/2016 |
| JP | 2010-128976 A | 6/2010 |
| JP | 2012-533720 A | 12/2012 |
| JP | 2015-152175 A | 8/2015 |
| JP | 2016-138705 A | 8/2016 |
| JP | 06-455326 B2 | 1/2019 |
| KR | 20160137767 A | 12/2016 |
| KR | 20170096092 A | 8/2017 |
| KR | 20170115913 A | 10/2017 |
| KR | 101865143 B1 | 6/2018 |
| KR | 20200047457 A | 5/2020 |
| WO | WO-2005/071815 A1 | 8/2005 |
| WO | WO-2009/157847 A1 | 12/2009 |
| WO | WO-2012/161804 A1 | 11/2012 |
| WO | WO-2013/130956 A1 | 9/2013 |
| WO | WO-2013/186282 A2 | 12/2013 |
| WO | WO-2016/047103 A1 | 3/2016 |
| WO | WO-2016/105347 A1 | 6/2016 |
| WO | WO-2017/109206 A1 | 6/2017 |
| WO | WO-2017/203031 A1 | 11/2017 |
| WO | WO-2018/160412 A1 | 9/2018 |
| WO | WO-2018/226564 A1 | 12/2018 |
| WO | WO-2019/050154 A1 | 3/2019 |
| WO | WO-2019/051893 A1 | 3/2019 |
| WO | WO-2019/157514 A2 | 8/2019 |
| WO | WO-2020/170338 A1 | 8/2020 |
| WO | WO-2022/251700 A1 | 12/2022 |

OTHER PUBLICATIONS

Chinese Office Action on CN Appl. No. 202080057416.0 dated Dec. 30, 2022 (12 pages).

Chinese Office Action on CN Appl. No. 202080057416.0 dated Aug. 30, 2023 (37 pages).

PCT Invitation to Pay Additional Fees and Where Applicable, Protest Fee for Appl. Ser. No. PCT/US2023/020060 dated Jul. 18, 2023 (14 pages).

Yang et al., "Multi-Objective Particle Swarm Optimization for decision-making in building automation," Power and Energy Society General Meeting, Jul. 24, 2011, IEEE (pp. 1-5).

Azimi et al., "HVAC filtration for controlling infectious airborne disease transmission in indoor environments: Predicting risk reductions and operational costs," Building and Environment, May 2013, vol. 70 (pp. 150-160).

Beggs et al., "Potential for airborne transmission of infection in the waiting areas of healthcare premises: stochastic analysis using a Monte Carlo model," BMC Infectious Diseases, Aug. 2010, vol. 10 (11 pages).

(56) References Cited

OTHER PUBLICATIONS

Ben-David et al., "Interplay of ventilation and filtration: Differential analysis of cost function combining energy use and indoor exposure to PM2.5 and ozone," Building and Environment, Aug. 2017, vol. 128 (pp. 320-335).
Gao et al., "Potential impact of a ventilation intervention for influenza in the context of a dense indoor contact network in Hong Kong," Science of the Total Environment, Apr. 2016, vols. 569-570 (pp. 373-381).
U.S. Appl. No. 16/703,514, filed Dec. 4, 2019, Johnson Controls Technology Company.
Aghniaey et al., "The Assumption of Equidistance in the Seven-Point Thermal Sensation Scale and a Comparison between Categorical and Continuous Metrics," University of Georgia College of Engineering, Jan. 18, 2019, 4 pages.
Aliabadi et al., "Preventing Airborne Disease Transmission: Review of Methods for Ventilation Design in Health Care Facilities," SAGE—Hindawi Access to Research Advances in Preventive Medicine, Feb. 2011, vol. 2011, 21 pages.
Azimi et al., "HVAC filtration for controlling infectious airborne disease transmission in indoor environments: Predicting risk reductions and operational costs," Building and Environment, May 13, 2013, 70, pp. 150-160.
Batterman et al., "Review and Extension of CO2-Based Methods to Determine Ventilation Rates with Application to School Classrooms," International Journal of Environmental Research and Public Health, Feb. 4, 22 pages.
Chen et al., "Occupant Feedback Based Model Predictive Control for Thermal Comfort and Energy Optimization: A Chamber Experimental Evaluation," Applied Energy, 2016, 164, pp. 341-351.
Ching, "An empirical drag coefficient model for simulating the dispersion and deposition of bioaerosol particles in ventilated environments," The Hong Kong Polytechnic University Department of Building Services Engineering, Jun. 2016, 345 pages.
Copeland, "The Impact of Patient Room Design on Airborne Hospital-Acquired Infections (HAI)," Thesis, Kent State University, Degree of Masters of Science in Architecture and Environmental Design, May 2016, 61 pages.
EPA—U.S. Environmental Protection Agency, "Greenhouse Gases Equivalences Calculator—Calculations and References", URL: https://www.epa.gov/energy/greenhouse-gases-equivalencies-calculator-calculations-and-references, retrieved from the internet Sep. 30, 3031, 32 pages.
International Preliminary Report on Patentability on PCT Appl. Ser. No. PCT/US2020/041770 dated Jan. 27, 2022 (8 pages).
International Preliminary Report on Patentability on PCT Appl. Ser. No. PCT/US2020/041792 dated Jan. 27, 2022 (9 pages).
International Preliminary Report on Patentability on PCT Appl. Ser. No. PCT/US2020/041845 dated Jan. 27, 2022 (12 pages).
International Search Report and Written Opinion on PCT/US2020/041770, dated Nov. 3, 2020, 13 pages.
International Search Report and Written Opinion on PCT/US2020/041792, dated Sep. 30, 15 pages.
International Search Report and Written Opinion on PCT/US2020/041845, dated Jan. 13, 2021, 20 pages.
Joe et al., "Methodology for Modeling the Microbial Contamination of Air Filters," PLoS ONE 9(2) e88514, URL: https://doi.org/10.1371/journal.pone.0088514, Feb. 11, 2014, 9 pages.
Kanaan et al., "New airborne pathogen transport model for upper-room UVGI spaces conditioned by chilled ceiling and mixed displacement ventilation: Enhancing air quality and energy performance," Energy Conversion and Management, Apr. 12, 2014, 85, pp. 50-61.
Kang et al., "Novel Modeling and Control Strategies for a HVAC System Including Carbon Dioxide Control," Energies, Jun. 2, 2014, 7, pp. 3599-3617.
Kumar, "A Simulation Framework to Characterize the Effect of Ventilation Control on Airborne Infectious Disease Transmission in Schools," Thesis, Graduate School of the University of Texas at Austin, May 2019, 53 pages.

Lampinen, "Thermodynamics of Humid Air," Sep. 2015, 39 Pages.
Liao et al., "A Probabilistic Transmission Dynamic Model to Assess Indoor Airborne Infection Risks," Risk Analysis, 2005, vol. 25, No. 5, pp. 1097-1107.
Ljung, System Identification: Theory for the User, 1999, 2nd ed., Prentice Hall PTR, Upper Saddle River, 63 pages.
Luo, "Maximizing Thermal Comfort and International Design: Predicting Thermal Comfort in Mixed-mode Office Building in the UK," Loughborough University, Jan. 18, 2019, 4 pages.
Noakes et al., "Applying the Wells-Riley equation to the risk of airborne infection in hospital environments: The importance of stochastic and proximity effects," Indoor Air 2008, the 11th Intl Conference on Indoor Air Quality and CI, Aug. 17-22, 2008, Copenhagen, Denmark, 9 pages.
Noakes et al., "Mathematical models for assessing the role of airflow on the risk of airborne infection in hospital wards," Journal of the Royal Society Interface, 2009, 6, S791-S800, 10 pages.
Noakes et al., "Modelling the transmission of airborne infections in enclosed spaces," Epidemiol. Infect, 2006, vol. 134, pp. 1082-1091.
Stephens, "HVAC filtration and the Wells-Riley approach to assessing risks of infectious airborne diseases," The National Air Filtration Association (NAFA) Foundation, Mar. 1, 2012, 47 pages.
Sudhakaran et al., "Temperature, Relative Humidity, and Carbon-Dioxide Modulation in a Near-Zero Energy Efficient Retrofit House," Purdue University, 2016, 11 pages.
Sze et al., "Review and Comparison Between the Wells-Riley and Dose-Response Approaches to Risk Assessment of Infectious Respiratory Diseases," Indoor Air, 2010, 20, pp. 2-16.
Weekly et al., "Modeling and Estimation of the Humans' Effect on the CO2 Dynamics Inside a Conference Room," IEEE Transactions on Control Systems Technology, Sep. 2015, 23.5, 12 pages.
EPO Provisional Opinion Accompanying the Partial Search Result for PCT Appl. Ser. No. PCT/US2023/012719 dated Mar. 28, 2023 (15 pages).
European Office Action on EP Appl. No. 20750965.4 dated Mar. 31, 2023 (5 pages).
Chinese Office Action on CN Appl. No. 202080061895.3 dated Sep. 25, 2023 (12 pages).
International Search Report and Written Opinion on PCT Appl. No. PCT/US2023/020060 dated Sep. 15, 2023 (20 pages).
Afram et al., "Theory and Application of HVAC Control Systems—A review of Model Predictive Control (MPC)," Building and Environment, Feb. 2014, vol. 72 (pp. 343-355).
Ahn et al., "Optimal Control Development for Chilled Water Plants Using a Quadratic Representation," Energy and Buildings, Apr. 2001, vol. 33, No. 4 (pp. 371-378).
Alvarado et al., "A Methodology to Monitor Airborne PM10 Dust Particles Using a Small Unmanned Aerial Vehicle," Sensors, 2017, vol. 17 (25 pages).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
EPO Search Opinion EP Appl. Ser. No. EP 22177772.5 dated Sep. 26, 2022 (6 pages).

(56) References Cited

OTHER PUBLICATIONS

Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
International Search Report and Written Opinion on PCT Appl. Ser. No. PCT/US2023/012719 dated May 22, 2023 (20 pages).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).
McKenna et al., "A TRNSYS model of a building HVAC system with GSHP and PCM thermal energy storage—component modelling and validation," Proceedings of BS2013: 13th Conference of International Building Performance Simulation Association, Chambery, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of HVA C&R Research, vol. 11, No. 3 (pp. 459-486).
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).
Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition-Coordination Method," Energy and Buildings, May 2010, vol. 42, No. 5 (pp. 570-583).
U.S. Appl. No. 63/194,771, filed May 28, 2021, Johnson Controls Technology Company.
U.S. Appl. No. 63/220,878, filed Jul. 12, 2021, Johnson Controls Tyco IP Holdings LLP.
Chinese Office Action on CN Appl. No. 202080061895.3 dated Jan. 20, 2023 (6 pages).
U.S. Appl. No. 17/576,615, filed Jan. 14, 2022, Johnson Controls Tyco IP Holdings LLP.
U.S. Appl. No. 17/582,988, filed Jan. 24, 2022, Johnson Controls Tyco IP Holdings LLP.
U.S. Appl. No. 17/537,046, filed Nov. 29, 2021, Johnson Controls Tyco IP Holdings LLP.
U.S. Appl. No. 17/710,458, filed Mar. 31, 2022, Johnson Controls Tyco IP Holdings LLP.
CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
International Search Report and Written Opinion on PCT Appl. No. PCT/US2022/031438 dated Nov. 8, 2022 (18 pages).
International Search Report and Written Opinion on PCT Appl. No. PCT/US2022/040332 dated Nov. 22, 2022 (18 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-

(56) References Cited

OTHER PUBLICATIONS

Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Noakes et al., "Appraising healthcare ventilation design from combined infection control and energy perspective," HVAC & R Research, Aug. 2012, (20 pages).
U.S. Appl. No. 16/370,632, filed Mar. 29, 2019, Johnson Controls Technology Company.
U.S. Appl. No. 17/686,320, filed Mar. 3, 2022, Johnson Controls Tyco IP Holdings LLP.
U.S. Appl. No. 17/733,786, filed Apr. 29, 2022, Johnson Controls Tyco IP Holdings LLP.
Hubert et al., Modeling for Residential Electricity Optimization in Dynamic Pricing Environments, IEEE Transactions on Smart Grid, IEEE, USA, Dec. 1, 2012, vol. 3, No. 4 (pp. 2224-2231).
International Preliminary Report Patentability on PCT Appl. Ser. No. PCT/US2018/039119 dated Jan. 2, 2020 (7 pages).
International Search Report and Written Opinion on International Appl. Ser. No. PCT/US2018/039119 dated Oct. 5, 2018 (9 pages).
Cai et al., "Nationwide assessment of energy costs and policies to limit airborne infection risks in U.S. schools," Journal of Building Engineering, Jul. 2021, vol. 45 (pp. 1-12).
European Office Action on EP Appl. No. 20751421.7 dated Jul. 16, 2024 (5 pages).
Faulkner et al., "Tradeoffs among indoor air quality, financial costs, and $CO_2$ emissions for HVAC operation strategies to mitigate indoor virus in U.S. office buildings," Building and Environment, Mar. 2022, vol. 221 (pp. 1-15).
Lee et al., "Life-Cycle Cost Simulation of In-Duct Ultraviolet Germicidal Irradiation Systems," Eleventh International IBPSA Conference, Glasgow, Scotland, Jul. 27-30, 2009 (pp. 1159-1166).
Chang et al., "A cost-effectiveness assessment of the operational parameters of central HVAC systems during pandemics," Building Simulation, Nov. 2022, vol. 16 (pp. 667-682).
Noakes et al., "Modeling infection risk and energy use of upper-room Ultraviolet Germicidal Irradiation systems in multi-room environments," Jan. 2015, Science and Technology for the Built Environment, vol. 21, No. 1 (pp. 99-111).
Villafruela et al., "Comparison of air change efficiency, contaminant removal effectiveness and infection risk as IAQ indices in isolation rooms," Energy and Buildings, Mar. 2012, vol. 57 (pp. 210-219).
Xu et al., "Simulation-based trade-off modeling for indoor infection risk of airborne diseases, energy consumption, and thermal comfort," Journal of Building Engineering, Jan. 2023, vol. 76, No. 107137 (pp. 1-16).
Yan et al., "Evaluating SARS-CoV-2 airborne quanta transmission and exposure risk in a mechanically ventilated multi zone office building," Building and Environment, Feb. 2022, vol. 219, No. 109184 (pp. 1-15).

\* cited by examiner

CONTROL SYSTEM WITH MULTI-FACTOR CARBON EMISSIONS OPTIMIZATION

BACKGROUND

The present disclosure relates generally to the operation of a central plant for serving building thermal energy loads.

A central plant may include various types of equipment configured to serve the thermal energy loads (and, in some embodiments, electricity loads or other energy loads) of a building or campus. For example, a central plant may include heaters, chillers, heat recovery chillers, cooling towers, or other types of equipment configured to provide heating or cooling for the building. A central plant may consume resources from a utility (e.g., electricity, water, natural gas, etc.) or other source (e.g., an on-site green energy source such as a photovoltaic system) to heat or cool a working fluid (e.g., water, glycol, etc.) that is circulated to the building or stored for later use to provide heating or cooling for the building. Fluid conduits typically deliver the heated or chilled fluid to air handlers located on the rooftop of the building or to individual floors or zones of the building. The air handlers push air past heat exchangers (e.g., heating coils or cooling coils) through which the working fluid flows to provide heating or cooling to the air. The working fluid then returns to the central plant to receive further heating or cooling and the cycle continues.

High efficiency equipment can help reduce the amount of energy consumed by a central plant; however, the effectiveness of such equipment is highly dependent on the control technology that is used to distribute the load across the multiple subplants. For example, it may be more cost efficient to run heat pump chillers instead of conventional chillers and a water heater when energy prices are high. It is difficult and challenging to determine when and to what extent each of the multiple subplants should be used to minimize energy cost. It also is difficult and challenging to determine when and to what extent each of the multiple subplants should be used to reduce or minimize carbon emissions or other pollution associated with operation of the central plant. If various utility costs (e.g., including electrical demand charges), carbon emissions, and other penalties or incentives are all of interest, the technical control problem for operating the central plant can be very complicated.

SUMMARY

One implementation of the present disclosure is a system. The system includes a first subsystem configured to produce a resource by consuming electricity, a second subsystem configured to produce the resource by consuming a fuel, and a controller. The controller is configured to determine an allocation of a predicted demand for the resource over a future time period between the first subsystem and the second subsystem based on a first carbon emissions rate associated with off-site production of the electricity and a second carbon emissions rate associated with on-site consumption of the fuel. The controller is also configured to control the first subsystem and the second subsystem to produce the resource in accordance with the allocation during the future time period.

In some embodiments, the first subsystem includes a heat recovery chiller, the second subsystem includes a hot water generator, and the resource is hot water. The system may also include a thermal energy storage system configured to store the hot water produced by the heat recovery chiller and the hot water generator.

In some embodiments, the controller is configured to determine the allocation by optimizing an objective function. The objective function includes a utility cost term accounting for purchases of the electricity and the fuel for the future time period and an emissions term based on the first carbon emissions rate and the second carbon emissions rate. The first carbon emissions rate may be a marginal operating emissions rate.

Another implementation of the present disclosure is a method for operating a first subsystem configured to produce a resource by consuming electricity and a second subsystem configured to produce the resource by consuming a fuel. The method includes determining an allocation of a predicted demand for the resource over a future time period between the first subsystem and the second subsystem based on a first carbon emissions rate associated with off-site production of the electricity and a second carbon emissions rate associated with on-site consumption of the fuel. The method also includes controlling the first subsystem and the second subsystem during the future time period to produce the resource in accordance with the allocation.

In some embodiments, the first subsystem includes a heat recovery chiller, the second subsystem includes a hot water generator, and the resource is hot water. In some embodiments, the method also includes controlling a thermal energy storage system to store at least a portion of the hot water produced by the heat recovery chiller and the hot water generator.

In some embodiments, determining the allocation includes optimizing an objective function that includes a utility cost term accounting for purchases of the electricity and the fuel for the future time period and an emissions term based on the first carbon emissions rate and the second carbon emissions rate. The method may include weighting the emissions term relative to the utility cost term using a user-selected weight. The emissions term may include a price of carbon offsets.

The first emissions rate may be a marginal operating emissions rate of a utility grid. In some embodiments, the method includes predicting time-varying values of the marginal operating emissions rate for the future time period, and allocating the building loads is based on the time-varying values. In some embodiments, determining the allocation comprises performing an optimization subject to a constraint defined based on the first carbon emissions rate and the second carbon emissions rate.

Another implementation of the present disclosure is a system including one or more processors and computer-readable media storing program instructions, that, when executed by the one or more processors, cause the one or more processors to perform operations including allocating building loads for a future time period across a plurality of equipment subplants based on a plurality of emissions rates associated with the equipment subplants and controlling the equipment subplants during the future time period in accordance with the allocated building loads.

In some embodiments, the plurality of equipment subplants comprise a first subplant that consumes electricity to produce a resource and a second subplant that consumes a fuel to produce the resource. The resource may be hot water, the first subplant may include a heat recovery chiller, and the second subplant may include a hot water generator.

In some embodiments, the plurality of emissions rates include a first emissions rate associated with production of the electricity and a second emissions rate associated with consumption of the fuel by the second subplant. The first emissions rate may be a marginal operating emissions rate of a utility grid. The operations may also include predicting time-varying values of the marginal operating emissions rate for the future time period, and allocating the building loads may be based on the time-varying values.

Other aspects, features, and advantages of the devices and/or processes described herein will become apparent in the detailed description set forth herein and taken in conjunction with the accompanying drawings.

DETAILED DESCRIPTION

Overview

Figure 1:
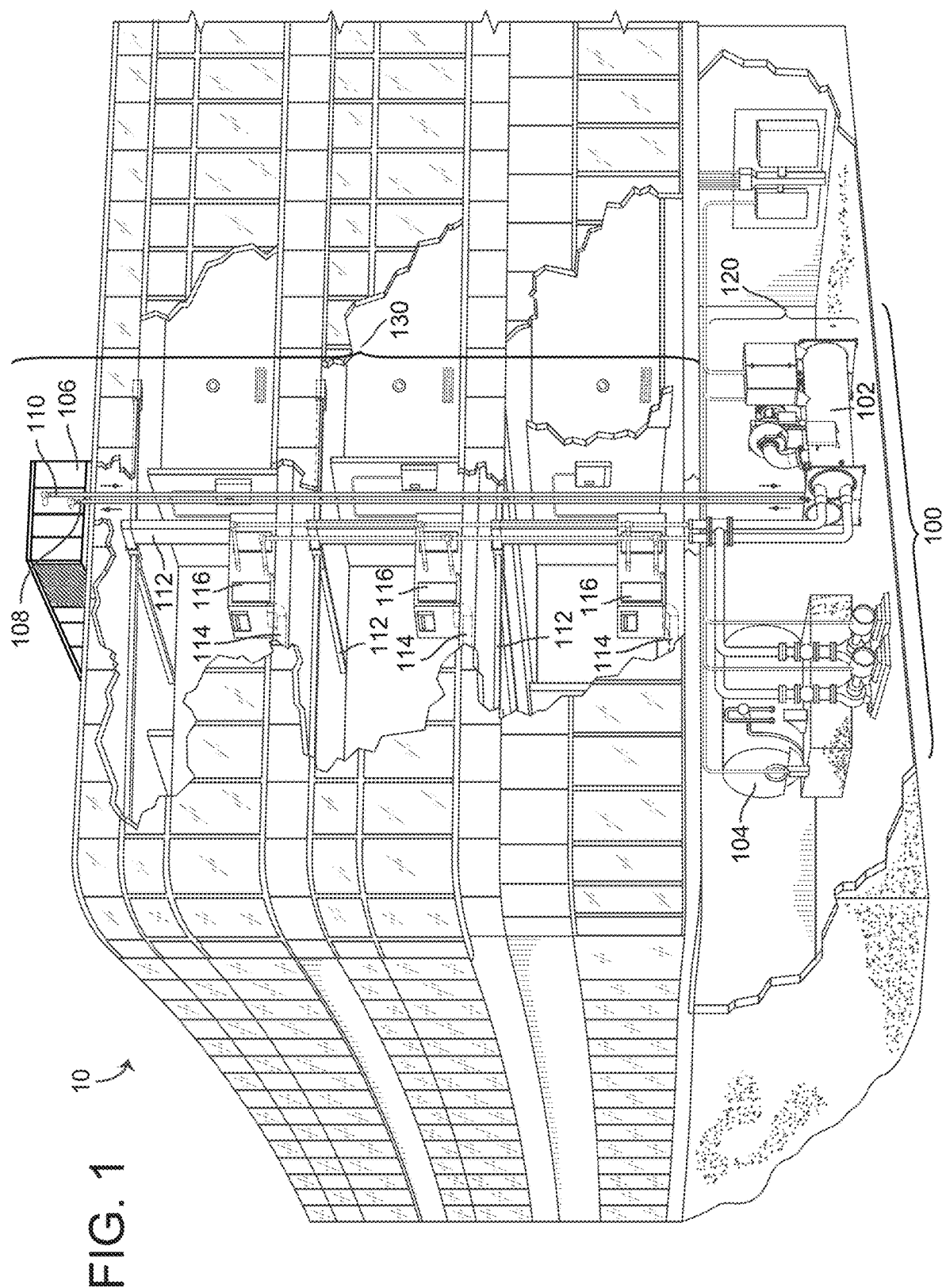
FIG. 1 is a drawing of a building equipped with a building management system (BMS) and a HVAC system

Referring generally to the FIGURES, a central plant and building management system with price-based and incentive-based demand response optimization are shown, according to various exemplary embodiments. The systems and methods described herein may be used to control the distribution, production, storage, and usage of resources in a central plant. In some embodiments, a central plant controller performs an optimization process determine an optimal allocation of resources (e.g., thermal energy resources, water, electricity, etc.) for each time step within an optimization period. The optimal allocation of resources may include, for example, an optimal amount of each resource to purchase from utilities, an optimal amount of each resource to produce or convert using generator subplants, an optimal amount of each resource to store or remove from storage subplants, an optimal amount of each resource to sell to energy purchasers, and/or an optimal amount of each resource to provide to a building or campus. As used herein, the term "subplant" can refer to a unit of equipment, a group of equipment units, a sub-portion of a central plant, one or more standalone devices that operate outside a central plant, etc.

The central plant controller may be configured to maximize the economic value of operating the central plant over the duration of the optimization period. The economic value may be defined by a value function that expresses economic value as a function of the control decisions made by the controller. The value function may account for the cost of resources purchased from utilities, revenue generated by selling resources to energy purchasers, and the cost of operating the central plant. In some embodiments, the cost of operating the central plant includes a cost for losses in battery capacity as a result of the charging and discharging electrical energy storage. The cost of operating the central plant may also include a cost of equipment degradation during the optimization period.

In some embodiments, the controller maximizes the life cycle economic value of the central plant equipment while participating in price-based demand response (PBDR) programs, incentive-based demand response (IBDR) programs, or simultaneously in both PBDR and IBDR programs. For IBDR programs, the controller may use statistical estimates of past clearing prices, mileage ratios, and event probabilities to determine the revenue generation potential of selling stored energy to energy purchasers. For PBDR programs, the controller may use predictions of ambient conditions, facility thermal loads, and thermodynamic models of installed equipment to estimate the resource consumption of the building and/or the subplants. The controller may use predictions of the resource consumption to monetize the costs of running the central plant equipment.

The controller may automatically determine (e.g., without human intervention) a combination of PBDR and/or IBDR programs in which to participate over the optimization period in order to maximize economic value. For example, the controller may consider the revenue generation potential of IBDR programs, the cost reduction potential of PBDR programs, and the equipment maintenance/replacement costs that would result from participating in various combinations of the IBDR programs and PBDR programs. The controller may weigh the benefits of participation against the costs of participation to determine an optimal combination of programs in which to participate. Advantageously, this allows the controller to determine an optimal set of control decisions (e.g., an optimal resource allocation) that maximizes the overall value of operating the central plant over the optimization period.

In some instances, the controller may determine that it would be beneficial to participate in an IBDR program when the revenue generation potential is high and/or the costs of participating are low. For example, the controller may receive notice of a synchronous reserve event from an IBDR program which requires the central plant to shed a predetermined amount of power. The controller may determine that it is optimal to participate in the IBDR program if a cold thermal energy storage subplant has enough capacity to provide cooling for the building while the load on a chiller subplant is reduced in order to shed the predetermined amount of power.

In other instances, the controller may determine that it would not be beneficial to participate in an IBDR program when the resources required to participate are better allocated elsewhere. For example, if the building is close to setting a new peak demand that would greatly increase the PBDR costs, the controller may determine that only a small portion of the electrical energy stored in the electrical energy storage will be sold to energy purchasers in order to participate in a frequency response market. The controller may determine that the remainder of the electrical energy will be used to power the chiller subplant to prevent a new peak demand from being set. These and other features of the central plant and/or building management system are described in greater detail below.

Building Management System and HVAC System

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
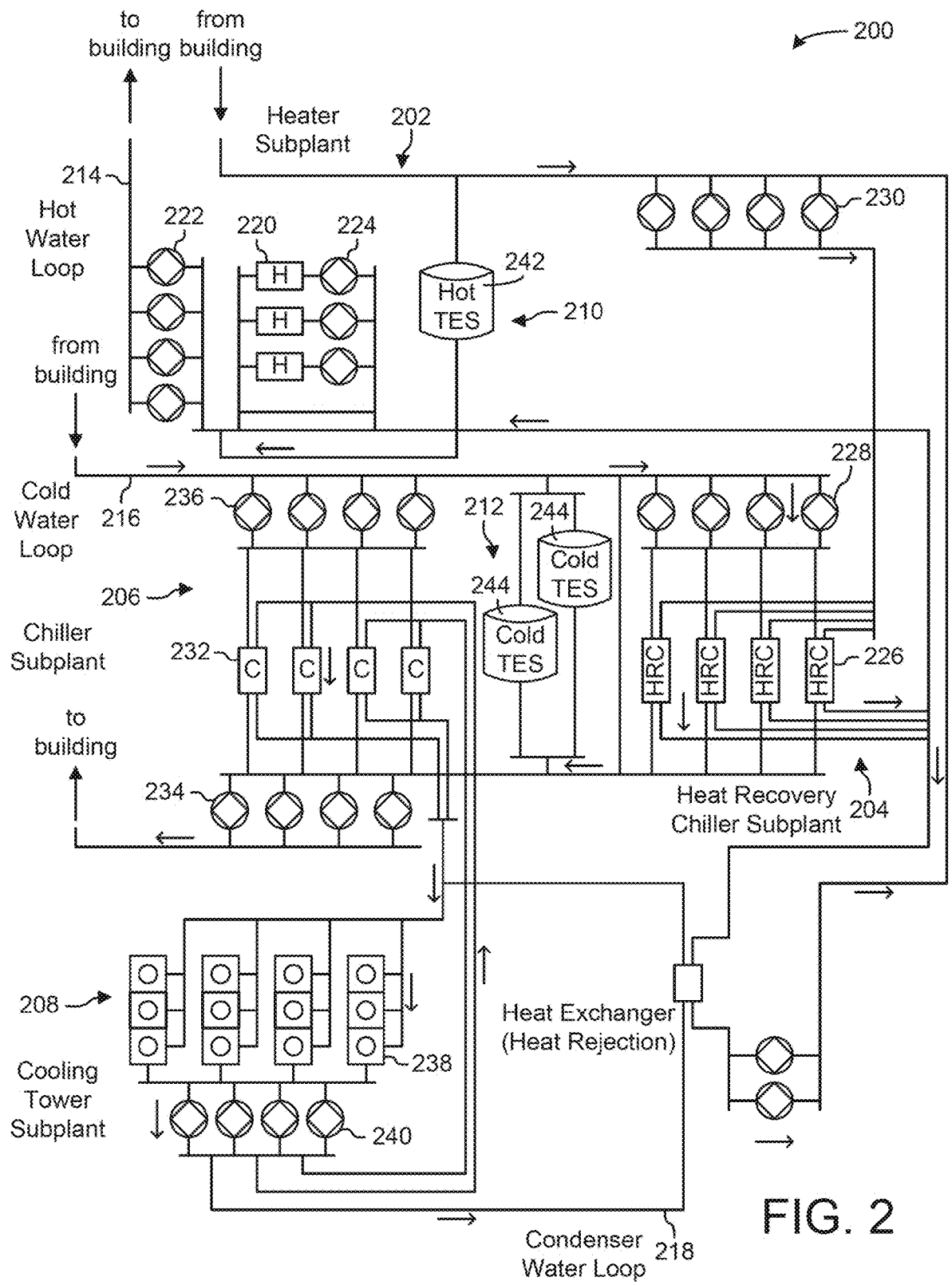
FIG. 2 is a schematic diagram of a waterside system, shown as a central plant, which may be used to provide resources to the building of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

Waterside system 200 is shown in FIG. 2 as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
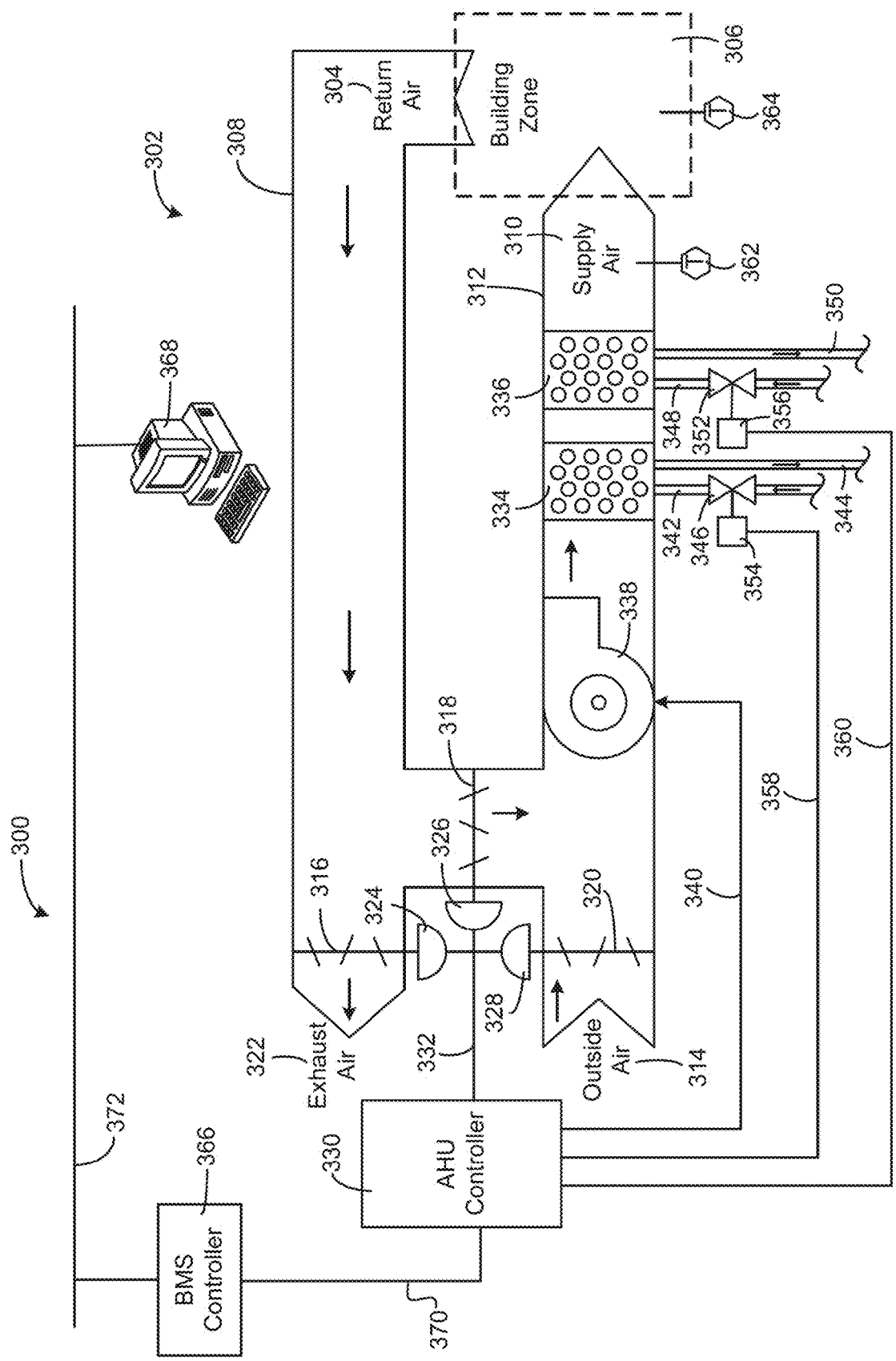
FIG. 3 is a schematic diagram of an airside system which may be used to provide resources to the building of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

Airside system 300 is shown in FIG. 3 as an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
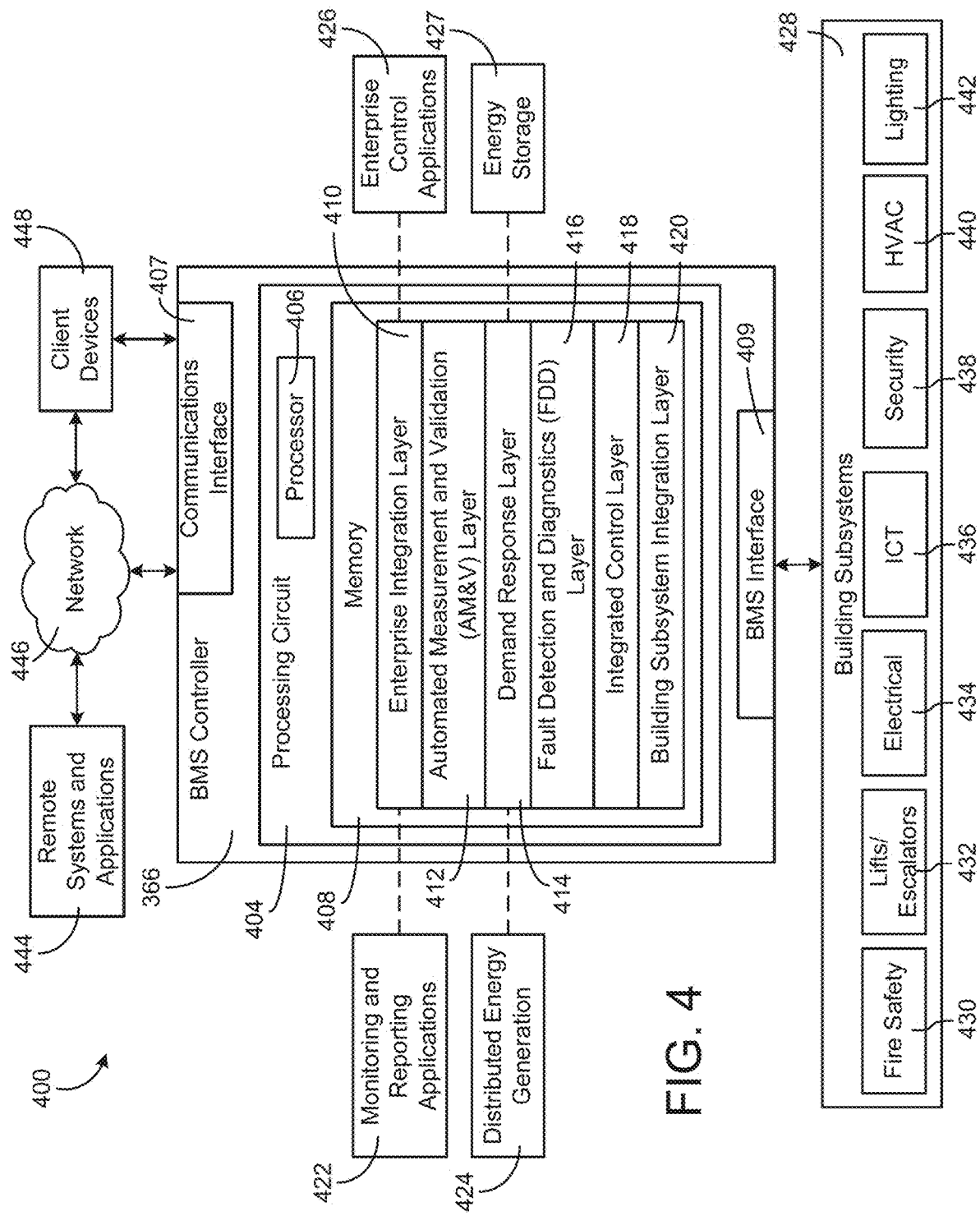
FIG. 4 is a block diagram illustrating the BMS of FIG. 1 in greater detail, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, waterside system 200, and/or airside system 300, as described with reference to FIGS. 1-3. For example, HVAC subsystem 440 may include one or more chillers, boilers, heat exchangers, air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, energy storage 427 (e.g., hot TES 242, cold TES 244, electrical energy storage, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Central Plant System with Thermal and Electrical Energy Storage

Figure 5:
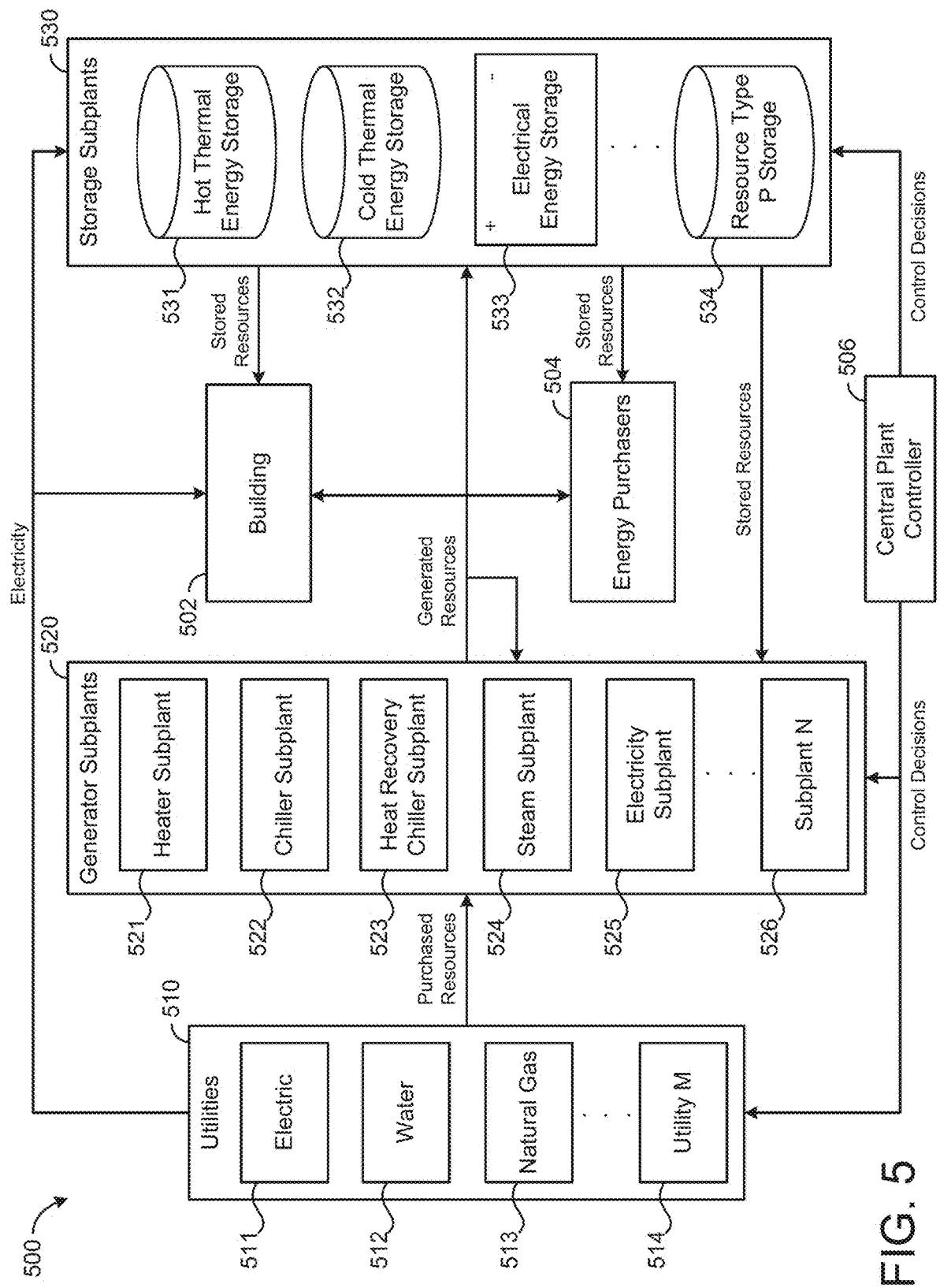
FIG. 5 is a block diagram illustrating a central plant system including a central plant controller that may be used to control the central plant of FIG. 2, according to an exemplary embodiment.

Referring now to FIG. 5, a block diagram of a central plant system 500 is shown, according to an exemplary embodiment. Central plant system 500 is shown to include a building 502. Building 502 may be the same or similar to building 10, as described with reference to FIG. 1. For example, building 502 may be equipped with a HVAC system and/or a building management system (e.g., BMS 400) that operates to control conditions within building 502. In some embodiments, building 502 includes multiple buildings (i.e., a campus) served by central plant system 500. Building 502 may demand various resources including, for example, hot thermal energy (e.g., hot water), cold thermal energy (e.g., cold water), and/or electrical energy. The resources may be demanded by equipment or subsystems within building 502 (e.g., building subsystems 428) or by external systems that provide services for building 502 (e.g., heating, cooling, air circulation, lighting, electricity, etc.). Central plant system 500 operates to satisfy the resource demand associated with building 502.

Central plant system 500 is shown to include a plurality of utilities 510. Utilities 510 may provide central plant system 500 with resources such as electricity, water, natural gas, or any other resource that can be used by central plant system 500 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Utilities 510 or suppliers to utilities 510 may be associated with off-site (i.e., outside of central plant system 500) sources of carbon emissions, for example carbon emissions that result from power plants that burn fuels (e.g., fossil fuels, coal, oil, natural gas, gasoline, diesel, ethanol, biofuels, biomass, hydrocarbons, etc.) to generate electricity provided by the electric utility 511 to central plant system 500. As a further example, carbon emissions may result from activities performed by utilities 510 or suppliers to utilities 510 to obtain, treat, pre-process, pump, deliver, etc. other resources which are provided to the central plant system 500 from utilities 510. In some embodiments, an indication of the amount or rate of carbon emissions associated with each input resource to central plant system 500 (e.g., carbon emissions per unit of electricity, carbon emissions per unit of water, carbon emissions per unit of natural gas) is provided by utilities 510. The amount or rate of carbon emissions per unit of any given resource may vary over time and can be provided as time series data. Resources purchased from utilities 510 can be used by generator subplants 520 to produce generated resources (e.g., hot water, cold water, electricity, steam, etc.), stored in storage subplants 530 for later use, or provided directly to building 502. For example, utilities 510 are shown providing electricity directly to building 502 and storage subplants 530.

Central plant system 500 is shown to include a plurality of generator subplants 520. In some embodiments, generator subplants 520 include one or more of the subplants described with reference to FIG. 2. For example, generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Burning natural gas by heater subplant 521, steam subplant 524, electricity subplant 525 or any other of generator subplants 520 that consume natural gas can result in on-site carbon emissions from the central plant system 500, for example at a rate of tons of carbon per unit natural gas consumed (e.g., per kW of natural gas). Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.) which may advantageously include non-carbon-emitting electricity generation (e.g., green energy sources, renewable energy generators, etc.).

The input resources used by generator subplants 520 may be provided by utilities 510, retrieved from storage subplants 530, and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be stored in storage subplants 530, provided to building 502, sold to energy purchasers 504, and/or used by other generator subplants 520. For example, the electricity generated by electricity subplant 525 may be stored in electrical energy storage 533, used by chiller subplant 522 to generate cold thermal energy, provided to building 502, and/or sold to energy purchasers 504.

Central plant system 500 is shown to include storage subplants 530. Storage subplants 530 may be configured to store energy and other types of resources for later use. Each of storage subplants 530 may be configured to store a different type of resource. For example, storage subplants 530 are shown to include hot thermal energy storage 531 (e.g., one or more hot water storage tanks), cold thermal energy storage 532 (e.g., one or more cold thermal energy storage tanks), electrical energy storage 533 (e.g., one or more batteries), and resource type P storage 534, where P is the total number of storage subplants 530. The resources stored in subplants 530 may be purchased directly from utilities 510 or generated by generator subplants 520.

In some embodiments, storage subplants 530 are used by central plant system 500 to take advantage of price-based demand response (PBDR) programs. PBDR programs encourage consumers to reduce consumption when generation, transmission, and distribution costs are high. PBDR programs are typically implemented (e.g., by utilities 510) in the form of energy prices that vary as a function of time. For example, utilities 510 may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in subplants 530 allows for the resources to be purchased at times when the resources are relatively less expensive (e.g., during non-peak electricity hours) and stored for use at times when the resources are relatively more expensive (e.g., during peak electricity hours). Storing resources in subplants 530 also allows the resource demand of building 502 to be shifted in time. For example, resources can be purchased from utilities 510 at times when the demand for heating or cooling is low and immediately converted into hot or cold thermal energy by generator subplants 520. The thermal energy can be stored in storage subplants 530 and retrieved at times when the demand for heating or cooling is high. This allows central plant system 500 to smooth the resource demand of building 502 and reduces the maximum required capacity of generator subplants 520. Smoothing the demand also allows central plant system 500 to reduce the peak electricity consumption, which results in a lower demand charge.

In some embodiments, storage subplants 530 are used by central plant system 500 to take advantage of incentive-based demand response (IBDR) programs. IBDR programs provide incentives to customers who have the capability to store energy, generate energy, or curtail energy usage upon request. Incentives are typically provided in the form of monetary revenue paid by utilities 510 or by an independent service operator (ISO). IBDR programs supplement traditional utility-owned generation, transmission, and distribution assets with additional options for modifying demand load curves. For example, stored energy can be sold to energy purchasers 504 (e.g., an energy grid) to supplement the energy generated by utilities 510. In some instances, incentives for participating in an IBDR program vary based on how quickly a system can respond to a request to change power output/consumption. Faster responses may be compensated at a higher level. Advantageously, electrical energy storage 533 allows system 500 to quickly respond to a request for electric power by rapidly discharging stored electrical energy to energy purchasers 504.

Still referring to FIG. 5, central plant system 500 is shown to include a central plant controller 506. Central plant controller 506 may be configured to control the distribution, production, storage, and usage of resources in central plant system 500. In some embodiments, central plant controller 506 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to store or remove from storage subplants 530, an optimal amount of each resource to sell to energy purchasers 504, and/or an optimal amount of each resource to provide to building 502. In some embodiments, the control decisions include an optimal amount of each input resource and output resource for each of generator subplants 520.

Controller 506 may be configured to maximize the economic value of operating central plant system 500 over the duration of the optimization period. The economic value may be defined by a value function that expresses economic value as a function of the control decisions made by controller 506. The value function may account for the cost of resources purchased from utilities 510, revenue generated by selling resources to energy purchasers 504, and the cost of operating central plant system 500. In some embodiments, the cost of operating central plant system 500 includes a cost for losses in battery capacity as a result of the charging and discharging electrical energy storage 533. The cost of operating central plant system 500 may also include a cost of excessive equipment start/stops during the optimization period.

Each of subplants 520-530 may include equipment that can be controlled by central plant controller 506 to optimize the performance of central plant system 500. Subplant equipment may include, for example, heating devices, chillers, heat recovery heat exchangers, cooling towers, energy storage devices, pumps, valves, and/or other devices of subplants 520-530. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from central plant controller 506.

In some embodiments, one or more of subplants 520-530 includes a subplant level controller configured to control the equipment of the corresponding subplant. For example, central plant controller 506 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, controller 506 maximizes the life cycle economic value of central plant system 500 while participating in PBDR programs, IBDR programs, or simultaneously in both PBDR and IBDR programs. For the IBDR programs, controller 506 may use statistical estimates of past clearing prices, mileage ratios, and event probabilities to determine the revenue generation potential of selling stored energy to energy purchasers 504. For the PBDR programs, controller 506 may use predictions of ambient conditions, facility thermal loads, and thermodynamic models of installed equipment to estimate the resource consumption of subplants 520. Controller 506 may use predictions of the resource consumption to monetize the costs of running the equipment.

Controller 506 may automatically determine (e.g., without human intervention) a combination of PBDR and/or IBDR programs in which to participate over the optimization period in order to maximize economic value. For example, controller 506 may consider the revenue generation potential of IBDR programs, the cost reduction potential of PBDR programs, and the equipment maintenance/replacement costs that would result from participating in various combinations of the IBDR programs and PBDR programs. Controller 506 may weigh the benefits of participation against the costs of participation to determine an optimal combination of programs in which to participate. Advantageously, this allows controller 506 to determine an optimal set of control decisions that maximize the overall value of operating central plant system 500.

In some instances, controller 506 may determine that it would be beneficial to participate in an IBDR program when the revenue generation potential is high and/or the costs of participating are low. For example, controller 506 may receive notice of a synchronous reserve event from an IBDR program which requires central plant system 500 to shed a predetermined amount of power. Controller 506 may determine that it is optimal to participate in the IBDR program if cold thermal energy storage 532 has enough capacity to provide cooling for building 502 while the load on chiller subplant 522 is reduced in order to shed the predetermined amount of power.

In other instances, controller 506 may determine that it would not be beneficial to participate in an IBDR program when the resources required to participate are better allocated elsewhere. For example, if building 502 is close to setting a new peak demand that would greatly increase the PBDR costs, controller 506 may determine that only a small portion of the electrical energy stored in electrical energy storage 533 will be sold to energy purchasers 504 in order to participate in a frequency response market. Controller 506 may determine that the remainder of the electrical energy will be used to power chiller subplant 522 to prevent a new peak demand from being set.

Central Plant Controller

Figure 6:
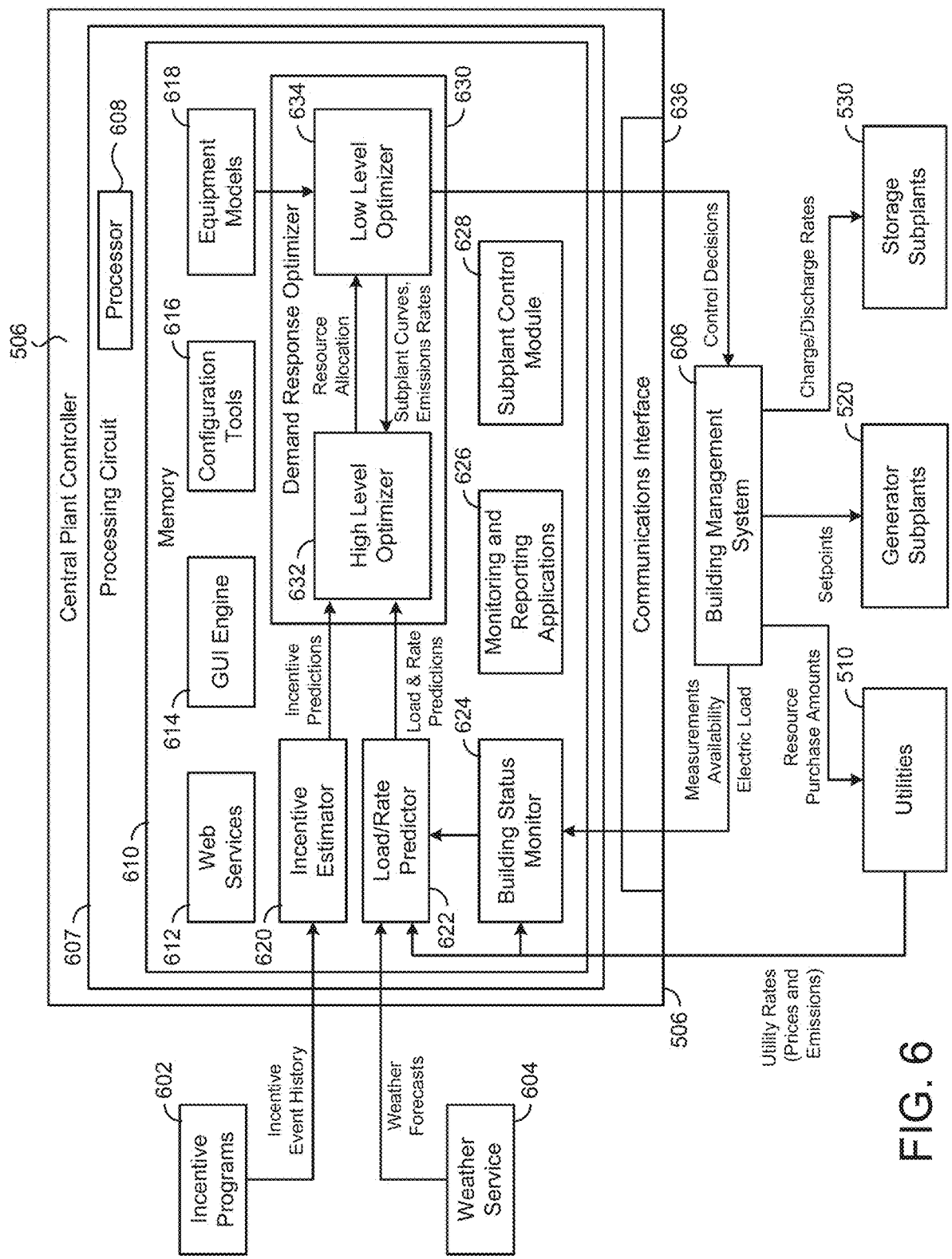
FIG. 6 is block diagram illustrating the central plant controller of FIG. 5 in greater detail, according to an exemplary embodiment.

Referring now to FIG. 6, a block diagram illustrating a central plant controller 506 in greater detail is shown, according to an exemplary embodiment. Central plant controller 506 is shown providing control decisions to a building management system (BMS) 606. In some embodiments, BMS 606 is the same or similar to BMS 400, as described with reference to FIG. 4. The control decisions provided to BMS 606 may include resource purchase amounts for utilities 510, setpoints for generator subplants 520, and/or charge/discharge rates for storage subplants 530.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to central plant controller 506. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520-530 to affect the monitored conditions within the building and to serve the thermal energy loads of the building.

BMS 606 may receive control signals from central plant controller 506 specifying on/off states, charge/discharge rates, and/or setpoints for the subplant equipment. BMS 606 may control the equipment (e.g., via actuators, power relays, etc.) in accordance with the control signals provided by central plant controller 506. For example, BMS 606 may operate the equipment using closed loop control to achieve the setpoints specified by central plant controller 506. In various embodiments, BMS 606 may be combined with central plant controller 506 or may be part of a separate building management system. According to an exemplary embodiment, BMS 606 is a METASYS® brand building management system, as sold by Johnson Controls, Inc.

Central plant controller 506 may monitor the status of the controlled building using information received from BMS 606. Central plant controller 506 may be configured to predict the thermal energy loads (e.g., heating loads, cooling loads, etc.) of the building for plurality of time steps in an optimization period (e.g., using weather forecasts from a weather service 604). Central plant controller 506 may also predict the revenue generation potential of IBDR programs using an incentive event history (e.g., past clearing prices, mileage ratios, event probabilities, etc.) from incentive programs 602. Central plant controller 506 may generate control decisions that optimize the economic value of operating central plant system 500 over the duration of the optimization period subject to constraints on the optimization process (e.g., energy balance constraints, load satisfaction constraints, etc.). The optimization process performed by central plant controller 506 is described in greater detail below.

According to an exemplary embodiment, central plant controller 506 is integrated within a single computer (e.g., one server, one housing, etc.). In various other exemplary embodiments, central plant controller 506 can be distributed across multiple servers or computers (e.g., that can exist in distributed locations). In another exemplary embodiment, central plant controller 506 may integrated with a smart building manager that manages multiple building systems and/or combined with BMS 606.

Central plant controller 506 is shown to include a communications interface 636 and a processing circuit 607. Communications interface 636 may include wired or wireless interfaces (e.g., jacks, antennas, transmitters, receivers, transceivers, wire terminals, etc.) for conducting data communications with various systems, devices, or networks. For example, communications interface 636 may include an Ethernet card and port for sending and receiving data via an Ethernet-based communications network and/or a WiFi transceiver for communicating via a wireless communications network. Communications interface 636 may be configured to communicate via local area networks or wide area networks (e.g., the Internet, a building WAN, etc.) and may use a variety of communications protocols (e.g., BACnet, IP, LON, etc.).

Communications interface 636 may be a network interface configured to facilitate electronic data communications between central plant controller 506 and various external systems or devices (e.g., BMS 606, subplants 520-530, utilities 510, etc.). For example, central plant controller 506 may receive information from BMS 606 indicating one or more measured states of the controlled building (e.g., temperature, humidity, electric loads, etc.) and one or more states of subplants 520-530 (e.g., equipment status, power consumption, equipment availability, etc.). Communications interface 636 may receive inputs from BMS 606 and/or subplants 520-530 and may provide operating parameters (e.g., on/off decisions, setpoints, etc.) to subplants 520-530 via BMS 606. The operating parameters may cause subplants 520-530 to activate, deactivate, or adjust a setpoint for various devices thereof.

Still referring to FIG. 6, processing circuit 607 is shown to include a processor 608 and memory 610. Processor 608 may be a general purpose or specific purpose processor, an application specific integrated circuit (ASIC), one or more field programmable gate arrays (FPGAs), a group of processing components, or other suitable processing components. Processor 608 may be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 may be communicably connected to processor 608 via processing circuit 607 and may include computer code for executing (e.g., by processor 608) one or more processes described herein.

Memory 610 is shown to include a building status monitor 624. Central plant controller 506 may receive data regarding the overall building or building space to be heated or cooled by the central plant via building status monitor 624. In an exemplary embodiment, building status monitor 624 may include a graphical user interface component configured to provide graphical user interfaces to a user for selecting building requirements (e.g., overall temperature parameters, selecting schedules for the building, selecting different temperature levels for different building zones, etc.).

Central plant controller 506 may determine on/off configurations and operating setpoints to satisfy the building requirements received from building status monitor 624. In some embodiments, building status monitor 624 receives, collects, stores, and/or transmits cooling load requirements, building temperature setpoints, occupancy data, weather data, energy data, schedule data, and other building parameters. In some embodiments, building status monitor 624 stores data regarding energy costs, such as pricing information available from utilities 510 (energy charge, demand charge, etc.), or other time-varying characteristics of energy, such as a marginal operating emissions rate for energy provided by utilities 510.

Still referring to FIG. 6, memory 610 is shown to include a load/rate predictor 622. Load/rate predictor 622 may be configured to predict the thermal energy loads ($\hat{\ell}_k$) of the building or campus for each time step k (e.g., k=1 n) of an optimization period. Load/rate predictor 622 is shown receiving weather forecasts from a weather service 604. In some embodiments, load/rate predictor 622 predicts the thermal energy loads $\hat{\ell}_k$ as a function of the weather forecasts. In some embodiments, load/rate predictor 622 uses feedback from BMS 606 to predict loads $\hat{\ell}_k$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 622 receives a measured electric load and/or previous measured load data from BMS 606 (e.g., via building status monitor 624). Load/rate predictor 622 may predict loads $\hat{\ell}_k$ as a function of a given weather forecast ($\hat{\phi}_w$), a day type (day), the time of day (t), and previous measured load data ($Y_{k-1}$). Such a relationship is expressed in the following equation:

$$\hat{\ell}_k = f(\hat{\phi}_w, \text{day}, t | Y_{k-1})$$

In some embodiments, load/rate predictor 622 uses a deterministic plus stochastic model trained from historical load data to predict loads $\hat{\ell}_k$. Load/rate predictor 622 may use any of a variety of prediction methods to predict loads $\hat{\ell}_k$ (e.g., linear regression for the deterministic portion and an AR model for the stochastic portion). Load/rate predictor 622 may predict one or more different types of loads for the building or campus. For example, load/rate predictor 622 may predict a hot water load $\hat{\ell}_{Hot,k}$ and a cold water load $\hat{\ell}_{Cold,k}$ for each time step k within the prediction window. In some embodiments, load/rate predictor 622 makes load/rate predictions using the techniques described in U.S. patent application Ser. No. 14/717,593, titled "Building Management System for Forecasting Time Series Values of Building Variables" and filed May 20, 2015, the entire disclosure of which is incorporated by reference herein.

Load/rate predictor 622 is shown receiving utility rates from utilities 510. Utility rates may indicate a cost or price per unit of a resource (e.g., electricity, natural gas, water, etc.) provided by utilities 510 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 510 or predicted utility rates estimated by load/rate predictor 622.

In some embodiments, the utility rates include demand charges for one or more resources provided by utilities 510. A demand charge may define a separate cost imposed by utilities 510 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 630 may be configured to account for demand charges in the high level optimization process performed by high level optimizer 632. Utilities 510 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 622 may store the predicted loads $\hat{\ell}_k$ and the utility rates in memory 610 and/or provide the predicted loads $\hat{\ell}_k$ and the utility rates to demand response optimizer 630.

Still referring to FIG. 6, memory 610 is shown to include an incentive estimator 620. Incentive estimator 620 may be configured to estimate the revenue generation potential of participating in various incentive-based demand response (IBDR) programs. In some embodiments, incentive estimator 620 receives an incentive event history from incentive programs 602. The incentive event history may include a history of past IBDR events from incentive programs 602. An IBDR event may include an invitation from incentive programs 602 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 620 may use the incentive event history to estimate IBDR event probabilities during the optimization period.

Incentive estimator 620 is shown providing incentive predictions to demand response optimizer 630. The incentive predictions may include the estimated IBDR probabilities, estimated participation requirements, an estimated amount of revenue from participating in the estimated IBDR events, and/or any other attributes of the predicted IBDR events. Demand response optimizer 630 may use the incentive predictions along with the predicted loads $\hat{\ell}_k$ and utility rates from load/rate predictor 622 to determine an optimal set of control decisions for each time step within the optimization period.

Still referring to FIG. 6, memory 610 is shown to include an demand response optimizer 630. Demand response optimizer 630 may perform a cascaded optimization process to optimize the performance of central plant system 500. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating central plant system 500. Control decisions made by high level optimizer may include, for example, load setpoints for each of generator subplants 520, charge/discharge rates for each of storage subplants 530, resource purchase amounts for each type of resource purchased from utilities 510, and/or an amount of each resource sold to energy purchasers 504. In other words, the control decisions may define resource allocation at each time step. The control decisions made by high level optimizer 632 are based on the statistical estimates of incentive event probabilities and revenue generation potential for various IBDR events as well as the load and rate predictions.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 634 receives actual incentive events from incentive programs 602. Low level optimizer 634 may determine whether to participate in the incentive events based on the resource allocation set by high level optimizer 632. For example, if insufficient resources have been allocated to a particular IBDR program by high level optimizer 632 or if the allocated resources have already been used, low level optimizer 634 may determine that central plant system 500 will not participate in the IBDR program and may ignore the IBDR event. However, if the required resources have been allocated to the IBDR program and are available in storage subplants 530, low level optimizer 634 may determine that system 500 will participate in the IBDR program in response to the IBDR event. The cascaded optimization process is described in greater detail with reference to FIG. 7.

Still referring to FIG. 6, memory 610 is shown to include a subplant control module 628. Subplant control module 628 may store historical data regarding past operating statuses, past operating setpoints, and instructions for calculating and/or implementing control parameters for subplants 520-530. Subplant control module 628 may also receive, store, and/or transmit data regarding the conditions of individual devices of the subplant equipment, such as operating efficiency, equipment degradation, a date since last service, a lifespan parameter, a condition grade, or other device-specific data. Subplant control module 628 may receive data from subplants 520-530 and/or BMS 606 via communications interface 636. Subplant control module 628 may also receive and store on/off statuses and operating setpoints from low level optimizer 634.

Data and processing results from demand response optimizer 630, subplant control module 628, or other modules of central plant controller 506 may be accessed by (or pushed to) monitoring and reporting applications 626. Monitoring and reporting applications 626 may be configured to generate real time "system health" dashboards that can be viewed and navigated by a user (e.g., a central plant engineer). For example, monitoring and reporting applications 626 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across central plants in different buildings (real or modeled), different campuses, or the like. Other GUI elements or reports may be generated and shown based on available data that allow users to assess performance across one or more central plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the central plant.

Still referring to FIG. 6, central plant controller 506 may include one or more GUI servers, web services 612, or GUI engines 614 to support monitoring and reporting applications 626. In various embodiments, applications 626, web services 612, and GUI engine 614 may be provided as separate components outside of central plant controller 506 (e.g., as part of a smart building manager). Central plant controller 506 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 506 may be configured to provide the results of any such processing to other databases, tables, XML files, or other data structures for further querying, calculation, or access by, for example, external monitoring and reporting applications.

Central plant controller 506 is shown to include configuration tools 616. Configuration tools 616 can allow a user to define (e.g., via graphical user interfaces, via prompt-driven "wizards," etc.) how central plant controller 506 should react to changing conditions in the central plant subsystems. In an exemplary embodiment, configuration tools 616 allow a user to build and store condition-response scenarios that can cross multiple central plant devices, multiple building systems, and multiple enterprise control applications (e.g., work order management system applications, entity resource planning applications, etc.). For example, configuration tools 616 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 616 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Cascaded Central Plant Optimization

Figure 7:
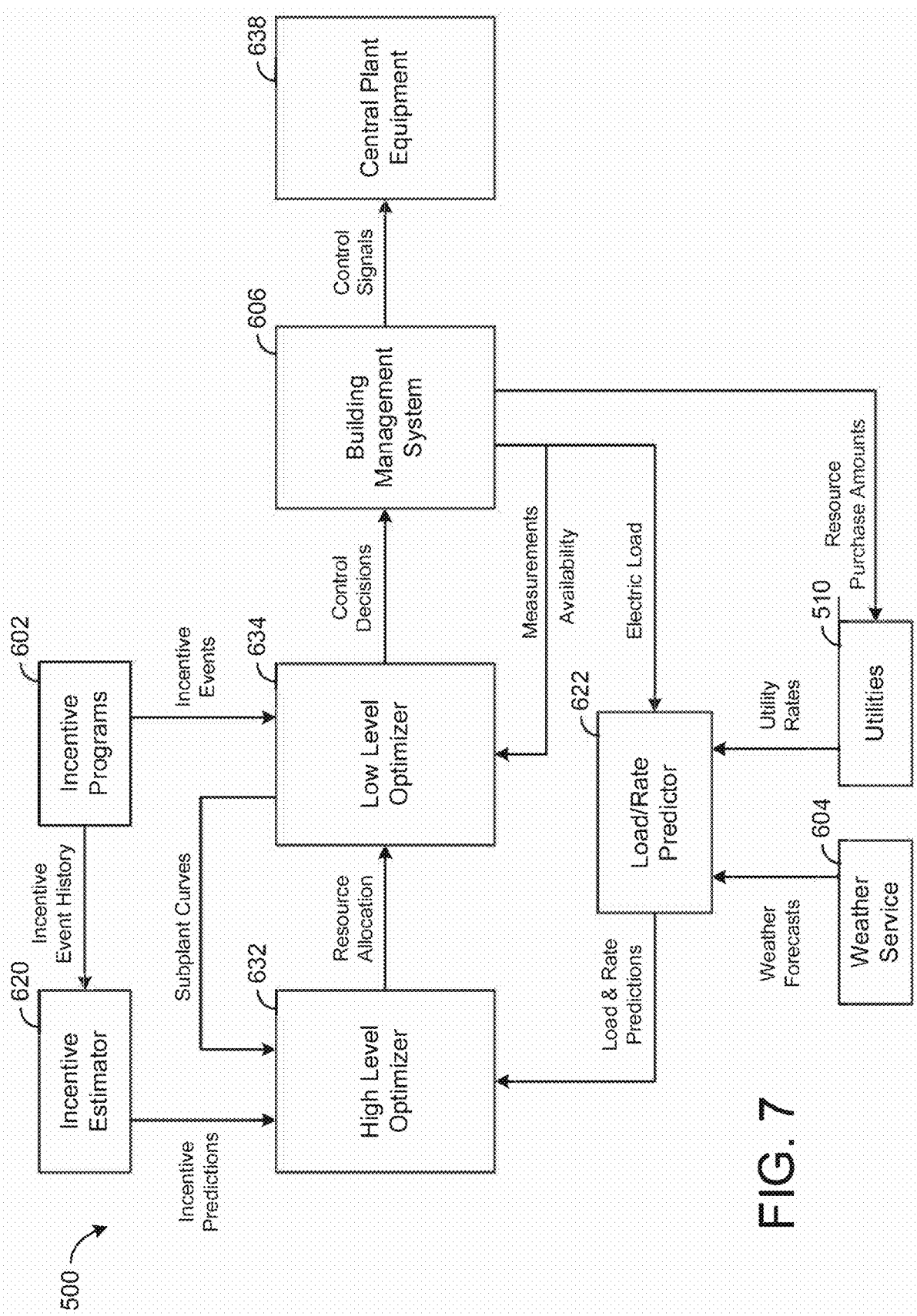
FIG. 7, a block diagram illustrating a portion of the central plant system of FIG. 5 in greater detail, according to an exemplary embodiment.

Referring now to FIG. 7, a block diagram illustrating a portion of central plant system 500 in greater detail is shown, according to an exemplary embodiment. FIG. 7 illustrates the cascaded optimization process performed by demand response optimizer 630 to optimize the performance of central plant system 500. In the cascaded optimization process, high level optimizer 632 performs a subplant level optimization that determines an optimal allocation of resources for each time step in the optimization period in order to optimize the value of operating central plant system 500. Low level optimizer 634 performs an equipment level optimization that determines how to best run each subplant based on the resource allocations determined by high level optimizer 632. For example, low level optimizer 634 may determine on/off states and/or operating setpoints for various devices of the subplant equipment in order to optimize the energy consumption of each subplant while meeting the thermal energy load setpoint for the subplant.

One advantage of the cascaded optimization process performed by demand response optimizer 630 is the optimal use of computational time. For example, the subplant level optimization performed by high level optimizer 632 may use a relatively long time horizon due to the operation of the thermal energy storage. However, the equipment level optimization performed by low level optimizer 634 may use a much shorter time horizon or no time horizon at all since the low level system dynamics are relatively fast (compared to the dynamics of the thermal energy storage) and the low level control of the subplant equipment may be handled by BMS 606. Such an optimal use of computational time makes it possible for demand response optimizer 630 to perform the central plant optimization in a short amount of time, allowing for real-time predictive control. For example, the short computational time enables demand response optimizer 630 to be implemented in a real-time planning tool with interactive feedback.

Another advantage of the cascaded optimization performed by demand response optimizer 630 is that the central plant optimization problem can be split into two cascaded subproblems. The cascaded configuration provides a layer of abstraction that allows high level optimizer 632 to distribute and allocate resources without requiring high level optimizer 632 to know or use any details regarding the particular equipment configuration within each subplant. The interconnections between the subplant equipment within each subplant may be hidden from high level optimizer 632 and handled by low level optimizer 634. For purposes of the subplant level optimization performed by high level optimizer 632, each subplant may be completely defined by one or more subplant curves.

Still referring to FIG. 7, low level optimizer 634 may generate and provide subplant curves to high level optimizer 632. Subplant curves may indicate the rate of resource consumption by each of subplants 520-530 (e.g., electricity use measured in kW, water use measured in L/s, etc.) as a function of the subplant's resource production (i.e., the subplant load). Exemplary subplant curves are shown and described in greater detail with reference to FIGS. 9A-12. In some embodiments, low level optimizer 634 generates subplant curves based on equipment models 618 (e.g., by combining equipment models 618 for individual devices into an aggregate curve for the subplant). Low level optimizer 634 may generate subplant curves by running the low level optimization process for several different loads and weather conditions to generate multiple data points. Low level optimizer 634 may fit a curve to the data points to generate a subplant curves. In other embodiments, low level optimizer 634 provides the data points to high level optimizer 632 and high level optimizer 632 generates the subplant curves using the data points. In some embodiments, the equipment models 618 include information used by the low level optimizer 634 to assess carbon emissions of various equipment and subplants and provide emissions rates to the high level optimizer 632. The emissions rates may be included with the subplant curves and can indicate, for example, rates of carbon emissions per unit of natural gas (or other fuel) consumed by various subplants. The emissions rates provided by the equipment models 618 and/or the low level optimizer 634 can be data-driven functions depending on various factors (e.g., weather, capacity, etc.). In some embodiments, the subplant curves model carbon emissions as an output resource of the subplants which incurs a penalty in an objective function optimized by the low level optimizer 634 and/or the high level optimizer 632.

High level optimizer 632 may receive the load and rate predictions from load/rate predictor 622, the incentive predictions from incentive estimator 620, and the subplant curves and emissions rates from low level optimizer 634. The load predictions may be based on weather forecasts from weather service 604 and/or information from BMS 606 (e.g., a current electric load of the building, measurements from the building, a history of previous loads, a setpoint trajectory, etc.). The utility rate predictions may be based on utility rates received from utilities 510 and/or utility prices from another data source. The incentive predictions may be estimates of IBDR event probabilities and their potential for revenue generation and may be based on a history IBDR events received from incentive programs 602.

High level optimizer 632 may determine an optimal resource allocation for subplants 520-530 (e.g., a subplant load for each subplant) for each time step the optimization period and may provide the allocation of resources as setpoints to low level optimizer 634. Resource allocations may include an amount of each input resource and each output resource consumed or produced by each of generator subplants 520 at each time step. Resource allocations may also include an amount of each resource charged or discharged from storage subplants 530, an amount of each resource purchased from utilities 510, and an amount of each resource sold to energy purchasers 504 for each time step in the optimization period. In some embodiments, high level optimizer 632 determines the resource allocation by maximizing the total operating value of central plant system 500 over the optimization period. For example, high level optimizer 632 may determine a set of control decisions that maximizes a value function. The value function may include IBDR revenue, resource purchase costs, and costs of equipment degradation resulting from the control decisions.

In some instances, the optimal resource allocation may include using storage subplants 530 to store resources during a first time step for use during a later time step. Resource storage may advantageously allow energy and other types of resources to be produced and stored during a first time period when energy prices are relatively low and subsequently retrieved and used during a second time period when energy proves are relatively high. The high level optimization may be different from the low level optimization in that the high level optimization has a longer time constant due to the storage provided by subplants 530.

The high level optimization may be described by the following equation:

$$\theta_{HL}^* = \arg\max_{\theta_{HL}} J_{HL}(\theta_{HL})$$

where $\theta^*_{HL}$ contains the optimal high level decisions (e.g., the optimal resource allocation) for the entire optimization period and $J_{HL}$ is the high level value function. To find the optimal high level decisions $\theta^*_{HL}$, high level optimizer 632 may maximize the high level cost function $J_{HL}$. The high level cost function $J_{HL}$ may include the revenue generated by participating in IBDR programs, the cost of resources purchased from utilities 510, and the cost of equipment degradation over the duration of the optimization period. In some embodiments, the high level cost function $J_{HL}$ is described using the following equation:

$$J_{HL} = \int_t^{t+h}(\$IBDR - \$PBDR - \$BL - \$Penalties)dt$$

where $IBDR is the revenue generated from participating in IBDR programs, $PBDR is the cost of resources purchased from utilities 510, $BL is the cost of losses in battery capacity, and $Penalties is the cost of operating the subplant equipment (e.g., equipment degradation due to start/stop commands). Each of these terms is described in greater detail with reference to FIG. 8.

The decision vector $\theta_{HL}$ may be subject to several constraints. For example, the constraints may require that each of generator subplants 520 not operate at more than its total capacity and that the input resources and output resources of each generator subplant 520 are related as defined by the subplant curves. The constraints may require that storage subplants 530 not charge or discharge too quickly and may constrain the amount of a resource stored in each of subplants 530 between zero and the maximum storage capacity of the subplant. The constraints may also require that resource demand for the building or campus is met. These restrictions lead to both equality and inequality constraints on the high level optimization problem, as described in greater detail with reference to FIG. 8.

Still referring to FIG. 7, low level optimizer 634 may use the resource allocations determined by high level optimizer 632 to determine optimal low level decisions 61L (e.g. binary on/off decisions, flow setpoints, temperature setpoints, etc.) for the subplant equipment. The low level optimization process may be performed for each of subplants 520-530. Low level optimizer 634 may be responsible for determining which devices of each subplant to use and/or the operating setpoints for such devices that will achieve the resource allocation setpoint while minimizing energy consumption.

The low level optimization may be described using the following equation:

$$\theta_{LL}^* = \arg\min_{\theta_{LL}} J_{LL}(\theta_{LL})$$

where $\theta^*_{LL}$ contains the optimal low level decisions and $J_{LL}$ is the low level cost function. To find the optimal low level decisions $\theta^*_{LL}$, low level optimizer 634 may minimize the low level cost function $J_{LL}$. The low level cost function $J_{LL}$ may represent the total energy consumption for all of the equipment in the applicable subplant. The low level cost function $J_{LL}$ may be described using the following equation:

$$J_{LL}(\theta_{LL}) = \sum_{j=1}^{N} t_s \cdot b_j \cdot u_j(\theta_{LL})$$

where N is the number of devices in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

Low level optimizer 634 may minimize the low level cost function $J_{LL}$ subject to inequality constraints based on the capacities of subplant equipment and equality constraints based on energy and mass balances. In some embodiments, the optimal low level decisions °LL are constrained by switching constraints defining a short horizon for maintaining a device in an on or off state after a binary on/off switch. The switching constraints may prevent devices from being rapidly cycled on and off. In some embodiments, low level optimizer 634 performs the equipment level optimization without considering system dynamics. The optimization process may be slow enough to safely assume that the equipment control has reached its steady-state. Thus, low level optimizer 634 may determine the optimal low level decisions $\theta^*_{LL}$ at an instance of time rather than over a long horizon.

Low level optimizer 634 may determine optimum operating statuses (e.g., on or off) for a plurality of devices of the subplant equipment. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear). Low level optimizer 634 may also determine optimum operating setpoints for equipment using nonlinear optimization. Nonlinear optimization may identify operating setpoints that further minimize the low level cost function $J_{LL}$. Low level optimizer 634 may provide the on/off decisions and setpoints to building management system 606 for use in controlling the central plant equipment.

In some embodiments, the low level optimization performed by low level optimizer 634 is the same or similar to the low level optimization process described in U.S. patent application Ser. No. 14/634,615 titled "Low Level Central Plant Optimization" and filed Feb. 27, 2015. The entire disclosure of U.S. patent application Ser. No. 14/634,615 is incorporated by reference herein.

High Level Optimization

Figure 8:
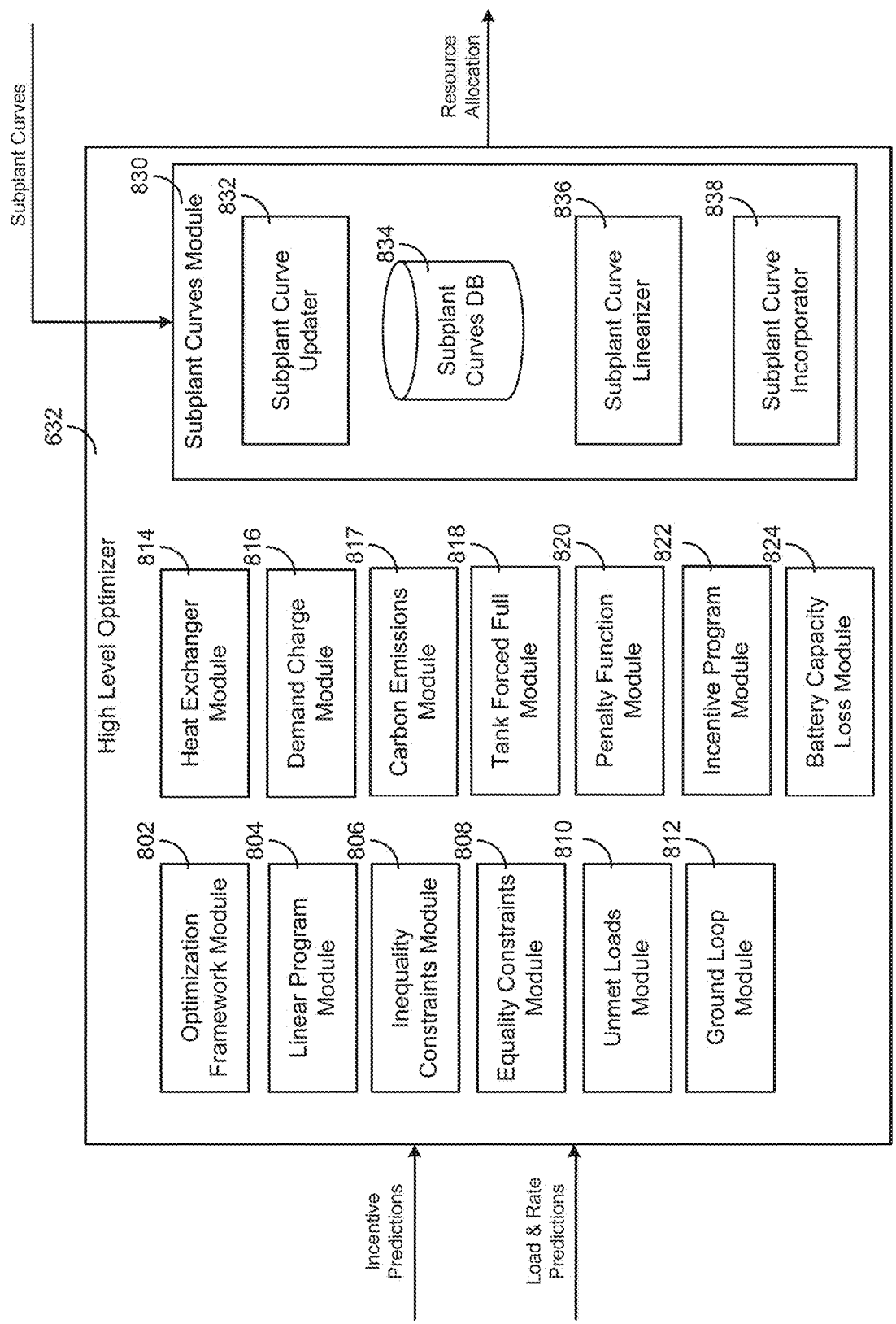
FIG. 8 is a block diagram illustrating a high level optimizer of the central plant controller of FIG. 5 in greater detail, according to an exemplary embodiment.

Referring now to FIG. 8, a block diagram illustrating high level optimizer 632 in greater detail is shown, according to an exemplary embodiment. High level optimizer 632 may receive load and rate predictions from load/rate predictor 622, incentive predictions from incentive estimator 620, and subplant curves from low level optimizer 634. High level optimizer 632 may determine an optimal resource allocation across central plant system 500 as a function of the load and rate predictions, the incentive predictions, and the subplant curves. The optimal resource allocation may include an amount of each resource purchased from utilities 510, an amount of each input and output resource of generator subplants 520, an amount of each resource stored or withdrawn from storage subplants 530, and/or an amount of each resource sold to energy purchasers 504. In some embodiments, the optimal resource allocation maximizes the economic value of operating central plant system 500 while satisfying the predicted loads for the building or campus. High level optimizer 632 may output the optimal resource allocation to low level optimizer 634.

Optimization Framework

High level optimizer 632 is shown to include an optimization framework module 802. Optimization framework module 802 may be configured to select and/or establish an optimization framework for use in determining the optimal resource allocation. In some embodiments, optimization framework module 802 uses linear programming as the optimization framework. A linear programming problem has the following form:

$$\arg\min_x c^T x; \text{ subject to } Ax \le b, Hx = g$$

where c is a cost vector, x is a decision matrix, A and b are a matrix and vector (respectively) which describe inequality constraints on the optimization problem, and H and g are a matrix and vector (respectively) which describe equality constraints on the optimization problem. Revenue generated by IBDR programs may be expressed as negative costs in the cost vector c.

The following paragraphs describe an exemplary linear optimization framework that may be used by high level optimizer 632 to determine the optimal resource allocation. Advantageously, the linear programming framework described herein allows high level optimizer 632 to determine the resource allocation for a long optimization period in a very short timeframe complete with IBDR incentives, PBDR costs, and equipment degradation costs/penalties. However, the linear optimization framework is merely one example of an optimization framework that can be used by high level optimizer 632 and should not be regarded as limiting. It should be understood that in other embodiments, high level optimizer 632 may use any of a variety of other optimization frameworks and/or optimization techniques (e.g., quadratic programming, linear-fractional programming, nonlinear programming, combinatorial algorithms, etc.) to calculate the optimal resource allocation.

Linear Program

Still referring to FIG. 8, high level optimizer 632 is shown to include a linear program module 804. Linear program module 804 may be configured to formulate and solve a linear optimization problem to calculate the optimal resource allocation. For example, linear program module 804 may determine and set values for the cost vector c, the A matrix and the b vector which describe the inequality constraints, and the H matrix and the g vector which describe the equality constraints. Linear program module 804 may determine an optimal decision matrix x* that minimizes the cost function $c^T x$. The optimal decision matrix x* may correspond to the optimal decisions $\theta^*_{HL}$ (for each time step k within an optimization period) that maximize the high level cost function $J_{HL}$, as described with reference to FIG. 7.

Linear program module 804 may be configured to generate decision variables (i.e. variables in the decision matrix x) for each of the plant assets across which resources are allocated. For a central plant that includes chillers, heat recovery chillers, hot water generators, thermal energy storage, and electrical energy storage, the plant assets across which the resources are to be allocated may include a chiller subplant 522, a heat recovery chiller subplant 523, a heater subplant 521 a hot thermal energy storage subplant 531, a cold thermal energy storage subplant 532, and an electrical energy storage subplant 533. For other central plants, the plant assets across which the resources are to be allocated may include fewer or additional subplants, depending on the particular configuration and components of the central plant.

For each subplant across which resources are allocated, linear program module 804 may generate decision variables representing an amount of each input resource to the subplant and each output resource from the subplant for each time step k in the optimization period. For example, a chiller subplant may consume two different types of input resources (e.g., electricity and water) and may produce one output resource (e.g., chilled water). For a generator subplant with two input resources and one output resource, linear program module 804 may add the following variables to the decision matrix x:

$$x = [\ldots x_{sp_n,in_1,1} \ldots h\, x_{sp_n,in_2,1} \ldots h\, x_{sp_n,out_1,1} \ldots h \cdots ]^T$$

where $x_{sp_n,in_1,1 \ldots h}$, $x_{sp_n,in_2,1 \ldots h}$, and $x_{sp_n,out_1,1 \ldots h}$ are h-dimensional vectors representing amounts of the first input resource $in_1$, the second input resource $in_2$, and the first output resource $out_1$ allocated to the nth subplant $sp_n$ for each of the h time steps within the optimization period. Linear program module 804 may repeat this process for each of generator subplants 520, adding one or more input resource decision variables and one or more output resource decision variables for each generator subplant.

Decision variables representing the input resources and output resources of a subplant may have no direct costs associated with them. Therefore, linear program module 804 may add a zero cost element to the cost vector c for each decision variable representing an input resource or output resource. For example, for a generator subplant with two input resources and one output resource, linear program module 804 may add the following elements to the cost vector c:

$$c = [\ldots 0\, 0\, 0 \ldots]^T$$

For each type of resource allocated, linear program module 804 may generate a decision variable representing an amount of the resource stored or discharged from storage subplants 530 for each time step k in the optimization period. In some embodiments, each storage subplant stores and/or discharges a different type of resource. For example, cold TES subplant 532 may store and discharge cold thermal energy (e.g., cold water), whereas electrical storage subplant 533 may store and discharge electrical energy. In other embodiments, multiple storage subplants 530 may store/discharge the same type of resource. In various embodiments, linear program module 804 may generate a single storage/discharge variable for each type of resource or a storage/discharge variable for each of subplants 530, even if multiple subplants 530 store/discharge the same type of resource.

Linear program module 804 may also generate a decision variable representing an amount of overproduction (if any) and a decision variable representing an amount of underproduction (if any) for each type of resource. Underproduction may occur when the amount of a resource provided to the building or campus is less than the demand for the resource. Conversely, overproduction may occur when the amount of a resource provided to the building or campus exceeds the demand for the resource. For each type of resource, linear program module 804 may add the following variables to the decision matrix x:

$$x = [\ldots x_{resource_p,under,1 \ldots h}\, x_{resource_p,over,1 \ldots h}\, x_{resource_p,storage,1 \ldots h} \cdots]^T$$

where $x_{resource_p,under,1 \ldots h}$ and $x_{resource_p,over,1 \ldots h}$ are h-dimensional vectors representing amounts of underproduction and overproduction of the pth resource for each of the h time steps within the optimization period. $x_{resource_p,storage,1 \ldots h}$ is a h-dimensional vector representing an amount of the pth resource drawn from storage subplants 530 for each of the h time steps. The storage draw may be positive if the resource is being withdrawn from storage subplants 530 or negative if the resource is being stored in storage subplants 530.

Decision variables representing the storage draw from subplants 530 may have no direct costs associated with them. Therefore, linear program module 804 may add a zero cost element to the cost vector c for each decision variable representing a storage draw. However, linear program module 804 may assign a high cost to decision variables representing overproduction and/or underproduction. For example, for a particular resource p, linear program module 804 may add the following elements to the cost vector c:

$$c = [\ldots M\, M\, 0 \ldots]^T$$

where M is the cost assigned to overproduction and underproduction of resource p and 0 is the cost assigned to the storage draw of resource p. Advantageously, assigning a high cost to overproduction and underproduction ensures that high level optimizer 632 does not select a set of decision variables that results in overproduction and/or underproduction unless the central plant is running at full capacity.

For each source from which resources can be purchased (e.g., utilities 510), linear program module 804 may generate a decision variable representing an amount of each resource purchased for each time step k in the optimization period. In some embodiments, each resource source provides a different type of resource. For example, electric utility 511 may provide electricity, whereas natural gas utility 513 may provide natural gas. For each resource source, linear program module 804 may add the following decision variable to the decision matrix x:

$$x = [x_{resource_p,source_m,1 \ldots h} \cdots]^T$$

where $x_{resource_p,source_m}$ is the amount of resource p purchased from source m for each of the h time steps in the optimization period. Linear program module 804 may repeat this process for each of resource source, adding a resource purchase variable for each type of resource purchased.

Decision variables representing resource purchases may have a direct cost associated with them. Therefore, linear program module 804 may add a non-zero cost to the cost vector c for each decision variable representing a resource purchase. For example, linear program module 804 may add the following element to the cost vector c:

$$c = [\ldots c_{resource_p,source_m,1 \ldots h} \cdots]^T$$

where $c_{resource_p,source_m,1 \ldots h}$ is the cost of purchasing resource p from source m at each of the h time steps in the optimization period.

In some embodiments, linear program module 804 uses the load and rate predictions to formulate the linear program. For example, linear program module 804 may use the load predictions to determine a demand for each type of resource. The demand for each resource may be used to determine the amount of overproduction and/or underproduction. Linear program module 804 may use the rate predictions to determine values for the elements in cost vector c associated with resource purchases.

In some embodiments, linear program module 804 formulates the linear program for the simple case in which only resource purchase costs and over/underproduction are considered. Linear program module 804 may use inputs from inequality constraints module 806, equality constraints module 808, unmet loads module 810, ground loop module 812, heat exchanger module 814, demand charge module 816, tank forced full module 818, penalty function module 820, incentive program module 822, battery capacity loss module 824, and/or subplant curves module 830 to determine and set values for the various matrices and vectors in the linear program. Modules 806-830 may modify the cost vector c, the A matrix, the b vector, the H matrix, and/or the g vector to provide additional enhancements and/or functionality to the linear program. The inputs provided by modules 806-830 are described in greater detail below.

Linear program module 804 may use any of a variety of linear optimization techniques to solve the linear optimization problem. For example, linear program module 804 may use basis exchange algorithms (e.g., simplex, crisscross, etc.), interior point algorithms (e.g., ellipsoid, projective, path-following, etc.), covering and packing algorithms, integer programming algorithms (e.g., cutting-plant, branch and bound, branch and cut, branch and price, etc.), or any other type of linear optimization algorithm or technique to solve the linear program subject to the optimization constraints. For embodiments in which nonlinear optimization is used, linear program module 804 may use any of a variety of nonlinear optimization techniques to solve the nonlinear optimization problem.

Inequality Constraints

Still referring to FIG. 8, high level optimizer 632 is shown to include an inequality constraints module 806. Inequality constraints module 806 may formulate or define one or more inequality constraints on the optimization problem solved by linear program module 804. In some instances, inequality constraints module 806 defines inequality constraints on the decision variables corresponding to the loads on generator subplants 520 for each time step k within optimization period. For example, each of subplants 520 may have two capacity constraints given by the following equations:

$$x_{sp_n} \leq x_{sp_n,max_1} \quad \forall k \in \text{horizon}$$

$$x_{sp_n} \geq 0 \quad \forall k \in \text{horizon}$$

where $x_{sp_n}$ is the output of the nth subplant during time step k and $x_{sp_n,max_1}$ is the maximum capacity of the nth subplant with respect to a first output resource. The first capacity constraint requires the output $x_{sp_n}$ of the subplant to be less than or equal to the maximum capacity $x_{sp_n,max_1}$ of the subplant for each time step k within the optimization period. The second capacity constraint requires the output $x_{sp_n}$ of the subplant to be greater than or equal to zero for each time step k within the optimization period.

As previously described, the input and output resources for each generator subplant 520 may be defined by the decision variables:

$$x = [x_{sp_n,in_1,1} \ldots h \, x_{sp_n,in_2,1} \ldots h \, x_{sp_n,out_1,1} \ldots h \cdots]^T$$

The inequality constraints for each subplant 520 can be placed in the form Ax≤b by defining the A matrix and the b vector as follows:

$$A = \begin{bmatrix} \ldots & 0 & 0 & I_h & \ldots \\ \ldots & 0 & 0 & -I_h & \ldots \end{bmatrix}, b = \begin{bmatrix} \vdots \\ x_{sp_n,max_1} \\ 0_h \\ \vdots \end{bmatrix}$$

where $I_h$ represents either an h by h identity matrix or an h by 1 ones vector, $0_h$ represents either an h by h zero matrix or an h by 1 zero vector, and $x_{sp_n,max_1}$ is the maximum capacity of subplant n. Inequality constraints module 806 may formulate similar inequality constraints for each of generator subplants 520.

Inequality constraints module 806 may formulate or define inequality constraints on the decision variables representing the draw from storage subplants 530 for each time step k within the optimization period. For example, each of subplants 530 may have two capacity constraints given by the following equations:

$$x_{storage_p} \leq x_{discharge_{p,max}} \quad \forall k \in \text{horizon}$$

$$-x_{storage_p} \leq x_{charge_{p,max}} \quad \forall k \in \text{horizon}$$

where $x_{storage_p}$ is the rate at which the pth storage subplant is being discharged at time step k, $x_{discharge_{p,max}}$ is the maximum discharge rate of the pth storage subplant, and $x_{charge_{p,max}}$ is the maximum charge rate of the pth storage subplant. Positive values for $x_{storage_p}$ indicate that the storage subplant is discharging and negative load values for $x_{storage_p}$ indicate that the storage subplant is charging. The first capacity constraint requires the discharge rate $x_{storage_p}$ for each of storage subplants 530 to be less than or equal to the maximum discharge rate $x_{discharge_{p,max}}$ of the subplant for each time step k within the optimization period. The second capacity constraint requires the negative discharge rate $-x_{storage_p}$ (i.e., the charge rate) for each of subplants 530 to be less than or equal to the maximum charge rate $x_{charge_{p,max}}$ of the subplant for each time step k within the optimization period. Each of storage subplants 530 may also have capacity constraints that require the amount of the stored resource to be no less than zero and no greater than the maximum capacity of the storage.

The inequality constraints for storage subplants 530 can be placed in the form Ax≤b by defining the A matrix and the b vector as follows:

$$A = \begin{bmatrix} \ldots & 0 & 0 & I_h & \ldots \\ \ldots & 0 & 0 & -I_h & \ldots \\ \ldots & 0 & 0 & T_s\Delta_h & \ldots \\ \ldots & 0 & 0 & -T_s\Delta_h & \ldots \end{bmatrix}, b = \begin{bmatrix} \vdots \\ x_{discharge_{p,max}} \\ x_{charge_{p,max}} \\ C_{storage_{p,0}} \\ C_{storage_{p,max}} - C_{storage_{p,0}} \\ \vdots \end{bmatrix}$$

where $C_{storage_{p,0}}$ is the current state of charge of storage subplant p (e.g., at time step k=0), $C_{storage_{p,max}}$ is the maximum storage capacity of storage subplant p, $T_s$ is the duration of one time step, and $\Delta h$ is a lower diagonal matrix of ones. Inequality constraints module 806 may generate similar inequality constraints for each of storage subplants 530.

Inequality constraints module 806 may generate inequality constraints that limit the maximum rate at which resources can be purchased from utilities 510. As previously described, the decision matrix x may include variables representing the amount of each resource purchased from utilities 510:

$$x = [ \ldots x_{resource_p,source_m,1} \ldots h \cdots ]^T$$

where $x_{resource_p,source_m}$ is the amount of resource p purchased from source m for each of the h time steps in the optimization period. Inequality constraints module 806 may generate the following inequality constraints to limit the purchase amount of resource p to no greater than the maximum allowable purchase during each time step:

$$A = [\ldots \; I_h \; \ldots], b = \begin{bmatrix} \vdots \\ x_{source_{m,max}} \\ \vdots \end{bmatrix}$$

where $x_{source_{m,max}}$ is the maximum allowable purchase from source m.

Inequality constraints module 806 may implement an electrical demand constraint for the electric power purchased from utilities 510. Inequality constraints module 806 may require that the electric power purchased be less than or equal to a maximum electrical demand $P_{elec,max}$ by defining the A matrix and the b vector as follows:

$$A = [\ldots \ x_{elec}I_h \ \ldots], b = \begin{bmatrix} \vdots \\ P_{elec,max}I_h \\ \vdots \end{bmatrix}$$

where $x_{elec}$ represents the electricity purchased from utilities 510 and $P_{elec,max}$ is the maximum electrical demand for the central plant system.

Equality Constraints

Still referring to FIG. 8, high level optimizer 632 is shown to include an equality constraints module 808. Equality constraints module 808 may formulate or define one or more equality constraints on the optimization problem solved by linear program module 804. The equality constraints may ensure that the predicted resource demand of the building or campus are satisfied for each time step k in the optimization period. Equality constraints module 808 may formulate an equality constraint for each type of resource (e.g., hot water, cold water, electricity etc.) to ensure that the demand for the resource is satisfied. The equality constraints may be given by the following equation:

$$\sum_{i=1}^{n_s} x_{p,i,k} = \hat{\ell}_{p,k} \ \forall \ k \in \text{horizon}$$

where $x_{p,i,k}$ is the resource output of type p (e.g., hot water, cold water, etc.) by the ith subplant during time step k, $n_s$ is the total number of subplants capable of outputting resource p, and $\hat{\ell}_{p,k}$ is the predicted demand for resource type p at time step k. The predicted resource demand may be received as load predictions from load/rate predictor 622.

In some embodiments, the predicted resource demands include a predicted hot water thermal energy load $\hat{\ell}_{Hot,k}$, a predicted cold water thermal energy load $\hat{\ell}_{Cold,k}$, and a predicted electricity load $\hat{\ell}_{Elec,k}$ for each time step k. The predicted hot water thermal energy load $\hat{\ell}_{Hot,k}$ may be satisfied by the combination of heater subplant 521, heat recovery chiller subplant 523, and hot TES subplant 532. The predicted cold water thermal energy load $\hat{\ell}_{Cold,k}$ may be satisfied by the combination of chiller subplant 522, heat recovery chiller subplant 523, and cold TES subplant 532. The predicted electricity load $\hat{\ell}_{Elec,k}$ may include the electric demand of the building and may be satisfied by the combination of electricity subplant 525, electric utility 511, and electrical energy storage subplant 533. Electricity sold to energy purchasers 504 and electricity consumed by generator subplants 520 may add to the predicted electricity load $\hat{\ell}_{Elec,k}$.

The equality constraints can be placed in the form Hx=g by defining the H matrix and the g vector as follows:

$$H = \begin{bmatrix} I_h & -I_h & 0_h & 0_h \\ I_h & -I_h & 0_h & 0_h \\ I_h & -I_h & I_h & -I_h \end{bmatrix}, g = \begin{bmatrix} \hat{\ell}_{Cold,1\ldots h} \\ \hat{\ell}_{Hot,1\ldots h} \\ \hat{\ell}_{Elec,1\ldots h} \end{bmatrix}$$

where $\hat{\ell}_{Cold,1\ldots h}$, $\hat{\ell}_{Hot,1\ldots h}$, and $\hat{\ell}_{Elec,1\ldots h}$ are h-dimensional vectors of predicted cold water loads, predicted hot water loads, and predicted electricity loads for the building or campus at each of the h time steps. The first column of the H matrix applies to any output of the corresponding resource (i.e., resource production) from subplants 520-530. The second column of the H matrix applies to any input of the corresponding resource (i.e., consumption consumption) by subplants 520-530. The third column of the H matrix applies to any purchase of the corresponding resource from utilities 510. The fourth column of the H matrix applies to any sale of the corresponding resource to energy purchasers 504. For central plants that provide one or more additional types of resource, an additional row may be added to the H matrix and the g vector to define the equality constraints for each additional resource provided by the central plant.

In some embodiments, equality constraints module 808 augments the H matrix and the g vector to define relationships between the input resources and output resources of various subplants. The relationships between input and output resources may be defined by subplant curves. For example, the subplant curve for chiller subplant 522 may specify that each unit of cold thermal energy (e.g., kW) produced as an output resource requires 0.15 kW of electricity and 0.5 gal/hr of water as input resources. In this example, equality constraints module 808 may augment the H matrix and the g vector as follows:

$$H = \begin{bmatrix} \ldots & 6.67I_h & 0_h & -I_h \\ \ldots & 0_h & 2I_h & -I_h \end{bmatrix}, g = \begin{bmatrix} 0_h \\ 0_h \end{bmatrix}$$

The first row indicates that the amount of the output resource (e.g., cold water) produced is 6.67 times greater than the amount of the first input resource (e.g., electricity). In other words, 6.67 times the amount of the first input resource equals the output resource (e.g., 0.15*6.67~1.0). The second row indicates that the amount of the output resource (e.g., cold water) produced is 2 times greater than the amount of the second input resource (e.g., water). In other words, 2 times the amount of the second input resource equals the output resource (e.g., 0.5*2 ~1.0). Equality constraints based on subplant curves are described in greater detail below with reference to subplant curves module 830.

Unmet Load Incorporation

Still referring to FIG. 8, high level optimizer 632 is shown to include an unmet loads module 810. In some instances, the central plant equipment may not have enough capacity or reserve storage to satisfy the predicted resource demand, regardless of how the resources are allocated. In other words, the high level optimization problem may have no solution that satisfies all of the inequality and equality constraints, even if the applicable subplants are operated at maximum capacity. Unmet loads module 810 may be configured to modify the high level optimization problem to account for this possibility and to allow the high level optimization to find the solution that results in the minimal amount of unmet loads.

In some embodiments, unmet loads module 810 modifies the decision variable matrix x by introducing a slack variable for each type of resource. The slack variables represent an unsatisfied (e.g., unmet, deferred, etc.) amount of each type of resource. For example, unmet loads module 810 may modify the decision variable matrix x as follows:

$$x = [\ldots x_{ColdUnmet,1 \ldots h}, x_{HotUnmet,1 \ldots h}, x_{ElecUnmet,1 \ldots h} \cdots]^T$$

where $x_{ColdUnmet,1 \ldots h}$, $x_{HotUnmet,1 \ldots h}$, and $x_{ElecUnmet,1 \ldots h}$ are h-dimensional vectors representing a total deferred cold thermal energy load, a total deferred hot thermal energy load, and a total deferred electrical load respectively, at each time step k within the optimization period. In some embodiments, the decision variables $x_{ColdUnmet,1 \ldots h}$, $x_{HotUnmet,1 \ldots h}$, and $x_{ElecUnmet,1 \ldots h}$ represent total deferred loads that have accumulated up to each time step k rather than the incremental deferred load at each time step. The total deferred load may be used because any deferred load is likely to increase the required load during subsequent time steps.

Unmet loads module 810 may modify the equality constraints to account for any deferred thermal energy loads. The modified equality constraints may require that the predicted thermal energy loads are equal to the total loads satisfied by subplants 520-530 plus any unsatisfied thermal energy loads. The modified equality constraints can be placed in the form Hx=g by defining the H matrix and the g vector as follows:

$$H = \begin{bmatrix} I_h & -I_h & 0_h & 0_h & I_h - D_{-1} & 0_h & 0_h \\ I_h & -I_h & 0_h & 0_h & 0_h & I_h - D_{-1} & 0_h \\ I_h & -I_h & I_h & -I_h & 0_h & 0_h & I_h - D_{-1} \end{bmatrix},$$

$$g = \begin{bmatrix} \hat{\ell}_{Cold,1 \ldots h} \\ \hat{\ell}_{Hot,1 \ldots h} \\ \hat{\ell}_{Elc,1 \ldots h} \end{bmatrix}$$

where $D_{-1}$ is a lower diagonal matrix of ones.

Unmet loads module 810 may modify the cost vector c to associate cost values with any unmet loads. In some embodiments, unmet loads module 810 assigns unmet loads a relatively higher cost compared to the costs associated with other types of loads in the decision variable matrix x. Assigning a large cost to unmet loads ensures that the optimal solution to the high level optimization problem uses unmet loads only as a last resort (i.e., when the optimization has no solution without using unmet loads). Accordingly, linear program module 804 may avoid using unmet loads if any feasible combination of equipment is capable of satisfying the predicted thermal energy loads. In some embodiments, unmet loads module 810 assigns a cost value to unmet loads that allows linear program module 804 to use unmet loads in the optimal solution even if the central plant is capable of satisfying the predicted thermal energy loads. For example, unmet loads module 810 may assign a cost value that allows linear program module 804 to use unmet loads if the solution without unmet loads would be prohibitively expensive and/or highly inefficient.

Subplant Curve Incorporation

Still referring to FIG. 8, high level optimizer 632 is shown to include a subplant curves module 830. In the simplest case described with reference to linear program module 804, it was assumed that the resource consumption of each subplant is a linear function of the thermal energy load produced by the subplant. However, this assumption may not be true for some subplant equipment, much less for an entire subplant. Subplant curves module 830 may be configured to modify the high level optimization problem to account for subplants that have a nonlinear relationship between resource consumption and load production.

Subplant curves module 830 is shown to include a subplant curve updater 832, a subplant curves database 834, a subplant curve linearizer 836, and a subplant curves incorporator 838. Subplant curve updater 832 may be configured to request subplant curves for each of subplants 520-530 from low level optimizer 634. Each subplant curve may indicate an amount of resource consumption by a particular subplant (e.g., electricity use measured in kW, water use measured in L/s, etc.) as a function of the subplant load. Exemplary subplant curves are shown and described in greater detail with reference to FIGS. 9A-12.

In some embodiments, low level optimizer 634 generates the subplant curves by running the low level optimization process for various combinations of subplant loads and weather conditions to generate multiple data points. Low level optimizer 634 may fit a curve to the data points to generate the subplant curves and provide the subplant curves to subplant curve updater 832. In other embodiments, low level optimizer 634 provides the data points to subplant curve updater 832 and subplant curve updater 832 generates the subplant curves using the data points. Subplant curve updater 832 may store the subplant curves in subplant curves database 834 for use in the high level optimization process.

Figure 10:
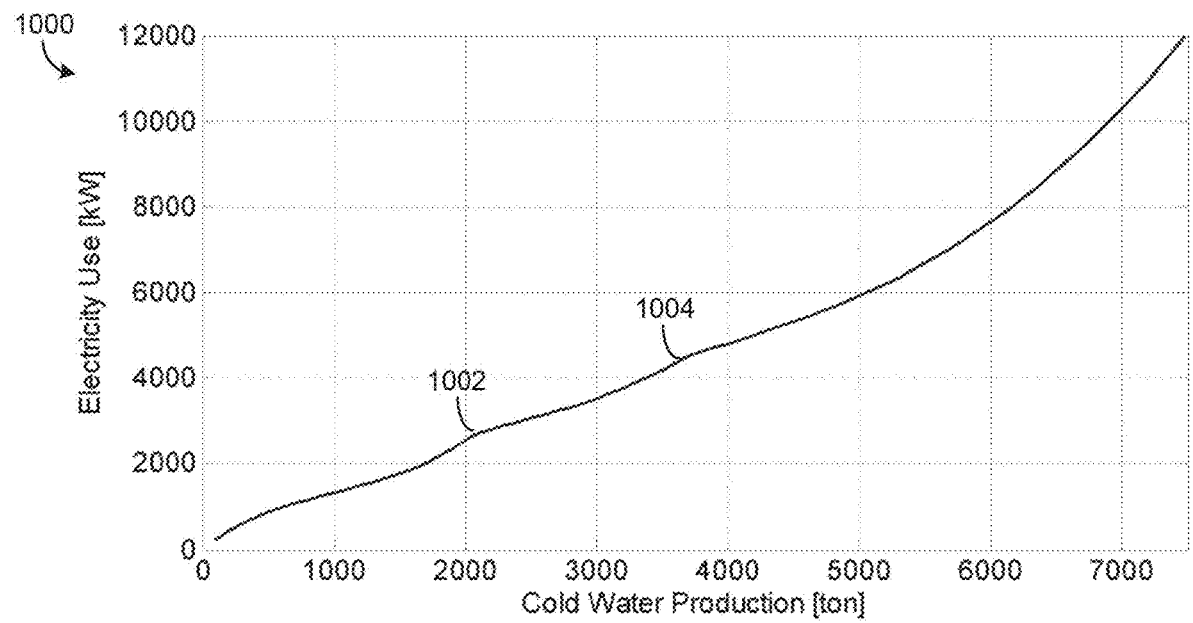
FIG. 10 is a non-convex and nonlinear subplant curve that may be generated from experimental data or by combining equipment curves for individual devices of the central plant, according to an exemplary embodiment.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 618. For some devices, the device efficiency curves may indicate that resource consumption is a U-shaped function of load. Accordingly, when multiple device efficiency curves are combined into a subplant curve for the entire subplant, the resultant subplant curve may be a wavy curve as shown in FIG. 10. The waves are caused by a single device loading up before it is more efficient to turn on another device to satisfy the subplant load.

Figure 11:
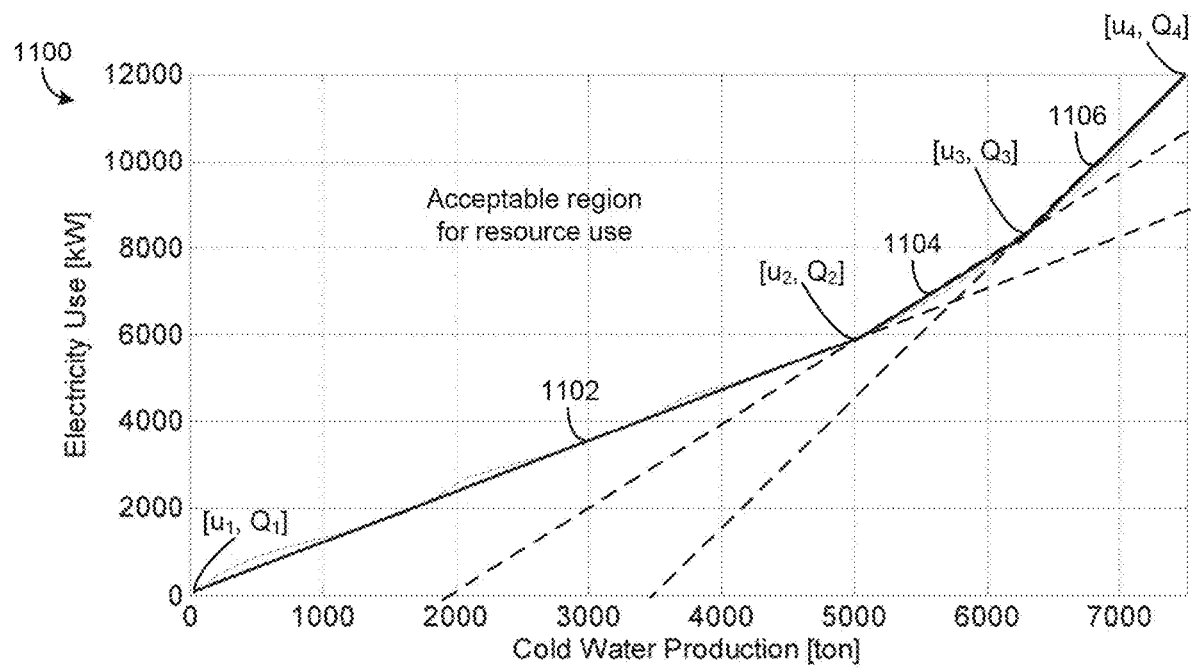
FIG. 11 is a linearized subplant curve that may be generated from the subplant curve of FIG. 10 by converting the non-convex and nonlinear subplant curve into piecewise linear segments, according to an exemplary embodiment.

Subplant curve linearizer 836 may be configured to convert the subplant curves into convex curves. A convex curve is a curve for which a line connecting any two points on the curve is always above or along the curve (i.e., not below the curve). Convex curves may be advantageous for use in the high level optimization because they allow for an optimization process that is less computationally expensive relative to an optimization process that uses non-convex functions. Subplant curve linearizer 836 may be configured to break the subplant curves into piecewise linear segments that combine to form a piecewise-defined convex curve. An unmodified subplant curve 1000 and a linearized subplant curve 1100 generated by subplant curve linearizer 836 are shown in FIGS. 10 and 11, respectively. Subplant curve linearizer 836 may store the linearized subplant curves in subplant curves database 834.

In some embodiments, the subplant curves model carbon emissions as an output resource from the corresponding subplant. For example, the subplant curves may define a relationship between (1) the amount or rate of on-site carbon emissions by a subplant and (2) the production and/or consumption of other resources by that subplant. In such embodiments, the carbon emissions could be modeled as a type of resource that is related to the other resources in the subplant curve, such that the subplant curve represents a relationship carbon emissions and any other represented resource production or consumption by a subplant. For example, if a given type of device (e.g., boiler) has three resources in its subplant curve (e.g., water, natural gas, and hot water) in some embodiments, in the example here the subplant curve also models carbon emissions as a fourth resource that is related to the other three resources. In such an embodiments, carbon emissions can be considered as being modeled as a function of water usage, natural gas consumption, and/or hot water production.

Still referring to FIG. 8, subplant curves module 830 is shown to include a subplant curve incorporator 838. Subplant curve incorporator 838 may be configured to modify the high level optimization problem to incorporate the subplant curves into the optimization. In some embodiments, subplant curve incorporator 838 modifies the decision matrix x to include one or more decision vectors representing the resource consumption of each subplant. In other embodiments, the decision matrix x is formulated by linear program module 804 to include the input resources and the output resources of each subplant, as shown in the following equation:

$$x = [\ldots x_{sp_n,in_1,1} \ldots h \; x_{sp_n,in_2,1} \ldots h \\ x_{sp_n,out_1,1} \ldots h \cdots ]^T$$

Subplant curve incorporator 838 may modify the inequality constraints to ensure that the proper amount of each resource is consumed to serve the predicted thermal energy loads. In some embodiments, subplant curve incorporator 838 formulates inequality constraints that force the resource usage for each resource in the epigraph of the corresponding linearized subplant curve. For example, chiller subplant 522 may have a linearized subplant curve that indicates the electricity use of chiller subplant 522 (i.e., input resource $in_1$) as a function of the cold water production of chiller subplant 522 (i.e., output resource $out_1$). Such a linearized subplant curve 1100 is shown in FIG. 11. The linearized subplant curve may include a first line segment connecting point $[u_1, Q_1]$ to point $[u_2, Q_2]$, a second line segment connecting point $[u_2, Q_2]$ to point $[u_3, Q_3]$, and a third line segment connecting point $[u_3, Q_3]$ to point $[u_4, Q_4]$.

Subplant curve incorporator 838 may formulate an inequality constraint for each piecewise segment of the subplant curve that constrains the value of the decision variable representing chiller electricity use to be greater than or equal to the amount of electricity use defined by the line segment for the corresponding value of the cold water production. The subplant curve constraints for the electricity use of chiller subplant 522 can be placed in the form $Ax \leq b$ by defining the A matrix and the b vector as follows:

$$A = \begin{bmatrix} \ldots & [-(u_2-u_1)]I_n & \ldots & [(Q_2-Q_1)]I_n & 0_n & \ldots \\ \ldots & [-(u_3-u_2)]I_n & \ldots & [(Q_3-Q_2)]I_n & 0_n & \ldots \\ \ldots & [-(u_4-u_3)]I_n & \ldots & [(Q_4-Q_3)]I_n & 0_n & \ldots \end{bmatrix},$$

$$b = \begin{bmatrix} Q_1 u_2 - Q_2 u_1 \\ Q_2 u_3 - Q_3 u_2 \\ Q_3 u_4 - Q_4 u_3 \end{bmatrix}$$

Similar inequality constraints can be formulated for other subplant curves. For example, subplant curve incorporator 838 may generate a set of inequality constraints for the water consumption of chiller subplant 522 using the points defining the linearized subplant curve for the water consumption of chiller subplant 522 as a function of cold water production. In some embodiments, the water consumption of chiller subplant 522 is equal to the cold water production and the linearized subplant curve for water consumption includes a single line segment connecting point $[u_5, Q_5]$ to point $[u_6, Q_6]$ (as shown in FIG. 9B). The subplant curve constraints for the cold water consumption of chiller subplant 522 can be placed in the form $Ax \leq b$ by defining the A matrix and the b vector as follows:

$$A = [\ldots [-(u_6-u_5)]I_n \ldots 0_n[(Q_6-Q_5)]I_n \ldots], b = [(Q_5 u_6 - Q_6 u_5)]$$

Subplant curve incorporator 838 may repeat this process for each subplant curve for chiller subplant 522 and for the other subplants of the central plant to define a set of inequality constraints for each subplant curve.

The inequality constraints generated by subplant curve incorporator 838 ensure that high level optimizer 632 keeps the resource consumption above all of the line segments of the corresponding subplant curve. In most situations, there is no reason for high level optimizer 632 to choose a resource consumption value that lies above the corresponding subplant curve due to the economic cost associated with resource consumption. High level optimizer 632 can therefore be expected to select resource consumption values that lie on the corresponding subplant curve rather than above it.

The exception to this general rule is heat recovery chiller subplant 523. The equality constraints for heat recovery chiller subplant 523 provide that heat recovery chiller subplant 523 produces hot water at a rate equal to the subplant's cold water production plus the subplant's electricity use. The inequality constraints generated by subplant curve incorporator 838 for heat recovery chiller subplant 523 allow high level optimizer 632 to overuse electricity to make more hot water without increasing the amount of cold water production. This behavior is extremely inefficient and only becomes a realistic possibility when the demand for hot water is high and cannot be met using more efficient techniques. However, this is not how heat recovery chiller subplant 523 actually operates.

To prevent high level optimizer 632 from overusing electricity, subplant curve incorporator 838 may check whether the calculated amount of electricity use (determined by the optimization algorithm) for heat recovery chiller subplant 523 is above the corresponding subplant curve. In some embodiments, the check is performed after each iteration of the optimization algorithm. If the calculated amount of electricity use for heat recovery chiller subplant 523 is above the subplant curve, subplant curve incorporator 838 may determine that high level optimizer 632 is overusing electricity. In response to a determination that high level optimizer 632 is overusing electricity, subplant curve incorporator 838 may constrain the production of heat recovery chiller subplant 523 at its current value and constrain the electricity use of subplant 523 to the corresponding value on the subplant curve. High level optimizer 632 may then rerun the optimization with the new equality constraints.

Ground Loop and Heat Exchanger Incorporation

Still referring to FIG. 8, high level optimizer 632 is shown to include a ground loop module 812 and a heat exchanger module 814. In some embodiments, the central plant includes a heat exchanger configured to transfer heat between a hot water loop and a condenser water loop. In some embodiments, the central plant includes a ground loop that serves as heat rejection for chiller subplant 522 and/or heat extraction for heat recovery chiller subplant 523.

Ground loop module 812 and heat exchanger module 814 may be configured to modify the optimization problem to account for heat transfer resulting from operation of the heat exchanger and/or the ground loop.

Ground loop module 812 may incorporate heat rejection to the ground loop into the optimization problem by changing the amount of electricity and water usage by chiller subplant 522. For example, for loadings up to the heat rejection capacity of the ground loop, chiller subplant 522 may use an additional amount of electricity to run the ground loop pumps. The additional electricity usage may be constant or may vary per unit of flow through the ground loop. The amount of water production of chiller subplant 522 may be constant regardless of whether the ground loop is used.

Ground loop module 812 and heat exchanger module 814 may incorporate heat extraction from the ground loop and heat transfer between the hot water loop and the condenser water loop into the optimization problem in a similar manner. For example, ground loop module 812 and heat exchanger module 814 may use heat extraction from the ground loop and heat transfer between the water loops to modify the load seen by the central plant equipment. Ground loop module 812 may use the ground loop to create what appears as a false building load to the equipment, thereby allowing heat recovery chiller subplant 523 to operate as heat pumps when the building load does not add enough heat to the system. This outcome may be optimal when the ratio between electricity prices and gas prices is low such that it is less expensive to operate the ground loop and the heat exchanger using electricity than it would be to use natural gas to generate heat in heater subplant 521.

Heat exchanger module 814 may use the heat exchanger to create what appears to be a false hot water building load, thereby allowing heat recovery chiller subplant 523 to operate as conventional chillers. The excess heat from heat recovery chiller subplant 523 may be transferred through the heat exchanger to the condenser loop and ultimately into the atmosphere or into the ground. In some embodiments, heat exchanger module 814 operates the heat exchanger to prevent condenser loop from becoming overloaded. For example, heat exchanger module 814 may limit the total heat rejected to the capacity of the condenser loop minus the heat produced by the conventional chillers.

Ground loop module 812 and heat exchanger module 814 may modify the decision matrix x by adding a new decision vector for each type of thermal energy load. The new decision vectors may represent the overproduction of each thermal energy load for each time step k within the optimization period. Ground loop module 812 and heat exchanger module 814 may modify the equality constraints to account for any overproduced thermal energy loads. The overproduced thermal energy loads may be added to the equality constraints as slack variables that operate in the opposite direction of the unmet loads. The modified equality constraints may require that the predicted thermal energy loads plus any overproduction are equal to the total loads satisfied by subplants 520-530 plus any unsatisfied thermal energy loads. Ground loop module 812 and heat exchanger module 814 may modify the cost vector c with the additional cost of the pumping power per unit of overproduction required to run the ground loop and/or the heat exchanger.

Demand Charge Incorporation

Still referring to FIG. 8, high level optimizer 632 is shown to include a demand charge module 816. As discussed above, optimization framework module 802 may formulate the optimization problem as:

$$\arg\min_{x} c^T x; \text{ subject to } Ax \leq b, Hx = g$$

The demand charge is an additional charge imposed by some utility providers based on the maximum rate of energy consumption during an applicable demand charge period. For example, the demand charge may be provided in terms of dollars per unit of power (e.g., $/kW) and may be multiplied by the peak power usage (e.g., kW) during a demand charge period to calculate the demand charge. In some instances, the demand charge can account for more than 15% of the electrical bill. Failure to include the demand charge in the optimization scheme can cause all of the equipment to turn on at the same time (e.g., the most efficient or lowest cost time). This would be optimal from a consumption cost standpoint. However, shifting some of the load in time may save thousands of dollars on demand while only costing a few dollars in consumption cost.

Demand charge module 816 may be configured to modify the optimization problem to account for the demand charge. Incorporating the demand charge into the optimization framework may greatly improve the performance of the high level optimization. For example, including the demand charge in the optimization framework may reduce the total operating costs of the central plant by an additional 5% on top of the 8-10% cost reduction provided by other modules of central plant controller 506. In various implementations, the savings provided by demand charge module 816 and/or central plant controller 506 as a whole may be greater than or less than the exemplary amounts defined herein due to differences in plant configuration and/or energy costs.

Demand charge module 816 may account for the demand charge by modifying the cost function used by high level optimizer 632. The modified cost function may be defined as:

$$\arg\min_{x} [c^T x + c_{demand} \max(P_{elec,k})]; \text{ subject to } Ax \leq b, Hx = g$$

where $c_{demand}$ is the demand charge (e.g., $/kW) for the applicable demand charge period and $P_{elec,k}$ is the total electrical power purchased from utilities 510 at time step k. The term $\max(P_{elec,k})$ selects the peak electrical power at any time during the demand charge period. The demand charge $c_{demand}$ and the demand charge period may be defined by the utility rate information received from utilities 510 and may be provided to high level optimizer 632 by load/rate predictor 622.

Incorporating the demand charge into the optimization framework complicates the optimization problem in two primary ways. First, the cost function is no longer linear due to the inclusion of the max( ) function. Second, the consumption term $c^T x$ calculates cost over a consumption period defined by a time horizon, whereas the demand charge term $c_{demand} \max(P_{elec,k})$ calculates cost over the demand charge period. For example, the consumption period may be defined as the time period beginning at the current time step k and ending at a future time step k+h, where h represents the time horizon. The demand charge period may be defined by utilities 510 and provided to high level optimizer 632 along with the utility rate information. In some instances, the consumption period and the demand charge period may not be the same. This complicates the optimization problem by obfuscating potential trade-offs between control decisions that reduce the consumption term at the expense of the demand charge term or vice versa.

Demand charge module 816 may modify the optimization problem to incorporate the demand charge term into the linear optimization framework. For example, demand charge module 816 may modify the decision matrix x by adding a new decision variable $x_{peak}$ as follows:

$$x_{new} = [\ldots x_{elec,1} \ldots {}_h \ldots x_{peak}]^T$$

where $x_{peak}$ is the peak electricity within the demand charge period and $x_{elec,1 \ldots h}$ is the electricity purchase at each of the h time steps. Demand charge module 816 may modify the cost vector c as follows:

$$c_{new} = [\ldots c_{elec,1} \ldots {}_h \ldots c_{demand}]^T$$

such that the demand charge $c_{demand}$ is multiplied by the peak power consumption $x_{peak}$.

Demand charge module 816 may formulate and/or apply inequality constraints to ensure that the peak power consumption $x_{peak}$ is greater than or equal to the maximum electric demand over the demand charge period. I.e.:

$$x_{peak} \geq \max(x_{elec,k}) \; \forall k \in \text{horizon}$$

This inequality constraint may be represented in the linear optimization framework by defining the A matrix and the b vector as follows:

$$A = [\ldots I_h \ldots -1], b = 0$$

During the high level optimization process, high level optimizer 632 may choose a $x_{peak}$ that is equal to the maximum electrical demand over the demand charge period to minimize the cost associated with $x_{peak}$.

Demand charge module 816 may apply an inequality constraint to ensure that the peak power consumption decision variable $x_{peak}$ is greater than or equal to its previous value $x_{peak,previous}$ during the demand charge period. This inequality constraint may be represented in the linear optimization framework by defining the A matrix and the b vector as follows:

$$A = [\ldots -1], b = -x_{peak,previous}$$

Advantageously, the modifications to the decision variable matrix x, the cost vector c, and the inequality constraints provided by demand charge module 816 allow the cost function to be written in a linear form as follows:

$$\arg\min_x [c_{new}^T x_{new}] = \arg\min_x [c^T x + c_{demand} x_{peak}];$$

subject to $Ax \leq b, Hx = g$

This linear form of the cost function can be used in the linear optimization framework.

The cost function as written in the previous equation has components that are over different time periods. For example, the consumption term $c^T x$ is over the consumption period whereas the demand charge term $c_{demand} x_{peak}$ is over the demand charge period. To properly make the trade-off between increasing the demand charge versus increasing the cost of energy consumption, demand charge module 816 may apply a weighting factor to the demand charge term and/or the consumption term. For example, demand charge module 816 may divide the consumption term $c^T x$ by the duration h of the consumption period (i.e., the time period between the current time and the time horizon) and multiply by the amount of time $d_{demand}$ remaining in the current demand charge period so that the entire cost function is over the demand charge period. The new optimization function may be given by:

$$\arg\min_x \left[ \frac{d_{demand}}{h} c^T x + c_{demand} x_{peak} \right]; \text{ subject to } Ax \leq b, Hx = g$$

which is equivalent to:

$$\arg\min_x \left[ c^T x + \frac{h}{d_{demand}} c_{demand} x_{peak} \right]; \text{ subject to } Ax \leq b, Hx = g$$

The latter form of the new optimization function has the advantage of adjusting only one term of the function rather than several.

Carbon Emissions Incorporation

Still referring to FIG. 8, high level optimizer 632 is shown to include a carbon emissions module 817. The carbon emissions module 817 may operate to cause the high level optimizer 632 to account for (e.g., penalize) carbon emissions resulting from decisions of the high level optimizer 632. To account for carbon emissions, a term accounting for carbon emissions as a function of load allocations indicated by decision matrix x can be generated by the carbon emissions module 817. For example, the carbon emissions module 817 may provide a term $\lambda^* M(x)$ where the function $M(x)$ estimates an amount of carbon emissions resulting from a set of decisions x and $\lambda$ is a scaling factor or weight (e.g., a cost per unit of carbon emissions). The estimated carbon emissions can include both on-site and off-site emissions. The carbon emissions module 817 can cause the optimization problem to be expressed as:

$$\arg\min_x (c^T x + \lambda M(x)); \text{ subject to } Ax \leq b, Hx = g$$

By incorporating an emissions term (e.g., $\lambda M(x)$) in to the objective function used by the high level optimizer 632, the high level optimizer 632 will prefer solutions which result in lower carbon emissions, including on-site and/or off-site emissions. For example, the emissions term in the objective function may cause the high level optimizer 632 to allocate a higher proportion of the heating demand to the heat recovery chiller subplant 523 which operates on electricity and a correspondingly lower proportion of the heating demand to the steam subplant 524 which may include boilers that burn natural gas, in order to achieve carbon emissions savings (even when such a decision may increase utility costs). The emission term may also drive increased usage of thermal energy storage (e.g., hot thermal energy storage 531 and cold thermal energy storage 532) which enables time-shifting of thermal energy production to time periods associated with lower emissions, for example to time periods where the energy grid has lower marginal operating emissions rate and/or to time periods where non-emitting or low-emitting subplants have available capacity. For example, the emissions term in the objective function may cause the high level optimizer 632 to maximize utility of the heat recovery chiller subplant 523 and hot thermal energy storage 531 while minimizing use of fossil-fuel burning boilers to create hot water.

The function $M(x)$ mapping decision variables to carbon emissions may have various forms in various embodiments.

In some embodiments, the function M(x) uses information from subplant curves, for example subplant curves which model on-site carbon emissions as an output resource of a subplant. In some embodiments, the function M(x) uses a marginal operating emissions rate of electricity received from a utility grid to calculate an amount of emissions associated with an amount of electricity consumed as a result of a set of decision variables. Various approaches can be used to define, identify, fit, etc. a function M(x) that calculated carbon emissions as a function of decision variables of the optimization problem.

In examples where the demand charge module 816 and the carbon emissions module both operate, the optimization function may be given by:

$$\arg\min_x \left[ \frac{d_{demand}}{h} c^T x + c_{demand} x_{peak} + \lambda M(x) \right];$$

subject to $Ax \leq b, Hx = g$ which is equivalent to:

$$\arg\min_x \left[ c^T x + \frac{h}{d_{demand}} c_{demand} x_{peak} + \lambda M(x) \right];$$

subject to $Ax \leq b, Hx = g$

Thus the high level optimizer 632 can account for both carbon emissions and demand charges in some embodiments.

In other embodiments, the carbon emissions module 817 adds an emissions-related cost to the optimization problem by increasing the size of the c and x vectors, for example as in the approach used by the penalty function module 820 described below. In such an example, the carbon emissions module 817 may assign additional elements in c which provide a penalty rate associated with carbon emissions and additional decision variables in x which indicate amounts of carbon emissions (e.g., amounts from different subplants, on-site amounts, off-site amounts). Such penalty rates and emissions amounts can be determined using the various approaches described below with reference to FIGS. 15-26.

Tank Forced Full Incorporation

Still referring to FIG. 8, high level optimizer 632 is shown to include a tank forced full module 818. Tank forced full module 818 may modify the optimization problem such that the thermal energy storage (TES) tanks are forced to full at the end of the optimization period. This feature provides increased robustness in the event of a subplant failure and/or controller failure by ensuring that the TES tanks have sufficient stored thermal energy to satisfy building loads while the failure is being repaired. For example, plant operators can use the stored thermal energy to meet the building loads while central plant controller 506 is brought back online.

Tank forced full module 818 may force the TES tanks to full by increasing the cost of discharging the TES tanks. In some embodiments, tank forced full module 818 modifies the cost of discharging the TES tanks such that the discharge cost is higher than other costs in the cost function, but less than the cost of unmet loads. This forces high level optimizer 632 to take the benefit (i.e., negative cost) of charging the TES tanks to their maximum values.

Penalty Incorporation

Still referring to FIG. 8, high level optimizer 632 is shown to include a penalty function module 820. In some instances, high level optimizer 632 determines a solution to the optimization problem that includes significantly changing the load on one or more of subplants 520-530 within a relatively short timeframe. For example, the lowest cost solution from a resource consumption standpoint may involve taking a subplant from off to full load and back to off again within only a few time steps. This behavior may result from high level optimizer 632 identifying small fluctuations in the economic cost of resources and operating the central plant accordingly to achieve the minimal economic cost. However, operating the central plant in such a way may be undesirable due to various negative effects of rapidly changing the subplant loads (e.g., increased equipment degradation), especially if the cost saved is relatively minimal (e.g., a few cents or dollars).

Penalty function module 820 may modify the optimization problem to introduce a penalty for excessive equipment start/stops (e.g., in excess of a threshold). The penalty may subtract from the overall value which high level optimizer 632 seeks to optimize and may be represented in the value function as the $Penalty term. In some embodiments, the penalty is defined according to a penalty function. The penalty function may be a function of the control decisions made by high level optimizer. For example, the penalty function may be defined as follows:

$Penalty=$f(N_{commands})$ where $N_{commands}$ is the total number of on/off commands provided to the equipment over the duration of the optimization period. In some embodiments, the value of the penalty is proportional to the number of on/off commands or otherwise dependent upon the number of on/off commands.

In some embodiments, penalty function module 820 modifies the optimization problem to introduce a penalty for rapidly changing the subplant loads. For example, penalty function module 820 may modify the decision matrix x by adding a new decision vector for each subplant. The new decision vectors represent the change in subplant load for each subplant from one time step to the next. For example, penalty function module 820 may modify the decision matrix x as follows:

$$x = [\ldots \delta_{sp_1,1\ldots h} \delta_{sp_2,1\ldots h} \cdots \delta_{sp_n,1\ldots h}]^T$$

where $\delta_{sp_1,1\ldots h}$, $\delta_{sp_2,1\ldots h}$, and $\delta_{sp_n,1\ldots h}$ are h-dimensional vectors representing the changes in outputs of each subplant at each time step k relative to the previous time step k−1. For example, the variable $\delta_{sp_1,k}$ may be defined as the difference between the decision variable $x_{sp_1,out_1,k}$ representing the first output $out_1$ from subplant $sp_1$ at time k and the decision variable $x_{sp_1,out_1,k-1}$ representing the first output $out_1$ from subplant $sp_1$ at time k−1.

Penalty function module 820 may modify the cost vector c to add a cost associated with changing the subplant outputs. For example, penalty function module 820 may modify the cost vector c as follows:

$$c = [c_{sp_1,1\ldots h} c_{sp_2,1\ldots h} c_{sp_n,1\ldots h}]^T$$

where $c_{sp_1,1\ldots h}$, $c_{sp_2,1\ldots h}$, and $c_{sp_n,1\ldots h}$ are costs penalties associated with the changes in subplant outputs.

Penalty function module 820 may add constraints such that each of the variables δ cannot be less than the change in the corresponding subplant load. For example, the added constraints for chiller subplant 522 may have the following form:

$$A = \begin{bmatrix} \cdots & I_h - D_{-1} & \cdots & -I_h & 0_h & 0_h \\ \cdots & D_1 - I_h & \cdots & -I_h & 0_h & 0_h \\ \vdots & \vdots & \vdots & \vdots & \vdots & \vdots \end{bmatrix}, b = \begin{bmatrix} \begin{bmatrix} x_{sp_1,out_1,k-1} \\ 0_{h-1} \end{bmatrix} \\ \begin{bmatrix} -x_{sp_1,out_1,k-1} \\ 0_{h-1} \end{bmatrix} \\ \vdots \end{bmatrix}$$

where $x_{sp_1,out_1,k-1}$ is the value of the decision variable representing the output of subplant $sp_1$ at time k−1. Similar constraints may be added for each of subplants 520-530.

The constraints added by penalty function module 820 require the change variables δ to be greater than or equal to the magnitude of the difference between the current value of the corresponding subplant output and the previous value of the subplant output. In operation, high level optimizer 632 may select values for the change variables δ that are equal to the magnitude of the difference due to the costs associated with the change variables. In other words, high level optimizer 632 may not choose to make the change variables δ greater than the actual change in the corresponding subplant output because making the change variables δ greater than necessary would be suboptimal.

Incentive Program Incorporation

Still referring to FIG. 8, high level optimizer 632 is shown to include an incentive program module 822. Incentive program module 822 may modify the optimization problem to account for revenue from participating in an incentive-based demand response (IBDR) program. IBDR programs may include any type of incentive-based program that provides revenue in exchange for resources (e.g., electric power) or a reduction in a demand for such resources. For example, central plant system 500 may provide electric power to an energy grid or an independent service operator as part of a frequency response program (e.g., PJM frequency response) or a synchronized reserve market. In a frequency response program, a participant contracts with an electrical supplier to maintain reserve power capacity that can be supplied or removed from an energy grid by tracking a supplied signal. The participant is paid by the amount of power capacity required to maintain in reserve. In other types of IBDR programs, central plant system 500 may reduce its demand for resources from a utility as part of a load shedding program. It is contemplated that central plant system 500 may participate in any number and/or type of IBDR programs.

Advantageously, incentive program module 822 may be configured to modify the optimization problem to account for participation in any number of IBDR programs. For example, incentive program module 822 may incorporate IBDR revenue into the value function which high level optimizer 632 seeks to optimize (e.g., the $IBDR term of the value function). Incentive program module 822 may also add a decision variable $x_{resource_p,prog_s,1\ldots h}$ to the decision matrix x for each IBDR program in which central plant system 500 can potentially participate, as shown in the following equation:

$$x = [\ldots x_{resource_p,under,1\ldots h} x_{resource_p,over,1\ldots h} \\ x_{resource_p,storage,1\ldots h} x_{resource_p,prog_s,1\ldots h}]^T$$

where the decision variable $x_{resource_p,prog_s,1\ldots h}$ represents the amount of resource p allocated to IBDR program s at each of the h time steps. Incentive program module 822 may add similar decision variables for each IBDR program.

Incentive program module 822 may modify the cost vector c to include the revenue offered for participating in each IBDR program. For example, incentive program module 822 may modify the cost vector c as shown in the following equation:

$$c = [\ldots M\ M\ 0\ -r_{resource_p,prog_s,1\ldots h}]^T$$

where the variable $r_{resource_p,prog_s,1\ldots h}$ represents the revenue offered for participating in IBDR program s at each of the h time steps. The revenue variables may be based on statistical estimates of IBDR event characteristics (e.g., event times, revenue potential, reserve capacity required, etc.) as described with reference to incentive estimator 620.

Incentive program module 822 may generate and impose constraints that allow for participation in various IBDR programs. For example, incentive program module 822 may modify the A matrix and the b vector as shown in the following equation:

$$A = \begin{bmatrix} \cdots & 0 & 0 & I_h & p_{charge} \\ \cdots & 0 & 0 & -I_h & p_{discharge} \\ \cdots & 0 & 0 & T_s\Delta_h & p_{cap} \\ \cdots & 0 & 0 & -T_s\Delta_h & p_{cap} \end{bmatrix}, b = \begin{bmatrix} \vdots \\ x_{discharge_p,max} \\ x_{charge_p,max} \\ C_{storage_p,0} \\ C_{storage_p,max} - C_{storage_p,0} \end{bmatrix}$$

where $p_{charge}$, $p_{discharge}$, and $p_{cap}$ are the marginal amounts of reserve charging rate, discharging rate, and storage capacity (per unit of participation) that must be maintained in order to participate in the IBDR program. Advantageously, these constraints allow high level optimizer 632 to weigh the benefits of participating in various IBDR programs (e.g., expected revenue) against the costs of participation (e.g., less resources available for satisfying building loads). If the expected revenue for participation outweighs the costs, high level optimizer 632 may allocate resources to the IBDR program. However, if the expected revenue does not outweigh the costs, high level optimizer 632 may allocate the resources to satisfying building loads.

Battery Capacity Loss Incorporation

Still referring to FIG. 8, high level optimizer 632 is shown to include a battery capacity loss module 824. Battery capacity loss module 824 may be configured to adjust the optimization problem to account for a loss in battery capacity (e.g., electrical energy storage 533) as a result of the control decisions made by high level optimizer 632. For example, battery capacity loss module 824 may use a battery capacity loss model to determine an expected loss in battery capacity as a result of the control decisions. The battery capacity loss model may monetize the loss in battery capacity based on the lost revenue of not being able to participate in IBDR programs due to premature battery capacity loss attributed to certain control actions. The monetized loss in battery capacity may be provided as a term in the value function (e.g., the $BL term) which high level optimizer 632 seeks to optimize.

In some embodiments, battery capacity loss module 824 estimates battery capacity loss as a function of the decision variables. For example, the loss in battery capacity may be defined by the following battery capacity loss model:

$$\$BL = f\left(DOD, T, SOC, \sum kW_{batt}, \sum \frac{dkW_{batt}}{dt}, \overline{RMCCP}, \overline{RMPCP}, \overline{MR}, i_n, n\right)$$

where $BL is the monetized cost of battery capacity loss, DOD represents the depth of discharge of the battery, SOC represents the state of charge of the battery, $kW_{batt}$ represents the battery power draw, $$\frac{dkW_{batt}}{dt}$$

represents the change in battery power draw, $\overline{RMCCP}$ represents the average regulation market capability clearing price (RMCCP), $\overline{RMPCP}$ represents the average regulation market performance clearing price (RMCCP) and $\overline{MR}$ represents the average mileage ratio (MR). The loss in battery capacity may be a function of several inputs which can be modified by high level optimizer 632 such as the state of charge, the depth of discharge, the amount of energy moved (e.g., average power ratio), and the change in power draw (e.g., average effort ratio). For example, high level optimizer 632 can increase or decrease many of these inputs by adjusting the amount of power allocated to the battery (i.e., electrical energy storage subplant 533) at each time step.

In some embodiments, battery capacity loss module 824 determines an expected loss in battery capacity as a function of the control decisions made by high level optimizer 632. Battery capacity loss module 824 may monetize the expected loss in battery capacity and/or provide the expected loss in battery capacity to high level optimizer 632. High level optimizer 632 may use the expected loss in battery capacity over time to determine the consequences of certain control decisions. For example, some control decisions may result in a relatively faster loss in battery capacity than other control decisions. Therefore, some control decisions may limit the ability of central plant system 500 to participate in IBDR programs in the future due to the battery capacity failing to meet IBDR requirements. Advantageously, high level optimizer 632 can predict the expected loss in revenue resulting from certain control decisions and weigh the predicted loss in revenue against the benefits of the control decisions. High level optimizer 632 may select a set of optimal control decisions that maximizes the overall value over the duration of the prediction window, while accounting for the cost of certain control decisions in terms of losses in battery capacity and the lost IBDR revenue associated therewith.

Subplant Curves

Figure 9A:
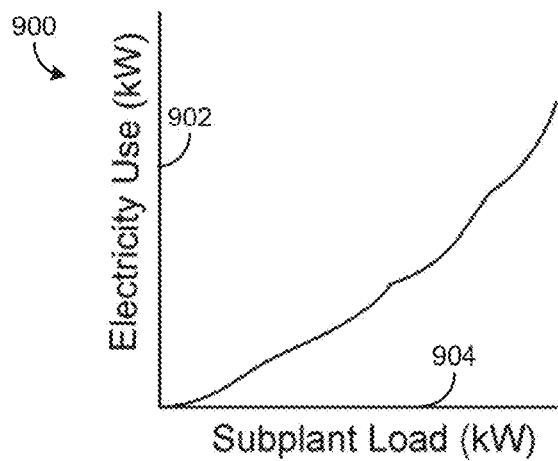
FIGS. 9A-9B are subplant curves illustrating a relationship between the resource consumption of a subplant and the subplant load and which may be used by the high level optimizer of FIG. 8 to optimize the performance of the central plant, according to an exemplary embodiment.
Figure 9B:
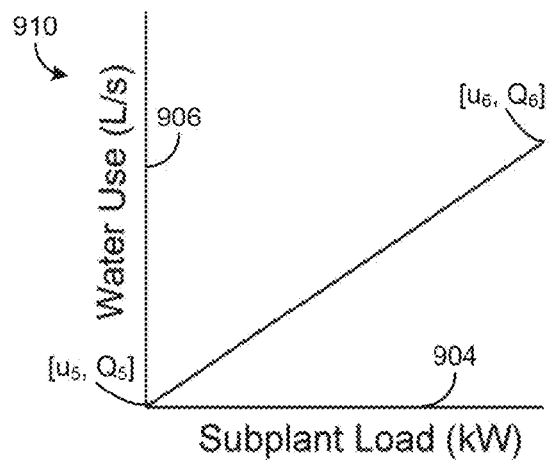

Referring now to FIGS. 9A-B, two subplant curves 900 and 910 are shown, according to an exemplary embodiment. Subplant curves 900 and 910 define the resource usage of a subplant (e.g., one of subplants 520-530) as a function of the subplant load. Each subplant curve may be specific to a particular subplant and a particular type of resource used by the subplant. For example, subplant curve 900 may define the electricity use 902 of chiller subplant 522 as a function of the load 904 on chiller subplant 522, whereas subplant curve 910 may define the water use 906 of chiller subplant 522 as a function of the load 904 on chiller subplant 522. Each of subplants 520-530 may have one or more subplant curves (e.g., one for each type of resource consumed by the subplant).

In some embodiments, low level optimizer 634 generates subplant curves 900 and 910 based on equipment models 618 (e.g., by combining equipment models 618 for individual devices into an aggregate curve for the subplant). Low level optimizer 634 may generate subplant curves 900 and 910 by running the low level optimization process for several different loads and weather conditions to generate multiple data points. Low level optimizer 634 may fit a curve to the data points to generate the subplant curves. In other embodiments, low level optimizer 634 provides the data points to high level optimizer 632 and high level optimizer 632 generates the subplant curves using the data points.

Referring now to FIG. 10, another subplant curve 1000 is shown, according to an exemplary embodiment. Subplant curve 1000 defines the electricity use of chiller subplant 522 as a function of the cold water production of chiller subplant 522. In some embodiments, subplant curve 1000 is generated by combining efficiency curves for individual devices of chiller subplant 522 (e.g., individual chillers, pumps, etc.). For example, each of the chillers in subplant 522 may have a device-specific efficiency curve that defines the amount of electricity use by the chiller as a function of the load on the chiller. Many devices operate less efficiently at higher loads and have device efficiency curves that are U-shaped functions of load. Accordingly, combining multiple device efficiency curves to form subplant curve 1000 may result in subplant curve 1000 having one or more waves 1002, as shown in FIG. 10. Waves 1002 may be caused by a single device loading up before it is more efficient to turn on another device to satisfy the subplant load.

Referring now to FIG. 11, a linearized subplant curve 1100 is shown, according to an exemplary embodiment. Subplant curve 1100 defines the electricity use of chiller subplant 522 as a function of the cold water production of chiller subplant 522. Subplant curve 1100 may be generated by converting subplant curve 1000 into a linearized convex curve. A convex curve is a curve for which a line connecting any two points on the curve is always above or along the curve (i.e., not below the curve). Convex curves may be advantageous for use in the high level optimization because they allow for an optimization process that is less computationally expensive relative to an optimization process that uses non-convex functions.

In some embodiments, subplant curve 1100 is generated by subplant curve linearizer 836, as described with reference to FIG. 8. Subplant curve 1100 may be created by generating a plurality of linear segments (i.e., segments 1102, 1104, and 1106) that approximate subplant curve 1000 and combining the linear segments into a piecewise-defined linearized convex curve 1100. Linearized subplant curve 1100 is shown to include a first linear segment 1102 connecting point $[u_1, Q_1]$ to point $[u_2, Q_2]$, a second linear segment 1104 connecting point $[u_2, Q_2]$ to point $[u_3, Q_3]$, and a third linear segment 1106 connecting point $[u_3, Q_3]$ to point $[u_4, Q_4]$. The endpoints of line segments 1102-1106 may be used to form constraints that force the electricity use of chiller subplant 522 in the epigraph of the linearized subplant curve 1100.

Figure 12:
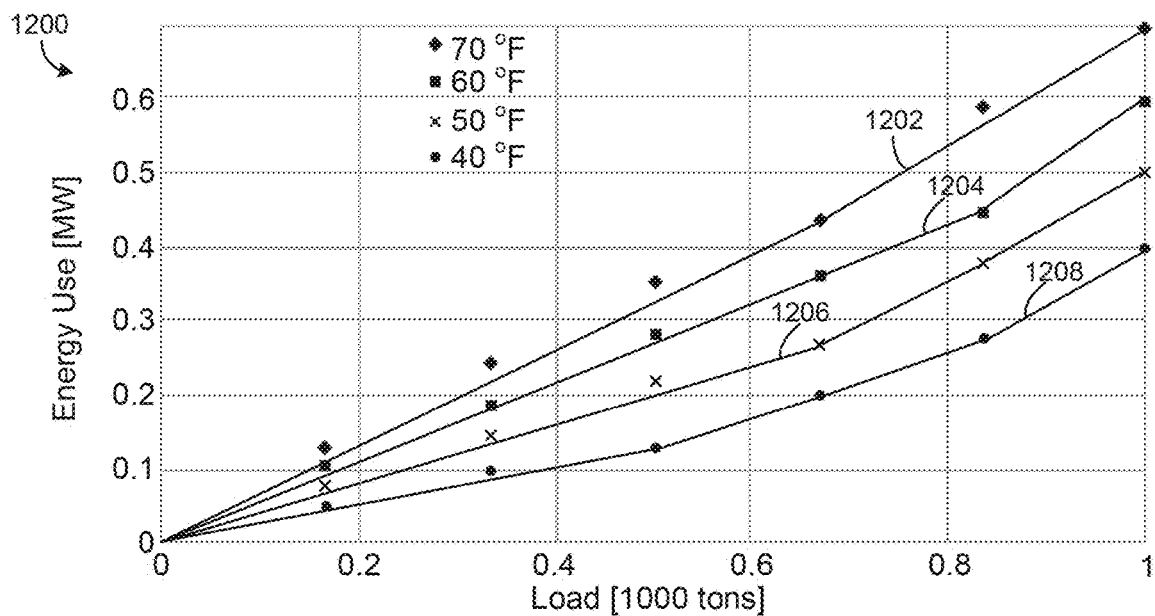
FIG. 12 is a graph illustrating a set of subplant curves that may be generated by the high level optimizer of FIG. 8 based on experimental data from a low level optimizer for multiple different environmental conditions, according to an exemplary embodiment.

Referring now to FIG. 12, another subplant curve 1200 is shown, according to an exemplary embodiment. Subplant curve 1200 defines the energy use of one of subplants 520-530 as a function of the load on the subplant for several different weather conditions. In some embodiments, subplant curve 1200 is generated by subplant curves module 830 using experimental data obtained from the low level optimizer 634. For example, subplant curve updater 832 may request resource usage data from low level optimizer 634 for various combinations of load conditions and environmental conditions. In the embodiment shown in FIG. 12, subplant curve updater 832 requests energy use data for each combination of temperature (e.g., 40° F., 50° F., 60° F., and 70° F.) and load (e.g., 170 tons, 330 tons, 500 tons, 830 tons, and 1000 tons). Low level optimizer 634 may perform the low level optimization process for the requested load and temperature combinations and return an energy use value for each combination.

Subplant curve updater 832 may use the data points provided by low level optimizer 634 to find the best piecewise linear convex function that fits the data. For example, subplant curve updater 832 may fit a first subplant curve 1202 to the data points at 70° F., a second subplant curve 1204 to the data points at 60° F., a third subplant curve 1206 to the data points at 50° F., and a fourth subplant curve 1208 to the data points at 40° F. Subplant curve updater 832 may store the generated subplant curves 1202-1208 in subplant curves database 834 for use in the high level optimization algorithm.

In some implementations, central plant controller 506 uses high level optimizer 632 as part of an operational tool to exercise real-time control over the central plant. In the operational tool, high level optimizer 632 may receive load and rate predictions from load/rate predictor 622 and subplant curves (or data that can be used to generate subplant curves) from low level optimizer 634. When implemented in the operational tool, high level optimizer 632 may determine an optimal load distribution for heater subplant 521, heat recovery chiller subplant 523, chiller subplant 522, hot TES subplant 531, cold TES subplant 532, electrical energy storage subplant 533, and/or energy purchasers 504, as described with reference to FIGS. 5-8. In some embodiments, high level optimizer 632 determines ground loop and heat exchanger transfer rates in addition to the subplant loads. When implemented in the operational tool, high level optimizer 632 may provide the determined resource allocation to low level optimizer 634 for use in determining optimal on/off decisions and/or operating setpoints for the equipment of each subplant.

Planning Tool

Figure 13:
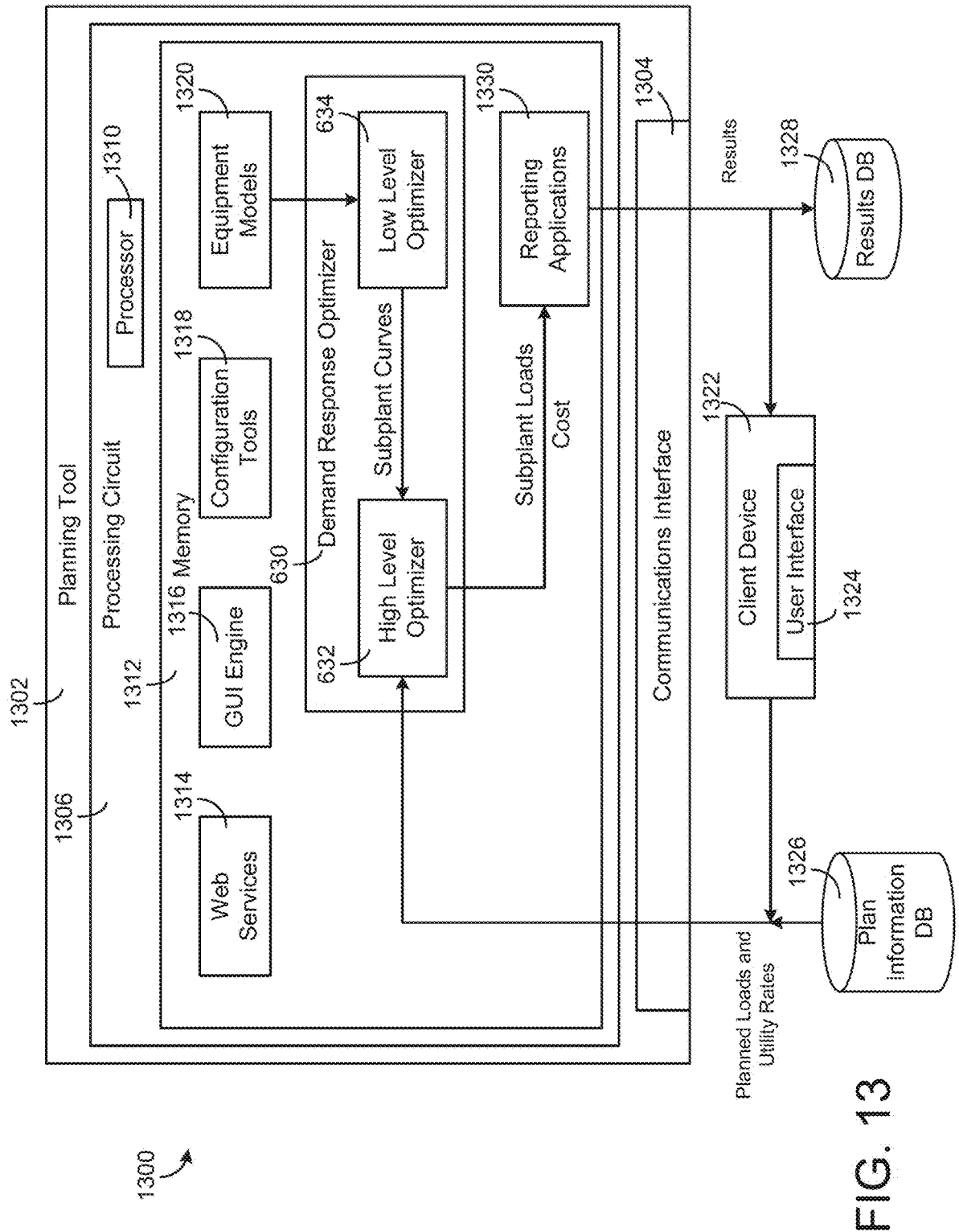
FIG. 13 is a block diagram of a planning system that incorporates the high level optimizer of FIG. 8, according to an exemplary embodiment.

Referring now to FIG. 13, a block diagram of a planning system 1300 is shown, according to an exemplary embodiment. Planning system 1300 may be configured to use demand response optimizer 630 as part of a planning tool 1302 to simulate the operation of a central plant over a predetermined time period (e.g., a day, a month, a week, a year, etc.) for planning, budgeting, and/or design considerations. When implemented in planning tool 1302, demand response optimizer 630 may operate in a similar manner as described with reference to FIGS. 6-8. For example, demand response optimizer 630 may use building loads and utility rates to determine an optimal resource allocation to minimize cost over a simulation period. However, planning tool 1302 may not be responsible for real-time control of a building management system or central plant.

In planning tool 1302, high level optimizer 632 may receive planned loads and utility rates for the entire simulation period. The planned loads and utility rates may be defined by input received from a user via a client device 1322 (e.g., user-defined, user selected, etc.) and/or retrieved from a plan information database 1326. High level optimizer 632 uses the planned loads and utility rates in conjunction with subplant curves from low level optimizer 634 to determine an optimal resource allocation (i.e., an optimal dispatch schedule) for a portion of the simulation period.

The portion of the simulation period over which high level optimizer 632 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 632 requests all of the subplant curves used in the simulation from low level optimizer 634 at the beginning of the simulation. Since the planned loads and environmental conditions are known for the entire simulation period, high level optimizer 632 may retrieve all of the relevant subplant curves at the beginning of the simulation. In some embodiments, low level optimizer 634 generates functions that map subplant production to equipment level production and resource use when the subplant curves are provided to high level optimizer 632. These subplant to equipment functions may be used to calculate the individual equipment production and resource use (e.g., in a post-processing module) based on the results of the simulation.

Still referring to FIG. 13, planning tool 1302 is shown to include a communications interface 1304 and a processing circuit 1306. Communications interface 1304 may include wired or wireless interfaces (e.g., jacks, antennas, transmitters, receivers, transceivers, wire terminals, etc.) for conducting data communications with various systems, devices, or networks. For example, communications interface 1304 may include an Ethernet card and port for sending and receiving data via an Ethernet-based communications network and/or a WiFi transceiver for communicating via a wireless communications network. Communications interface 1304 may be configured to communicate via local area networks or wide area networks (e.g., the Internet, a building WAN, etc.) and may use a variety of communications protocols (e.g., BACnet, IP, LON, etc.).

Communications interface 1304 may be a network interface configured to facilitate electronic data communications between planning tool 1302 and various external systems or devices (e.g., client device 1322, results database 1328, plan information database 1326, etc.). For example, planning tool 1302 may receive planned loads and utility rates from client device 1322 and/or plan information database 1326 via communications interface 1304. Planning tool 1302 may use communications interface 1304 to output results of the simulation to client device 1322 and/or to store the results in results database 1328.

Still referring to FIG. 13, processing circuit 1306 is shown to include a processor 1310 and memory 1312. Processor 1310 may be a general purpose or specific purpose processor, an application specific integrated circuit (ASIC), one or more field programmable gate arrays (FPGAs), a group of processing components, or other suitable processing components. Processor 1310 may be configured to execute computer code or instructions stored in memory 1312 or received from other computer readable media (e.g., CDROM, network storage, a remote server, etc.).

Memory 1312 may include one or more devices (e.g., memory units, memory devices, storage devices, etc.) for storing data and/or computer code for completing and/or facilitating the various processes described in the present disclosure. Memory 1312 may include random access memory (RAM), read-only memory (ROM), hard drive storage, temporary storage, non-volatile memory, flash memory, optical memory, or any other suitable memory for storing software objects and/or computer instructions. Memory 1312 may include database components, object code components, script components, or any other type of information structure for supporting the various activities and information structures described in the present disclosure. Memory 1312 may be communicably connected to processor 1310 via processing circuit 1306 and may include computer code for executing (e.g., by processor 1310) one or more processes described herein.

Still referring to FIG. 13, memory 1312 is shown to include a GUI engine 1316, web services 1314, and configuration tools 1318. In an exemplary embodiment, GUI engine 1316 includes a graphical user interface component configured to provide graphical user interfaces to a user for selecting or defining plan information for the simulation (e.g., planned loads, utility rates, environmental conditions, etc.). Web services 1314 may allow a user to interact with planning tool 1302 via a web portal and/or from a remote system or device (e.g., an enterprise control application).

Configuration tools 1318 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 1318 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 1326) and adapt it or enable it for use in the simulation.

Still referring to FIG. 13, memory 1312 is shown to include demand response optimizer 630. Demand response optimizer 630 may use the planned loads and utility rates to determine an optimal resource allocation over a prediction window. The operation of demand response optimizer 630 may be the same or similar as previously described with reference to FIGS. 6-8. With each iteration of the optimization process, demand response optimizer 630 may shift the prediction window forward and apply the optimal resource allocation for the portion of the simulation period no longer in the prediction window. Demand response optimizer 630 may use the new plan information at the end of the prediction window to perform the next iteration of the optimization process. Demand response optimizer 630 may output the applied resource allocation to reporting applications 1330 for presentation to a client device 1322 (e.g., via user interface 1324) or storage in results database 1328.

Still referring to FIG. 13, memory 1312 is shown to include reporting applications 1330. Reporting applications 1330 may receive the optimized resource allocations from demand response optimizer 630 and, in some embodiments, costs associated with the optimized resource allocations. Reporting applications 1330 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation. An exemplary output that may be generated by reporting applications 1330 is shown in FIG. 14.

Figure 14:
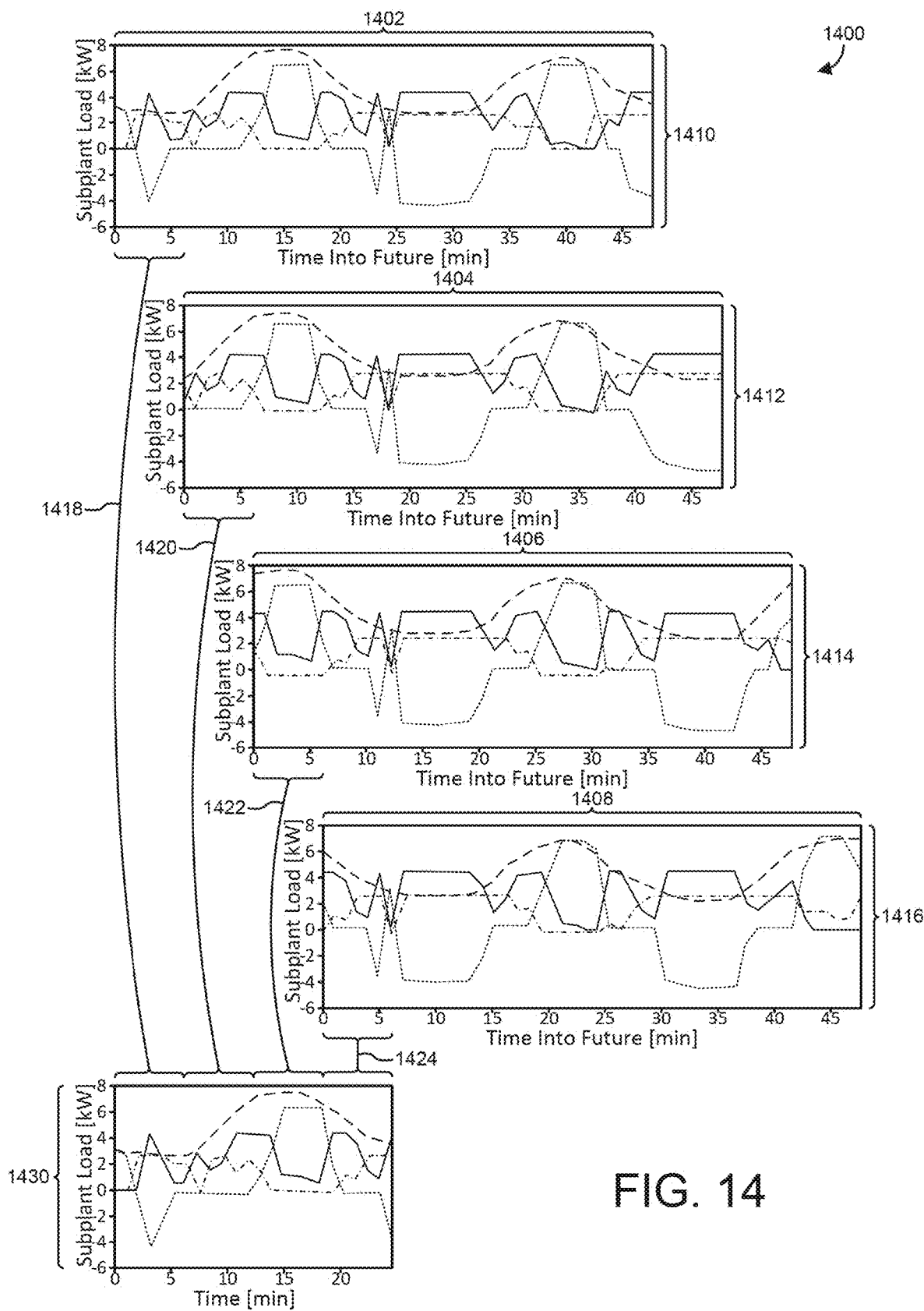
FIG. 14 is a drawing illustrating the operation of the planning system of FIG. 13, according to an exemplary embodiment.

Referring now to FIG. 14, several graphs 1400 illustrating the operation of planning tool 1302 are shown, according to an exemplary embodiment. With each iteration of the optimization process, planning tool 1302 selects an optimization period (i.e., a portion of the simulation period) over which the optimization is performed. For example, planning tool 1302 may select optimization period 1402 for use in the first iteration. Once the optimal resource allocation 1410 has been determined, planning tool 1302 may select a portion 1418 of resource allocation 1410 to send to plant dispatch 1430. Portion 1418 may be the first b time steps of resource allocation 1410. Planning tool 1302 may shift the optimization period 1402 forward in time, resulting in optimization period 1404. The amount by which the prediction window is shifted may correspond to the duration of time steps b.

Planning tool 1302 may repeat the optimization process for optimization period 1404 to determine the optimal resource allocation 1412. Planning tool 1302 may select a portion 1420 of resource allocation 1412 to send to plant dispatch 1430. Portion 1420 may be the first b time steps of resource allocation 1412. Planning tool 1302 may then shift the prediction window forward in time, resulting in optimization period 1406. This process may be repeated for each subsequent optimization period (e.g., optimization periods 1406, 1408, etc.) to generate updated resource allocations (e.g., resource allocations 1414, 1416, etc.) and to select portions of each resource allocation (e.g., portions 1422, 1424) to send to plant dispatch 1430. Plant dispatch 1430 includes the first b time steps 1418-1424 from each of optimization periods 1402-1408. Once the optimal resource allocation is compiled for the entire simulation period, the results may be sent to reporting applications 1330, results database 1328, and/or client device 1322, as described with reference to FIG. 13.

Predictive Control with Carbon Emissions Optimization

Figure 15:
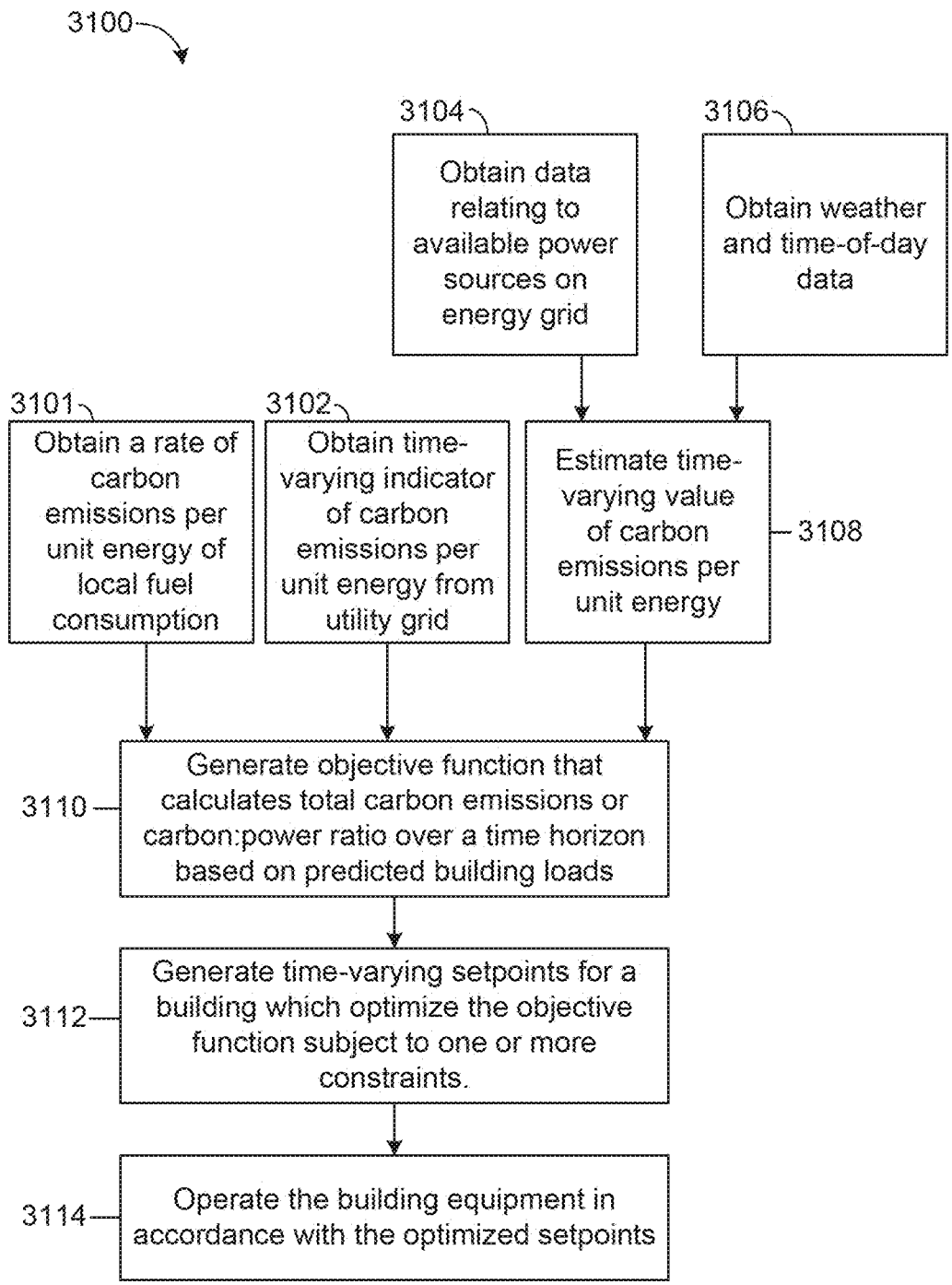
FIG. 15 is a flowchart of a process for operating building equipment to achieve an optimal level of carbon emissions or carbon-to-power ratio, according to some embodiments.

Referring now to FIG. 15, a flowchart of a process 3100 for predictive control with carbon emissions optimization is shown, according to an exemplary embodiment. Process 3100 can be executed by the BMS controller 366, for example. Process 3100 can be executed by or for a smart thermostat, for example as described in U.S. patent application Ser. No. 16/598,539, filed Oct. 10, 2019, incorporated by reference herein. Process 3100 can also be executed by a building management system or controllers for building equipment, for example as described in U.S. application Ser. No. 15/199,909, filed Jun. 30, 2016, U.S. application Ser. No. 13/802,154, filed Mar. 13, 2013 or U.S. application Ser. No. 16/687,122, filed Nov. 18, 2019, the entire disclosures of which are incorporated by reference herein.

At step 3101 a rate (or other function) of carbon emissions per unit energy of local fuel consumption is obtained. Step 3101 can include using tests, measurements, historical data, etc. in order to measure and model (e.g., via regression modeling) the amount of carbon emissions from different subplants as functions of the amount of fuel consumption of such subplants, which, as described elsewhere herein, can also be predicted as a function of resource output of such subplants. In some embodiments, the rate is a static scalar multiple, such that carbon emissions are proportional to energy consumption. In other embodiments, the rate is dynamic, for example varying with a function of the operating capacity of a subplant (e.g., where carbon capture is more efficient at higher or lower fractions of operating capacity depending equipment design and characteristics) or other dynamic conditions and factors that can influence the amount of carbon emissions, the effectiveness of filters or carbon capture systems, etc. In some embodiments, step 3101 includes obtaining one or more rates as user inputs, based manufacturer data sheets, or based on various digitized information describing the particular equipment types and model numbers used in a particular central plant.

Because different subplants consume fuel in different ways and can include different filters, carbon capture systems, etc., the rate of carbon emissions per unit fuel consumed can be different for different subplants, such that step 3101 includes obtaining multiple rates for multiple subplants. In some examples, step 3101 outputs a vector including a different rate for each subplant, or for each particular unit of equipment in a subplant. In such embodiments, values of zero can be provided for elements corresponding to subplants that do not emit carbon (e.g., consume electricity rather than fuel), while non-zero positive values are provided for elements corresponding to subplants that consume natural gas or other fuel (and thus emit carbon). Such a vector formulation would be suitable for use with the example expressions shown with reference to FIGS. 6-8 above, for example.

At step 3102, a time-varying indicator of carbon emissions per unit energy or power is received from the utility grid, for example a power:carbon ratio (i.e., average carbon per unit power provided by the grid) or a marginal operating emissions rate (MOER) (i.e., carbon per marginal unit power as described below). The MOER may also be characterized as a time-varying indication of the availability of green energy. That is, in the scenario of step 3102, the operator of the utility grid provides an estimate of the amount of carbon emitted in order to produce each unit of energy or power provided to a customer of the utility grid. Because renewable energy may contribute different percentages of total grid energy under different environmental conditions, different times of day, etc. a carbon:power or carbon:energy ratio can be time-varying. Additionally, because different renewable sources and fossil-fuel consuming plants may come online at different times or under different total demands on the grid, the source of power that generates a marginal unit of energy also changes over time such that the carbon emissions associated with marginal energy consumption (i.e., consuming vs. not consuming the next unit of energy) also changes over time.

Figure 16:
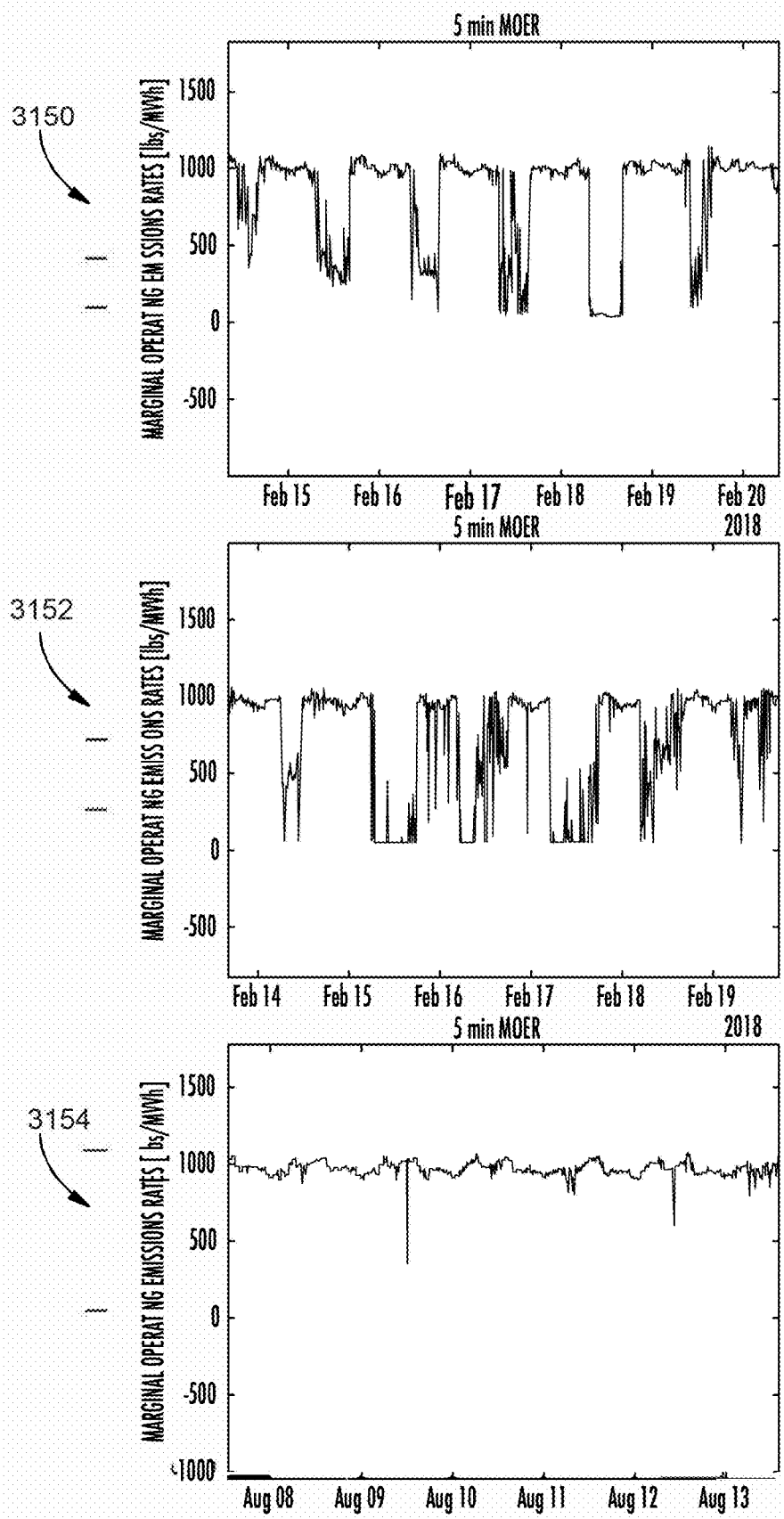
FIG. 16 is a depiction of example time-varying marginal operating emissions rates, according to some example scenarios.

The rate of emissions associated with marginal energy consumption is referred to herein as the marginal operating emissions rate (MOER) and can be broadcast by a utility grid operator to its customers in some embodiments, for example at a frequency of once every five minutes. To illustrate some examples, FIG. 16 shows graphs of MOER over time in different seasons. A first graph 3150 shows MOER over time for a week in February. In the example shown, the MOER can fluctuate between about 1000 lbs/MWh and 0 lbs/MWh. In the first graph 3150, the MOER is zero during parts of some days, for example during a middle portion of the day when photovoltaic energy production is sufficient to meet the demands of the grid. At night, in cloudy conditions, or in high-demand periods, the grid relies on fossil-fuel-based energy (coal, natural gas, etc.) to meet demand, such that the MOER jumps to a higher value when such plants are brought online to serve the marginal demand on the utility grid. In the second graph 3152, which shows MOER for a week in July, it can be seen that higher MOER can occur even during daytime (when solar power is available) under high-demand periods, showing that MOER can deviate from a standard pattern or oscillation. The first graph 3150 and the second graph 3152 show that there are opportunities to reduce marginal emissions by time-shifting consumption to periods with lower MOER, which can be achieved by process 3100 as described herein. In the third graph 3154, which shows MOER for a week in August, it can be seen that in high, constant demand periods (e.g., during a heat wave when air conditioners are constantly run to put a high demand on the utility grid), carbon-emitting sources will always remain online to serve the marginal energy demand, such that MOER stays substantially constant throughout such periods.

In step 3102, assuming such data is available from the utility grid, the time-varying indicator of carbon emissions (e.g., MOER) is received from the utility grid. In some scenarios, the utility grid may also provide predicted or expected MOER or carbon:power or carbon:energy ratios for future time periods. In some embodiments, a time-varying indicator of carbon emission associated with non-electricity resources is also received, for example indicating an amount of emissions linked to energy used to obtain, treat, pump, provide, etc. a non-electricity resources such as water, gas, etc.

In a scenario where such information is not directly available from the utility grid (or other third part), a predictive controller can be configured to generate estimates of the MOER or carbon:energy or carbon:power ratio itself, as illustrated steps 3104-3108 of process 3100. At step 3104, data relating to available power sources on the energy grid is collected, i.e., identifying the different energy sources and general information on production of the energy sources serving the energy grid. This information is typically available, even where detailed estimates of carbon emissions or real-time MOER are not shared by utility companies. Step 3104 can include collect this data and building a model of the various sources of energy on the utility gird. Step 3106 include obtaining weather and time-of-day data (e.g., what will the weather by a different times of day over a prediction horizon). At step 3108, the data from steps 3104 and 3106 are used to estimate a time-varying value of carbon emissions per unit energy or power (e.g., average, MOER) received from the energy grid. Step 3106 can include executing a modeling approach which simulates the energy grid based on the best available information to generate an estimate of the carbon:power or carbon:energy ratio or MOER and predictions thereof over a prediction horizon. In some embodiments, a stochastic optimization process is implemented where a plurality of scenarios comprising different time-series values of the MOER are generated and then used to optimize a total objective across all of the plurality of scenarios, for example as described for utility rates in U.S. patent application Ser. No. 16/115,290, filed Mar. 14, 2019, the entire disclosure of which is incorporated by reference here.

At step 3110, an objective function is generated that calculates total carbon emissions, total marginal carbon emissions, or an effective carbon-to-consumed-power ratio over a prediction horizon based on predicted building loads. The predictive building loads can be modeled as a function of building setpoints, for example building temperature setpoints, and other building-related variables (indoor air temperature, outdoor air temperature, etc.), for example using a system identification and grey-box modeling approach as described in U.S. patent application Ser. No. 16/418,715, file May 21, 2019, the entire disclosure of which is incorporated by reference herein. As another example, step 3110 can include adapting the objective functions used in U.S. application Ser. No. 14/717,593, filed May 20, 2015, U.S. application Ser. No. 16/115,290, filed Aug. 28, 2018, or Ser. No. 15/199,910, filed Jun. 30, 2016, all incorporated by reference herein, by replacing variables indicating utility rates with the time-varying MOER, time-varying value of the carbon:energy or carbon:power ratio. The objective function can include multiplying the carbon:energy ratio by a predicted energy consumption or target energy consumption of building equipment to calculate a total emissions value. The objective function may include a term accounting for off-site emissions, for example $\int_{t=1}^{t=T} MOER(t)*p(t)$ where MOER(t) is the marginal operating emissions rate at time t and p(t) is energy obtained from the grid at time t. The objective function may also include a term accounting for on-site emissions, for example $\Sigma_k \int_{t=1}^{t=T} r_k(t)*F_k(t)$ where the index k indicates different subplants, $r_k(t)$ is the rate of carbon emissions per unit fuel consumption for subplant k at time t and $F_k(t)$ is the amount of fuel consumed by subplant k at time t.

At step 3112, time-varying setpoints for the building are generate which optimize the objective function subject to one or more constraints. For example, a temperature setpoint for each time step over an optimization horizon may be generated at step 3112. As another example, energy consumption targets for building equipment may be generated at step 3112. Various details of such embodiments are provided in the applications cited above and incorporated by reference herein. Optimizing the objective function can include executing a gradient descent or other minimization process that seeks to achieve the minimum possible total carbon emissions while satisfy the one or more constraints (e.g., constraints ensuring occupant comfort, etc.).

At step 3114, the building equipment is operated in accordance with the optimized setpoints. Because step 3112 uses the time-varying MOER or carbon:power or carbon:energy ratio as an input, step 3114 may include time-shifting building equipment to low-carbon periods and away from high-carbon-emissions periods. For example, a building can be pre-cooled or pre-heated during a low-carbon period (e.g., cooled below a preferred temperature setpoint, heated above a preferred temperature setpoint) to reduce or eliminate operating of cooling equipment (chillers, etc.) during high-carbon periods. Process 3100 can thereby reduce carbon emissions associated with energy consumption of a building. In other embodiments, process 3100 is implemented as a planning tool and used to generate reports, analytics, projected carbon savings, projected costs savings, recommendations, etc. resulting from implementing the optimization strategy of process 3100, as an alternative to or in addition to controlling the building equipment as shown in the example of FIG. 15.

Figure 17:
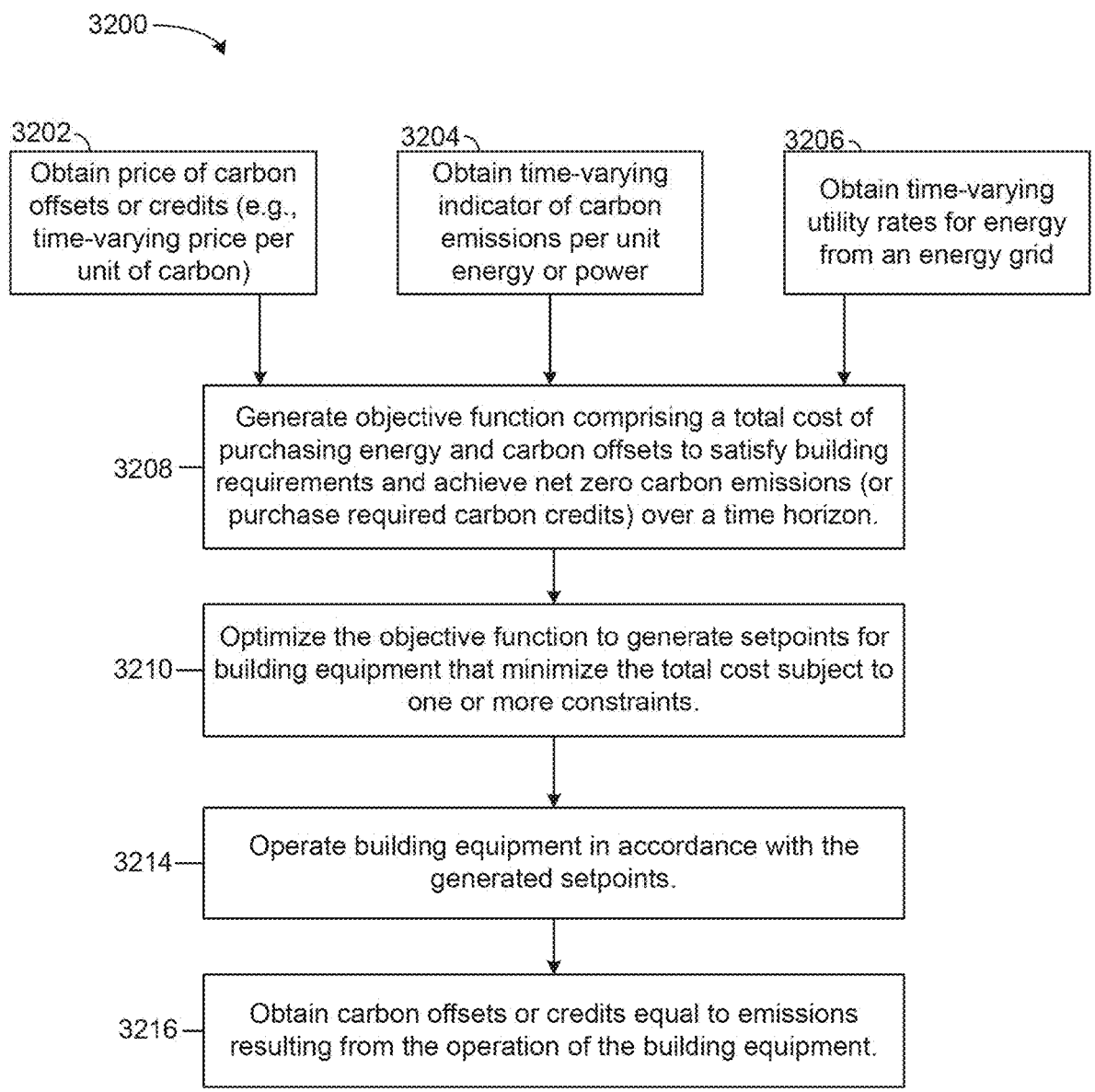
FIG. 17 is a flowchart of a process of cost optimization for building equipment which accounts for costs of carbon offsets to reach net-zero emissions, according to some embodiments.

Referring now to FIG. 17, a flowchart of a process 3200 for optimizing operation of building equipment while internalizing costs of carbon emissions is shown, according to some embodiments. Process 3200 can be executed by the same variety of controllers/processors/etc. as process 3100 described above, in various embodiments.

At step 3202, pricing for carbon offsets or carbon credits is obtained. Carbon offsets refers to markets for carbon sequestration and carbon capture services, for example reforestation or non-deforestation services, whereby a polluter can pay a third party to conduct activities which remove carbon from the atmospheres. Technologies or entities are said to be carbon neutral or net-zero carbon emitters when carbon offsets fully cover the technology's or entity's emissions (e.g., tons of $CO_2$ emitted=tons of $CO_2$ equivalent sequestered). Carbon credits refer to regulatory markets, active in some jurisdictions, in which companies cannot generate emissions beyond an amount defined by freely-transferable carbon credits which are traded in a marketplace. In both cases, a unit of carbon emissions (e.g., ton of $CO_2$) can be associated with an economic cost of offsetting or obtaining regulator permission for that emission.

Step 3202 can include providing interoperability between digital marketplaces for carbon offsets or credits and a predictive controller for building equipment, for example via one or more APIs and connection over the internet. Step 3202 may include monitoring pricing for carbon offsets or credits and building one or more models to predict future prices. In other embodiments, step 3202 includes obtaining data indicating a price that a building owner pre-paid or contracted to pay for carbon offsets or credits.

At step 3204, one or more time-varying indicators of carbon emissions per unit energy or power consumed by a building (e.g., MOER, rate of emissions for local fuel consumption) are obtained, for example as described with reference to steps 3101-3108 of FIG. 15. For example, an effective MOER can be calculated which can account for MOER of energy obtained from a utility grid and contributions of green energy available locally.

At step 3206, time-varying utility rates for energy or power from a utility grid is obtained. For example, utilities typically broadcast a real-time energy rate to customers, and sometimes provide the utility rate for an amount of time ahead (e.g., a few hours into the future). Step 3206 can also include predicting utility rates, for example as described in U.S. patent application Ser. No. 14/717,593, filed May 20, 2015, incorporated by reference herein.

At step 3208, an objective function that calculates a total cost of purchasing energy and purchasing carbon offsets or carbon credits to match carbon emissions associated with generation of the energy is generated. The objective function can include a first term representing the total cost of purchasing energy, for example $\Sigma_{i=1}^{i=H} r_i*p_i$, where $r_i$ is a utility rate at time step i, $p_i$ is energy (or power) consumption at time step i and H indicates the duration of an optimization horizon. The objective function can also include a second term representing the cost of carbon offsets or credits, for example $\Sigma_{i=1}^{i=H} O_i*\beta_i*p_i$, where $\beta_i$ represents carbon-emissions-per-unit-energy (e.g., MOER, average emissions per unit energy) at time step i and $O_i$ represents the price of either offsetting and/or purchasing a credit for a unit of carbon emission at time step i. The objective function can sum or otherwise combine the first term and the second term to obtain a total cost of energy for operation of a building including internalized costs of carbon emissions.

In other embodiments, instead of using an actual price $O_i$ of offsetting emissions, a user-selectable weighting factor $\lambda_i$ is used to allow a user to tune how process 3200 balances trade-offs between energy costs and carbon emissions. The weighting factor can be constant or time-varying (as indicated by the subscript i), for example so that a user can set a low preference for reducing carbon emissions during some times of day and a higher preference for reducing emissions during other times of day, for example. In such examples, the objective function can be formulated as $J=\Sigma_{i=1}^{i=H} p_i*(r_i+\lambda_i\beta_i)$. User selection of a preferred trade-off between cost reductions and emissions reductions is discussed further with reference to FIGS. 20-21 below.

At step 3210, the objective function is optimized to generate setpoints for building equipment (e.g., indoor air temperature setpoints, battery charge/discharge setpoints, various other setpoints/controls decisions described herein) that minimize the total value represented by the objective function subject to one or more constraints (e.g., min J). The constraints and optimization process can be implemented in various ways as described elsewhere herein with reference to other examples. To provide another example, the optimization process may be an adapted version of the processes described in U.S. patent application Ser. No. 17/208,869, filed Mar. 22, 2021, the entire disclosure of which is incorporated by reference herein. At step 3214, the building equipment is operated in accordance with the generated setpoints in order to actualize the goal of minimizing the cost of operating the building equipment while internalizing the costs associated with carbon emissions.

At step 3216, carbon offsets or credits equaling emissions resulting from the operation of the building equipment can be automatically obtained, for example by a building management system. The entire process of achieving carbon neutrality and/or obtaining regulatory permission to emit a certain level of carbon dioxide is thus provided as an integrated solution. Process 3200 can thereby dynamically adjust for trade-offs between costs of purchasing energy and internalized costs of carbon emissions while minimizing overall costs and serving the needs of a building or campus.

Figure 18:
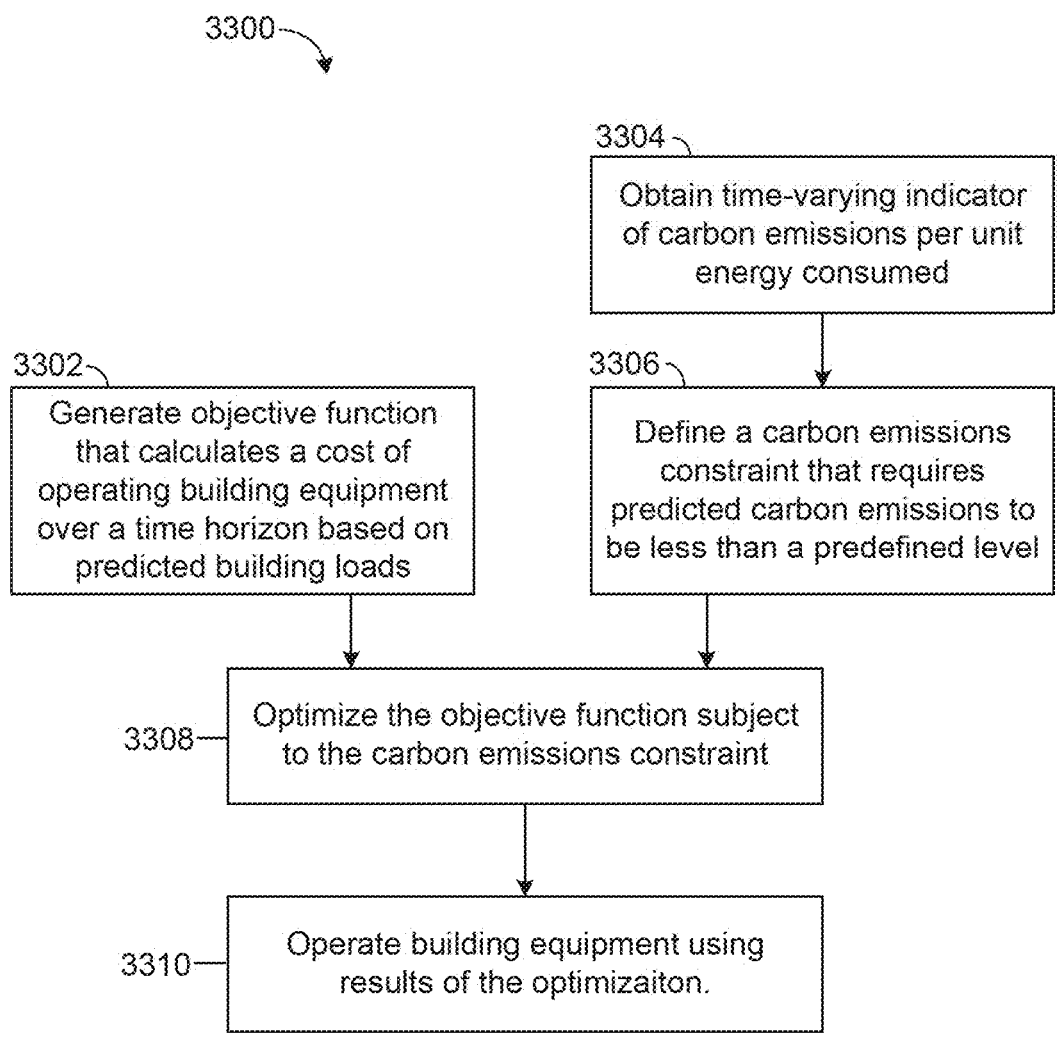
FIG. 18 is a flowchart of a process for optimization of operation of building equipment subject to a constraint on carbon emissions, according to some embodiments.

Referring now to FIG. 18, a flowchart of another process (shown as process 3300) for predictive control that accounts for carbon emissions is shown, according to an example embodiment. In particular, process 3300 accounts for carbon emissions by defining a carbon emissions constraint that prevents or penalizes carbon emissions exceeding a predefined level. Process 3300 can be executed by the various controllers, mentioned above with reference to process 3200 and process 3100 or in the references incorporated by reference herein according to various embodiments.

At step 3302, an objective function that calculates a cost of operating building equipment over a time horizon based on predicted building loads in generated. The objective function may be formulated as discussed with reference to FIG. 17, or as used in U.S. application Ser. No. 14/717,593, filed May 20, 2015, U.S. application Ser. No. 16/115,290, filed Aug. 28, 2018, or Ser. No. 15/199,910, filed Jun. 30, 2016, for example.

At step 3304, one or more time-varying indicators of carbon emissions per unit energy or power consumed is obtained, for example a marginal operating emissions rate and/or a rate of carbon emissions per unit fuel (e.g., per kW of natural gas) consumed locally at a facility. For example, step 3304 may be executed according to the examples of steps 3101-3108 of process 3100.

At step 3306, a carbon emissions constraint is defined. The carbon emissions constraint may be defined as an inequality constraints that requires predicted carbon emissions to be less than a predefined level. The predefined level can be defined based on a government regulation, a level defined by an amount of carbon offsets purchased by a company, a level defined by an amount of carbon credits purchased, and amount input by a user, etc. The carbon emissions constraint can be defined as a hard constraints which prevents all solutions to the optimization problem where emissions exceed the predefined level, or as a soft constraint that adds a penalty to the objective function for any excess emissions. In one example, the carbon emissions constraint is formulated as $M_{grid} + M_{local} \leq M_{threshold}$, where $M_{grid}$ is an estimated amount of carbon emissions associated with energy obtained from a utility grid (e.g., formulated as $M_{grid} = \int_{t=1}^{t=T} MOER(t)*p(t)$ where $MOER(t)$ is the marginal operating emissions rate at time t and $p(t)$ is energy obtained from the grid at time t), $M_{local}$ is an estimated amount of carbon emitted locally from a facility (e.g., formulated as $\Sigma_k \int_{t=1}^{t=T} \rho_k(t)*F_k(t)$ where the index k indicates different subplants, $\rho_k(t)$ is the rate of carbon emissions per unit fuel consumption for subplant k at time t and $F_k(t)$ is the amount of fuel consumption by subplant k at time t, and $M_{threshold}$ is a target maximum amount of carbon emissions. The fuel consumption $F_k(t)$ may include an amount of consumption at time t of natural gas, gasoline, propane, butane, oil products, or other fuels that produce carbon emissions when consumed.

At step 3308, the objective function is optimized subject to the carbon emissions constraint. The carbon emissions constraint can ensure that the solution to the optimization problem (e.g., a result of minimizing a value of the objective function) achieves less than the predefined (maximum allowable) level of carbon emissions, in embodiments where the constraint is a hard constraint, or disincentives exceeding the predefined level in embodiments where the constraint is a soft constraint. At step 3310, the building equipment is operated using results of the optimization.

Figure 19:
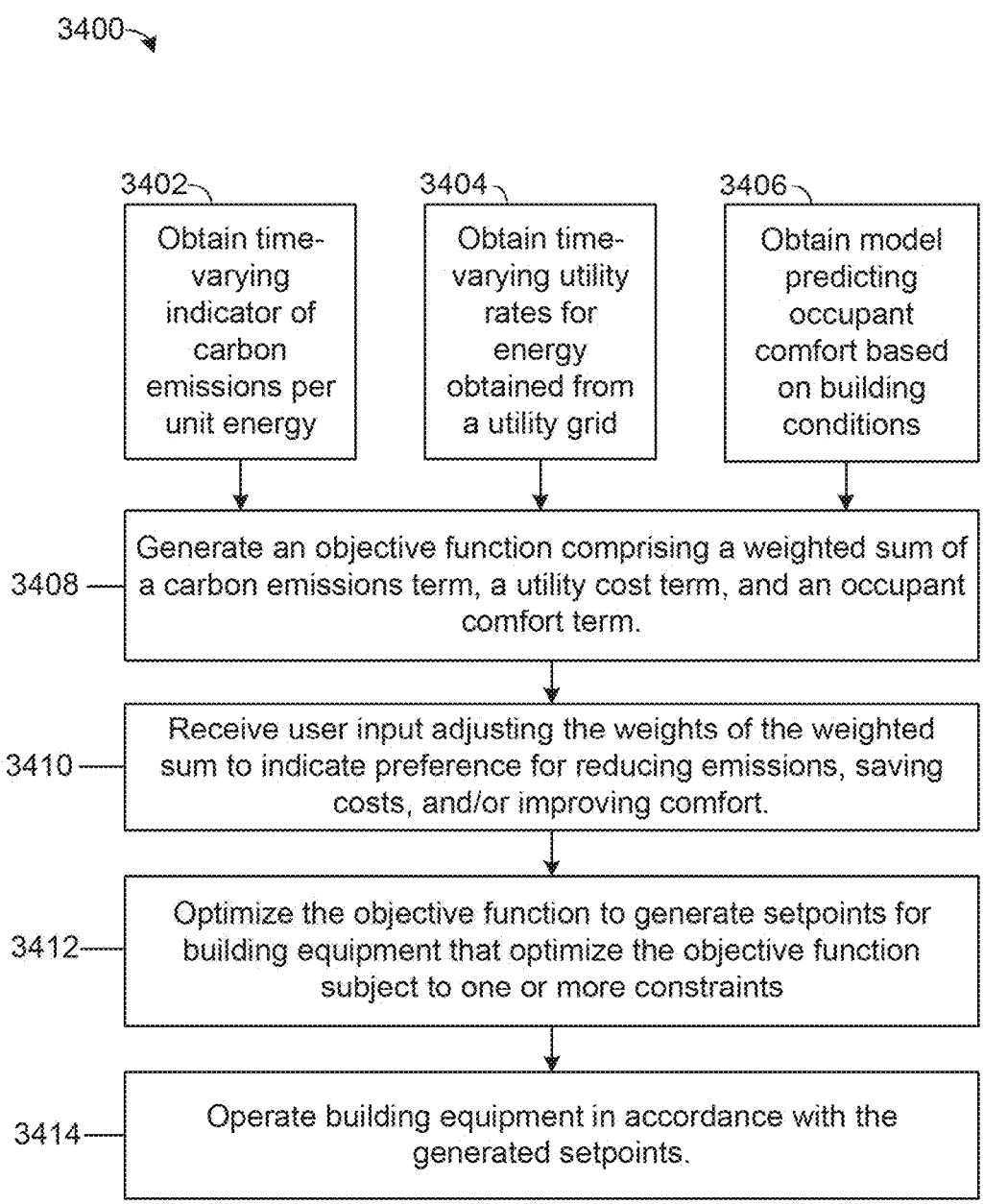
FIG. 19 is a flowchart of a process for customized optimization based on a user input indicating a weighted preference for reducing emissions, saving costs, and/or improving occupant comfort, according to some embodiments.

Referring now to FIG. 19, yet another process for predictive control incorporating carbon emissions considerations is shown, according to some embodiments. In particular, FIG. 19 shows a flowchart of a process 3400 which allows a user to adjust weights to indicate relative preferences for reducing emissions, saving costs, and improving occupant comfort. Process 3400 can be executed by the processors, controllers, etc. mentioned elsewhere herein, in various embodiments.

At step 3402, one or more indications of time-varying carbon emissions per unit energy or power (e.g., MOER, emissions rate per unit of locally-consumed fuels) are obtained, for example as described above with reference to steps 3101-3108. At step 3404, time-varying utility rates for energy obtained from a utility grid are obtained, for example as described with reference to step 3206.

At step 3406, a model predicting occupant comfort based on building conditions is obtained, for example as described in in U.S. patent application Ser. No. 16/943,955, filed Jul. 30, 2020 and incorporated by reference herein, where occupant comfort is quantified based on predicted occupant overrides of temperature setpoints. As another example, occupant comfort may be based on predicted mean vote calculations. Various models for quantifying occupant comfort are possible.

At step 3408, an objective function is generated using the inputs from steps 3402, 3404, and 3406. The objective function can include a weighted sum of a carbon emissions term, a utility costs term, a revenue term (e.g., accounting for revenue associated with participating in an incentive program such as frequency response or demand response as described elsewhere herein) and an occupant cost term, reflecting a sum or integral over a prediction horizon. The carbon emissions term may include a sum of on-site and off-site carbon emissions. For example, the objective function can be formulated as $J = \int_{t=0}^{T} \lambda*M(t) + \alpha*UtilityCosts(t) + \mu*Revenue(t) + \xi*Discomfort(t) \, dt$, for example, where $\alpha, \mu, \lambda, \xi$ are weighting and scaling factors, for example where $M(t) = M_{grid}(t) + M_{local}(t) = MOER(t)*p(t) + \rho(t)*F(t)$. As another example, the objective function can be formulated as $J = \Sigma_{t=0}^{T} (\lambda*MOER_t + \alpha \quad *r_{e,t})*p(t) + *(\lambda*\rho_t + \alpha \quad *r_{f,t})*F(t) + \xi*Discomfort_t$, where $MOER_t$ is the marginal operating emissions rate at time t, $r_{e,t}$ is the price per unit electricity purchased from the grid at time t (e.g., \$/kWh), and p (t) is the amount of electricity obtained from the energy grid at time t, $\rho_t$ is the rate of local carbon emissions per unit fuel consumption (e.g., lb/kWh), $r_{f,t}$ is the price per unit of fuel consumed from a utility at time t (e.g., $/kWh), and F(t) is the amount of fuel (e.g., expressed in kWh) obtained from a utility and consumed at time t.

At step 3410, user input is received, for example via a graphical user interface presented on user computing device (e.g., smartphone, tablet, laptop, desktop computer, etc.). The user input indicates an adjustment to the weights of the weighted sum (e.g., α, β, γ) to indicate a user relative preference for reduction emissions, saving costs, and/or improving comfort. For example, increasing α while decrease β in the example above will cause the process 3400 to prefer reducing emissions over saving costs, and vice versa. As another example, increase γ while decreasing α will cause process 3400 to prefer improving occupant comfort over reducing emissions, and vice versa. A user interface can be provided with slider bars, numerical inputs, etc. to allow a user to visualize the relative selection and to understand the adjustments. In some embodiments, a graphical interface showing predicted outcomes for give adjustments is shown to allow a user to compare options and effects of changing the weights.

At step 3412, the objective function (with the user-selected weights of step 3410) is optimized to generate setpoints for building equipment that minimize a value of the objective function (e.g., of the weighted sum) subject to one or more constraints. The minimization approach and constraints can be implemented as described elsewhere herein, and can provide for active setpoint management of a building or buildings. Any of the various settings, setpoints, load values, control decisions, resource allocations, charge/discharge rates, etc. described herein can be optimized by minimization of the objective function in various embodiments. At step 3414, the building equipment is operated in accordance with the generated setpoints to achieve the user's desired balance of emissions, cost, and occupant comfort.

Figure 20:
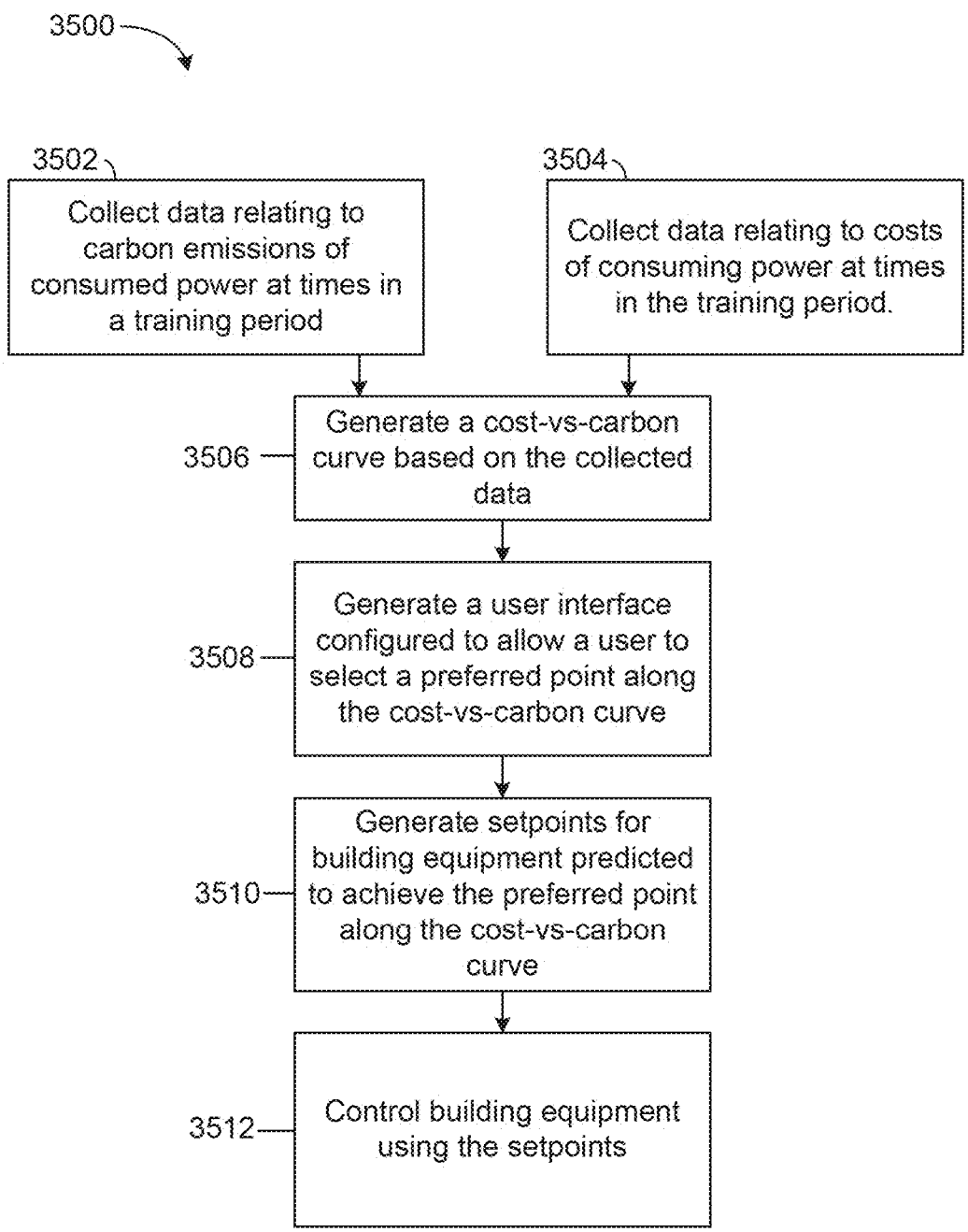
FIG. 20 is a flowchart of a process for selecting and controlling equipment to achieve a target point on a cost-vs-carbon curve, according to some embodiments.
Figure 21:
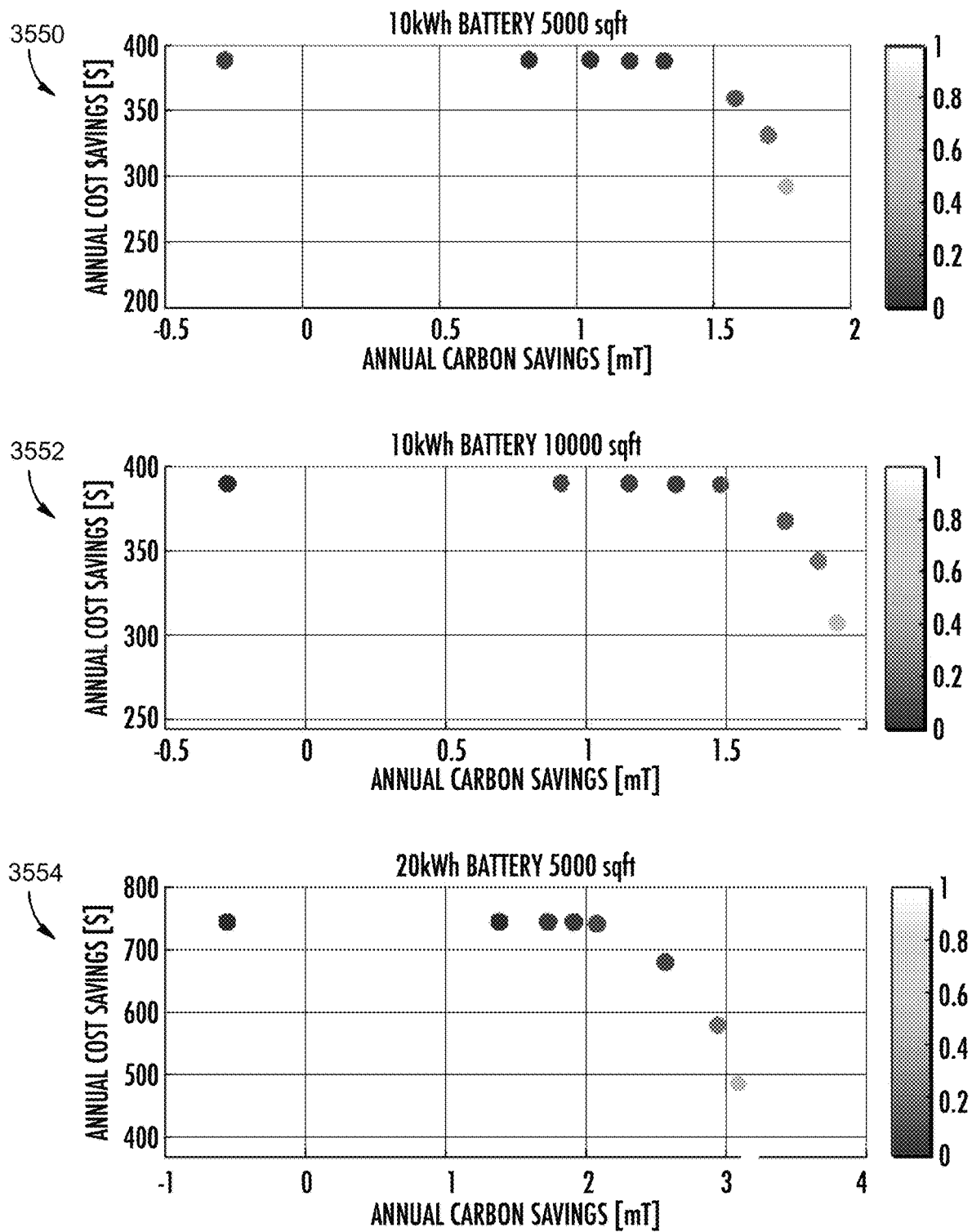
FIG. 21 is an illustration of example cost-vs-carbon curves, according to some embodiments.

Referring now to FIG. 20, a flowchart of a process 3500 for controlling building equipment to achieve a target point on a cost-vs-carbon curve is shown, according to some embodiments. The process 3500 can be executed by the processors, controllers, etc. mentioned elsewhere herein, in various embodiments. FIG. 21 is also referred to here to facilitate explanation of process 3500, and shows example cost-vs-carbon curves, according to some embodiments.

At step 3502, data relating to carbon emissions of consumed power at a plurality of times in a training period is collected, while at step 3504 data is collected relating to costs of consuming the power at the times in the training period. For example, steps 3502 and 3504 can combine to amount to collecting a dataset of carbon emissions and cost pairs, with each pair corresponding to a historical point in time (or small segment in time). The carbon emissions data can capture both off-site emissions (e.g., associated grid power plants) and on-site emissions (e.g., associated with on-site burning of fuels for heat or electricity generation). In some embodiments, steps 3502 and 3504 can include performing an experiment to generate suitable data, for example by controlling building equipment across the selectable range of user preferences in order to generate data reflecting the options available to a user.

At step 3506, a cost-vs-carbon curve is generated based on the collected data from steps 3502 and 3504. For example, a curve can be fit to the data using regression modeling or some suitable fitting approach. The curve take on various shapes in various scenarios dependent on the collected data, for example as shown in FIG. 21.

FIG. 21 shows cost-vs-carbon curves for different building sizes and different equipment availability, in particular different battery sizes, in particular a first graph 3550, a second graph 3552, and a third graph 3554. The first graph 3550, second graph 3552, and third graph 3554 each has cost savings on the y-axis (with greater values indicating more savings/less cost) and carbon savings on the x-axis (with greater values indicating more savings/less emissions). For example, the first graph 3550 and the third graph 3554 show data for the same sized space but supplied with a much larger battery in the scenario of third graph 3554, which is shown as unlocking substantially more cost savings and emissions savings. The points shown on the graphs 3550, 3552, 3554 are coded to show that the points correspond to values of a user-selectable weighting factor (e.g., values of λ in an objective function $J=\Sigma_{i=1}^{i=H}p_i*(r_i+\lambda\beta_i)$).

As shown in the first graph 3550, the second graph 3552, and the third graph 3554, cost savings and carbon savings may have an exponential relationship, such that cost savings are relative constant up to a certain amount of carbon savings, and then decrease quickly (exponentially) beyond that point. A graph such as the first graph 3550, second graph 3552, and third graph 3554, for a particular building, group of buildings, etc. can be automatically generated at step 3508 and displayed via a graphical user interface to allow a user to directly view and assess the relationship between cost savings and carbon savings for the particular building or group of buildings managed by the user.

At step 3508, a user interface is generated that allows a user to select a preferred point along the cost-vs-carbon curve generated in step 3506. For example, a graphical user interface may show the cost-vs-carbon curve (e.g., a graph as in FIG. 21) and allow the user to select a point on the curve by touching or clicking on the preferred point. Selecting a point on the cost-vs-carbon curve can amount to or result in selection of a value of a weighting factor used in an objective function, for example a value of λ in an objective function $J=\Sigma_{i=1}^{i=H}p_i*(r_i+\lambda\beta_i)$). The user can thus directly select a desired tradeoff between cost and carbon emissions while seeing the actual relationship between the variables for a particular building, plant, or campus, and without needing to understand or manipulate the objective function itself, other optimization logic, software code, etc.

At step 3510, setpoints for building equipment are generated which are predicted to achieve the preferred, selected point along the cost-vs-carbon curve. Step 3510 can be executed by optimizing an objective function with a weighting factor determined based on step 3508. In other embodiments, the selected point on the cost-vs-carbon curve can be treated as a target for an optimization, such that an error function is minimized to reduce or eliminate predicted deviations from the target (e.g., deviations of an actual or predict cost and emissions from the selected target cost and emissions). Decision variables of the optimization may include temperature setpoints for the building, equipment on/off decisions, variables relating to components of local energy systems (e.g., batteries, generators, storages, renewable sources, etc.), and various other variables in various implementations. The optimization can be performed subject to one or more constraints, for example temperature constraints on predicted indoor air temperature for the building.

At step 3512, building equipment is controlled using the setpoints, for example a time-series of temperature setpoints output from step 3510. The building equipment is thereby operated to achieve the user-selected predicted point on the cost-vs-carbon curve.

Figure 22:
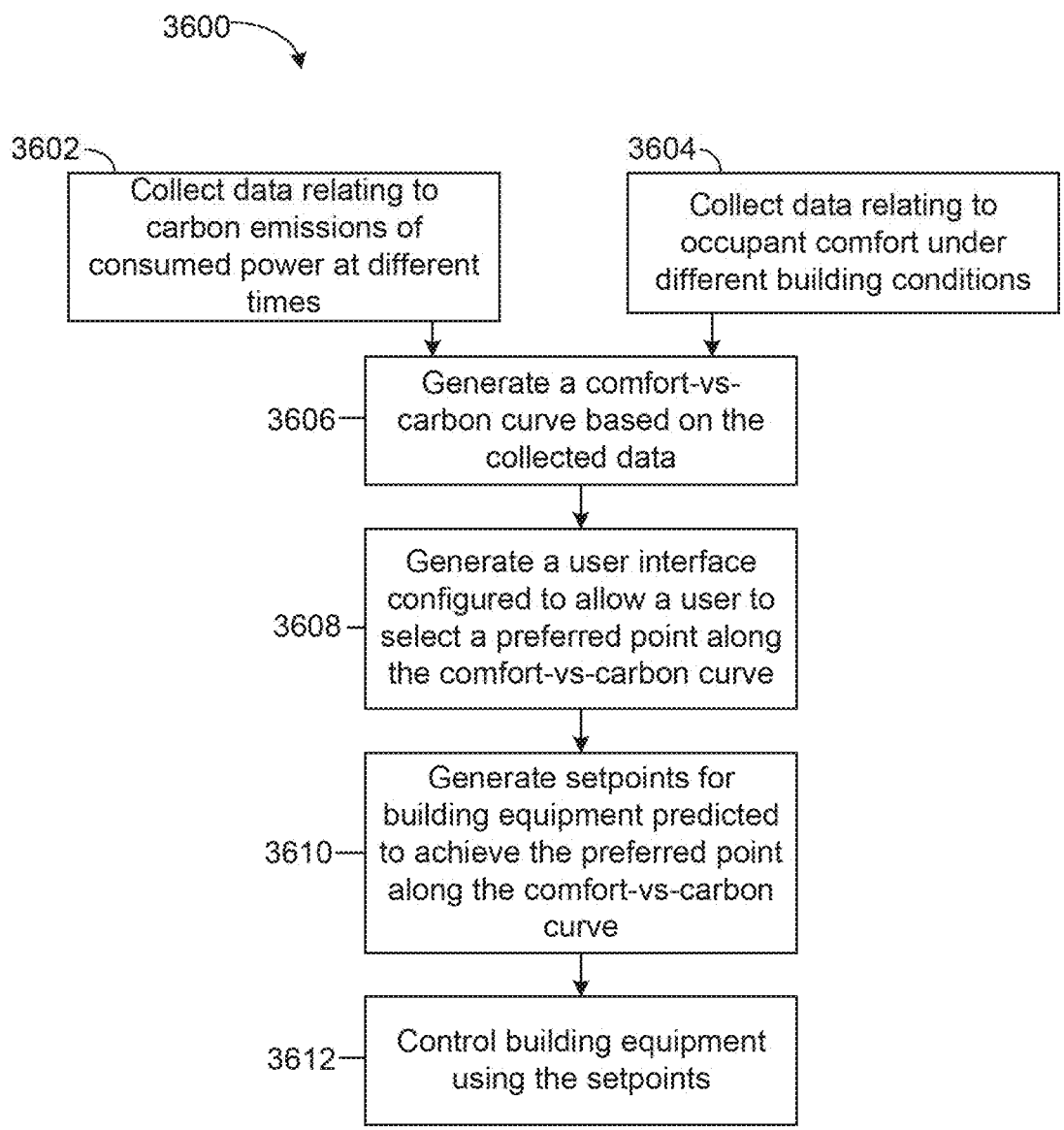
FIG. 22 is a flowchart of a process for selecting and controlling equipment to achieve a target point on a comfort-vs-carbon curve, according to some embodiments.

Referring now to FIG. 22, a flowchart of a process 3600 for controlling building equipment to achieve a target point on a comfort-vs-carbon curve is shown, according to some embodiments. The process 3600 can be executed by the processors, controllers, etc. mentioned elsewhere herein, in various embodiments.

At step 3602, data relating to carbon emissions of consumed power (e.g., including on-site and off-site emissions) at a plurality of times in a training period is collected, while at step 3604 data is collected relating to occupant comfort at the times in the training period. Occupant comfort data can be sourced from surveys, polling, occupant overrides of building setpoints, estimates based on measured building conditions (e.g., temperature, humidity, etc.). For example, steps 3602 and 3604 can combine to amount to collecting a dataset of carbon emissions and comfort pairs, with each pair corresponding to a historical point in time (or small segment in time).

At step 3606, a comfort-vs-carbon curve is generated based on the collected data from steps 3502 and 3504. For example, a curve can be fit to the data using regression modeling or some suitable fitting approach. The curve take on various shapes in various scenarios dependent on the collected data.

At step 3608, a user interface is generate that allows a user to select a preferred point along the comfort-vs-carbon curve generated in step 3506. For example, a graphical user interface may show the comfort-vs-carbon curve and allow the user to select a point on the curve by touching or clicking on the preferred point. The user can thus directly select a desired tradeoff between occupant comfort and carbon emissions while seeing the actual relationship between the variables for a particular building, plant, or campus.

At step 3510, setpoints for building equipment are generated which are predicted to achieve the preferred, selected point along the comfort-vs-carbon curve. The selected point can be treated as a target for an optimization, such that an error function is minimized to reduce or eliminate predicted deviations from the target. Decision variables of the optimization may include temperature setpoints for the building, equipment on/off decisions, variables relating to components of a local energy system (e.g., batteries, storages, generators, renewable sources, etc.), and various other variables in various implementations. The optimization can be performed subject to one or more constraints, for example cost constraints on total cost of operating the building equipment.

At step 3512, building equipment is controlled using the setpoints. The building equipment is thereby operated to achieve the user-selected predicted point on the comfort-vs-carbon curve.

Automated Asset Recommendations for Carbon Emissions Reductions

Various passages above describe various assets (e.g., units of equipment) that can be added to a building system to reduce operational costs and carbon emissions, and, in some scenarios achieve carbon neutrality for a building. However, a technical challenge exists relating to selecting the appropriate assets or appropriate size of an asset needed to optimally operational goals and meet carbon reduction targets. For example, adding oversized equipment may actually increase a carbon footprint, whereas adding insufficient assets will not allow goals to be met. Accordingly, a technical solution for assessing and predicting building assets needs is a highly desirable technology.

Figure 23:
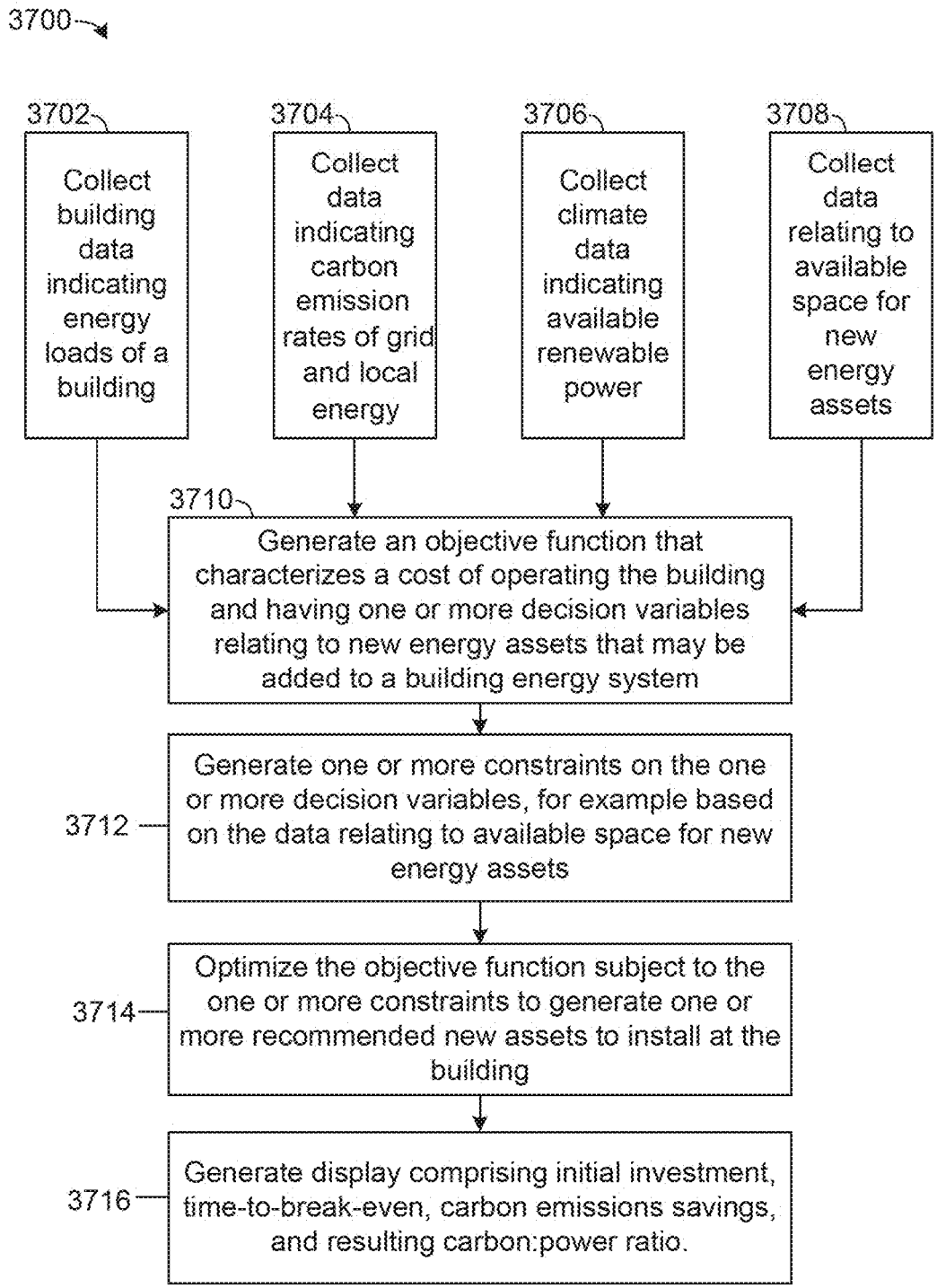
FIG. 23 is a flowchart of a process for automatically generating recommendations for new energy assets to be added to a building to achieve technical advantages such as optimal carbon emissions reductions, according to some embodiments.

Referring now to FIG. 23, a process 3700 for automatically recommending one or more building assets to add to a building to optimally achieve operational goals and carbon reduction targets is shown, according to some embodiments. The process 3700 can be executed by one or more computing elements of the building energy optimization system described in U.S. patent application Ser. No. 16/518,314, filed Jul. 22, 2019, the entire disclosure of which is incorporated by reference herein, for example.

At step 3702, building data indicating energy loads of a building (e.g., electrical demand) is collected. At step 3704, data indicating carbon emission levels of grid energy (e.g., time-varying carbon:power ratio as described above) and carbon emissions of on-site fuel consumption (e.g., emission rates for different equipment models and/or subplants) is collected. At step 3706, climate data indicating available renewable power is collected (e.g., average number of sunny days, length of days, solar intensity, average wind speed, average number of windy days, etc.) is collected for the location of the building. At step 3708, data relating to available space for new energy assets is collected, i.e., physical limits on where a new asset could be positioned (indoor or outdoor, rooftop or ground level, etc.) or how big a new asset could be (roof size, volume of available space, area of available space, etc. in order to fit with an existing building and pre-existing building equipment.

At step 3710, an objective function is generated that characterizes a cost of operating the building over a future time period and has one or more decision variables relating to one or more new energy assets that could be added to the building system. For example, the objective function can include binary variables indicating whether or not a particular type of new asset will be added (e.g., add or do not add a chiller 700 having an integrated battery and/or fuel cell, add or do not add a renewable energy source such as a photovoltaic system, add or do not add a heat recovery chiller, add or do not add thermal energy storage, add or do not add a heat pump, add or do not add a geothermal ground loop, etc.) and variables that can indicate available sizes of such assets that are available from an equipment supplier (e.g., different chillers indicated by capacity) or different numbers of such assets (e.g., two, three, four, etc. units of a particular equipment model). The objective function can also account for initial investment and start-up costs relating to purchase and installation of new assets. The objective function may also include terms relating to carbon emissions, carbon offsets, carbon credits, occupant comfort, etc. as described in the various examples above.

At step 3712, one or more constraints are defined, for example based on the data collected in any of steps 3702-3708. For example, a physical size constraint can be defined based on the data relating to available space for new energy assets and stored information relating to the size and space requirements of the potential new energy assets, to ensure that only assets that will fit at the building will be considered. As another example, a carbon emissions constraint can be defined as in process 3300. As another example, constraints can be used to characterize the expected power outputs of renewable energy assets (e.g., photovoltaic cells of a renewable energy system) based on the collected climate data and the data relating to available space/positioning for new assets. Various such considerations can be defined as constraints on an optimization process.

At step 3714, the objective function is optimized subject to the constraints to generate optimal values for the decisions variables (e.g., values that minimize the objective function subject to the constraints). The decision variables indicated recommended assets to add and recommended sizes or quantities of those assets. The optimization may include any of the various considerations, approaches, processes, etc. described in U.S. patent application Ser. No. 16/518,314, filed Jul. 22, 2019, the entire disclosure of which is incorporated by reference herein.

At step 3715, a display is generated that shows the recommendation output from step 3714, the required initial investment, a time-to-breakeven for the investment, predicted resulting carbon emissions savings, predicted resulting carbon-to-power ratio, and any other metrics that may be relevant to a decision maker. In some embodiments, the recommended assets are automatically ordered and installation technicians are automatically scheduled to complete the installation. The process can then continue by controlling the building equipment include the new assets to optimally serve the building according to various strategies described herein.

Enterprise-Wide Carbon Emissions Tracking and Mitigation

Figure 24:
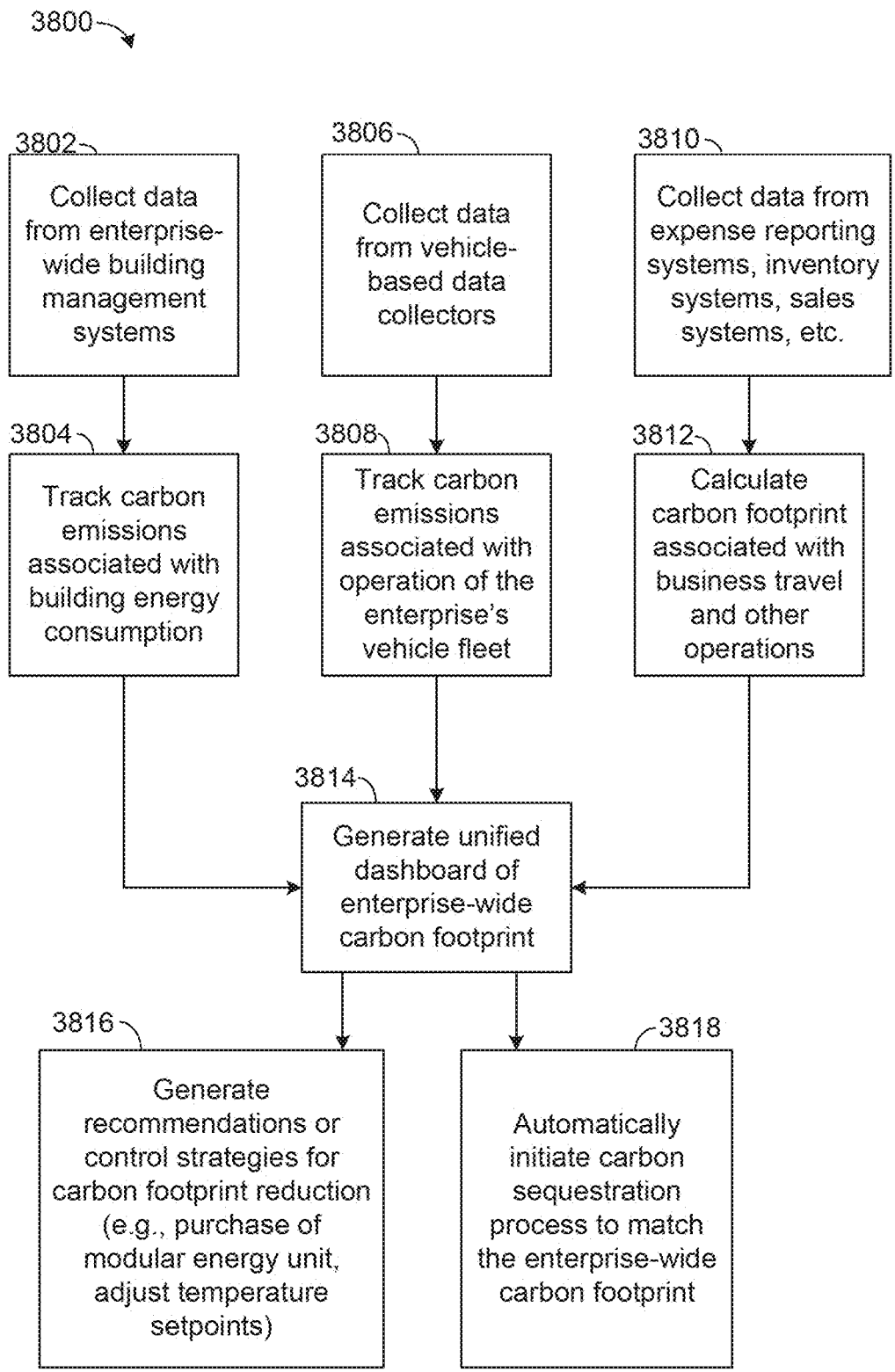
FIG. 24 is a flowchart of a process for generating an enterprise-wide dashboard of carbon emissions and initiating carbon footprint reduction, according to some embodiments.

Referring now to FIG. 24, a flowchart of a process 3800 for enterprise-wide carbon emissions tracking and mitigation is shown, according to an example embodiment. Process 3800 can be executed by processing and memory circuitry in communication with various data sources, according to some embodiments. For example, process 3800 can be executed by processing circuitry executing a software platform that supports a building management system.

At step 3802, data from an enterprise-wide building management system is collected. The data may indicate energy consumption of the enterprise's buildings and the source of the consumed energy. At step 3804, carbon emissions associated with the building energy consumption is tracked, for example at the building level and at the enterprise level. Calculating carbon emissions can be performed using the concepts described with reference to steps 3101-3108 of process 3100, for example, and can include on-site emissions from the enterprise's buildings and off-site emissions associated with grid energy or other resources used by the enterprise.

At step 3806, data from vehicle-based data collectors is obtained. The vehicle-based data collectors can harvest data relating to operation, mileage, fuel consumption, etc. of an enterprise's vehicle fleet, including company cars, delivery trucks, etc. At step 3808, carbon emissions associated with operating of the enterprise's vehicle fleet is tracked, for example on an overall enterprise level and to see carbon emissions for different regions, business units, individual employees, etc.

At step 3810, data is collected from an expense reporting system or other enterprise software platform that collects data relating to employee travel and/or company orders and purchases. For example, a travel agency portal used to book employee travel could be used in some embodiments. The data collected in step 3810 indicates carbon emissions generated by employee travel (e.g., airplane flights, travel in third-party vehicles such as taxis, etc.) and other activities (e.g., delivery of ordered goods, etc.). The data can also include carbon emissions associated with manufacturing of goods purchase by the enterprise (e.g., production of steel or other raw materials) or services provided to the enterprise (e.g., emission tied to energy consumption of data center services provided to the enterprise). At step 3812, the carbon footprint associated with business travel and other operations reflected in the data collected in step 3810 is calculated ant tracked.

At step 3814, a unified dashboard showing the enterprise-wide carbon footprint is generated. The dashboard can display overall carbon emissions data, identify the contributing sources, and identify high-emitting buildings, business units, departments, regions, employees, for example. The unified dashboard can be provided via a graphical user interface.

At step 3816, recommendations are automatically generated for carbon footprint reduction. In some embodiments, step 3816 includes executed process 3700. In some embodiments, step 3816 comprises automatically adjusting building setpoints according to one of the control processes described above. In some embodiments, the recommendations include reducing business travel, purchasing electric vehicles for the company fleet, and investigating significant emissions by a particular employees. Various outcomes at step 3816 are possible.

At step 3818, a carbon sequestration process is automatically initiated to match the enterprise-wide carbon footprint, thereby achieving enterprise-wide net-zero emissions. The carbon sequestration process can include planting trees or other plants, for example. As another example, the carbon sequestration process includes operating a sequestration device configured to extract carbon from the atmosphere and store the carbon in a solid form. As another example, the carbon sequestration process includes purchasing carbon offsets from a third-party provider. Process 3800 thereby facilitates identification of carbon emission levels, management of carbon emissions, and helps facilitate achieving carbon neutrality.

Battery Control Using Marginal Operating Emissions Rate

Figure 25:
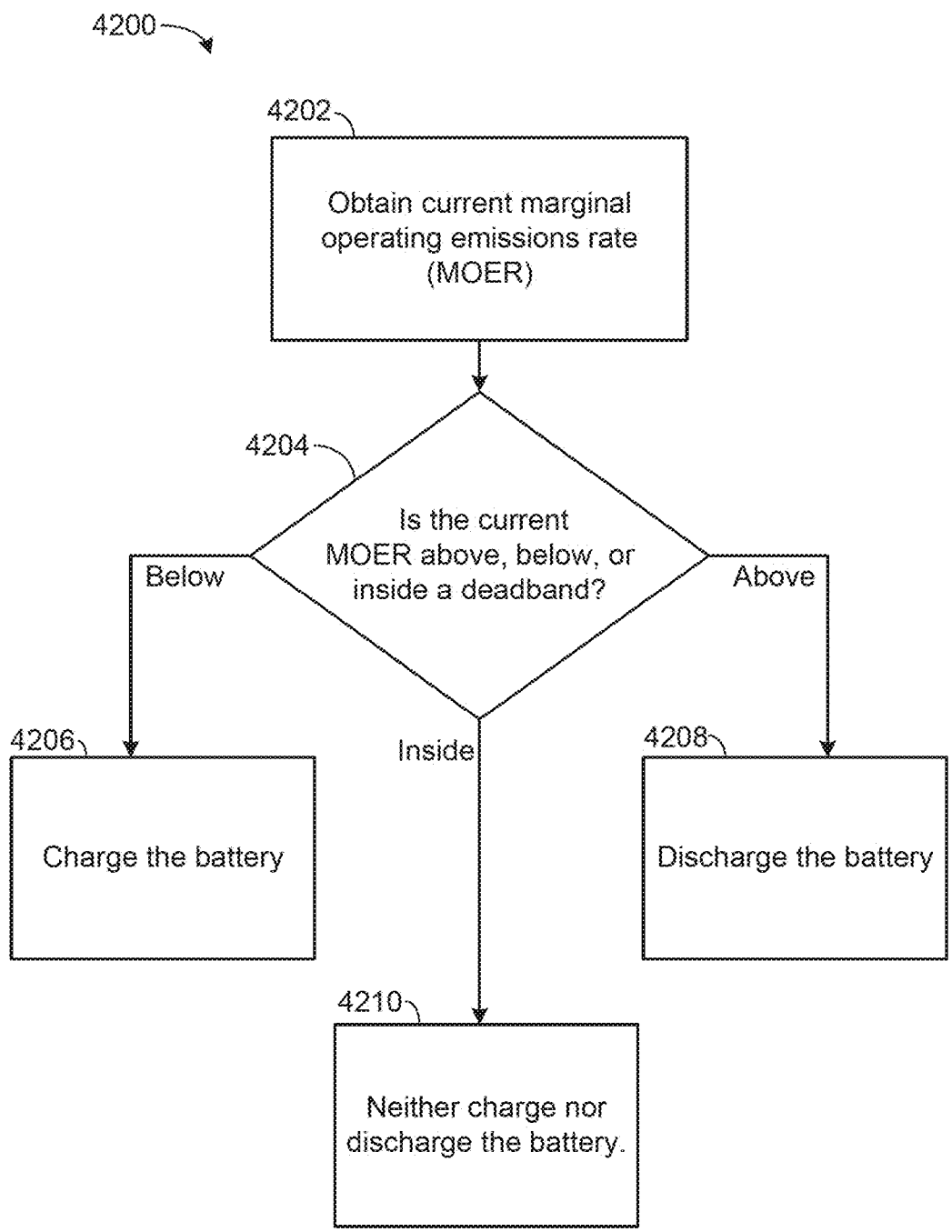
FIG. 25 is a flowchart of a process for controlling a battery based on a marginal operating emissions rate, according to some embodiments.

Referring now to FIG. 25, a flowchart of a process 4200 for controlling a battery using a marginal operating emissions rate is shown, according to some embodiments. The process 4200 can be executed by various controllers, systems, etc. described herein in various embodiments. Although the embodiment of process 4200 shown in FIG. 25 refers to a battery, it should be understood that the battery may include multiple battery cells and that the process 4200 could be adapted for use with other types of energy storage.

At step 4202, a current marginal operating emissions rate (MOER) is obtained. In some embodiments, steps 4202 includes receiving the MOER from the utility grid or from a third-party service provider (e.g., via the Internet). In some embodiments, step 4202 includes calculating or estimating the MOER based on weather data, historical MOER values, etc.

At step 4204, a determination is made as to whether the current MOER is above a deadband (i.e., greater than a value defining an upper limit of the deadband), below the deadband (i.e., less than a value defining a lower limit of the deadband), or inside the deadband (i.e., greater than the lower limit and less than the upper limit). The deadband can be defined based on historical values of the MOER in particular scenario, for example such at the lower limit of the deadband is at 20% of the maximum historical MOER and the upper limit of the deadband is at 80% of the maximum historical MOER (assuming a scenario where the MOER drops below 20% of its maximum value). The deadband can be defined based on frequency, such that the MOER is below the deadband 20% (or some other percentage) of the time on average and above the deadband 20% (or some other percentage) of the time on average. Thus, the deadband can be appropriately defined based on actual MOER values. The determination at step 4204 can be executed by comparing the numerical value of the MOER with the numerical values that define the deadband.

If a determination is made in step 4204 that the current MOER is less than the deadband, the process 4200 proceeds to step 4206 where the battery is charged. Because a low MOER indicates that low marginal carbon emissions will be associated with energy obtained and charged into the battery, step 4206 corresponds to a low-carbon charging of the battery. Step 4206 can continue until the battery is fully charged or until the MOER changes and process 4200 is re-run.

If a determination is made in step 4204 that the current MOER is greater than the deadband, the process 4200 proceeds to step 4208 where the battery is discharged. Because a high MOER indicates that relative-high marginal carbon emissions will be associated with any energy obtained from a grid at that time, discharging the battery during such periods reduces the need to obtain power during such periods, thereby reducing emissions. Low-carbon energy can thus be time-shifted by storing it in step 4206 when the MOER is below the deadband and discharging it in step 4208 when the MOER is above the deadband. Step 4208 can continue until the battery is fully discharged or until the MOER changes and process 4200 is re-run.

If a determination is made in step 4204 that the current MOER is inside the deadband, the process 4200 proceeds to step 4210. In the embodiment shown, the battery is neither charged nor discharged in step 4210, and a substantially constant amount of energy is maintained in the battery. The amount of energy stored for discharge in higher-MOER periods, while any extra capacity is kept open for charging during lower-MOER periods. In other embodiments, when the current MOER is inside the deadband, a hysteresis-type control is provided where the previous charge or discharge state of the battery is continued for a least a threshold amount of time, for example in order to prevent high-frequency switching between charging/discharging/neither states that can otherwise contributed to battery degradation.

Process 4200 can thereby provide an efficient, easy-to-implement control solution that achieved emissions savings by controlling a battery based on marginal operating emissions rates.

Demand Allocation Based on Multiple Emissions Rates

Figure 26:
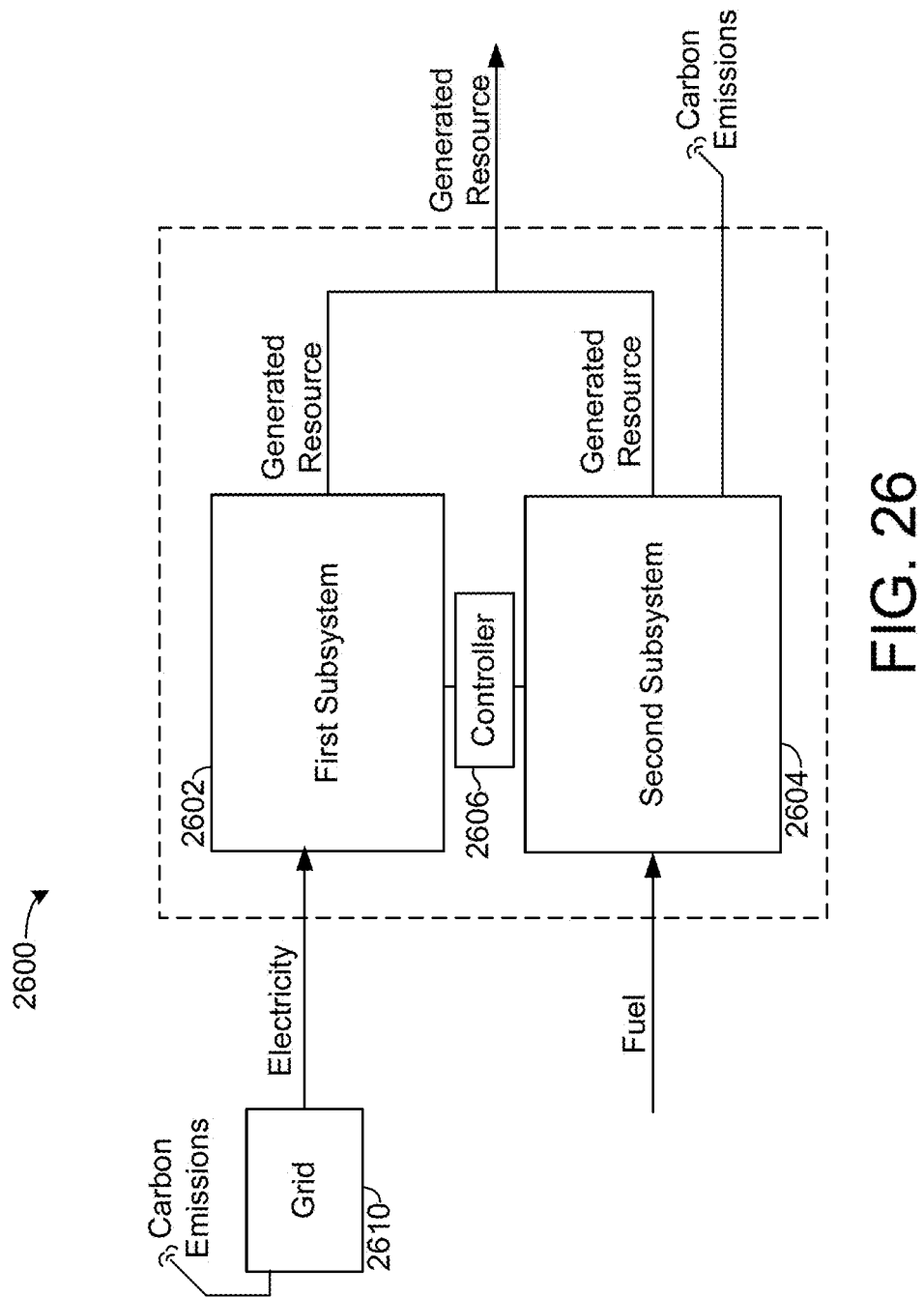
FIG. 26 is a block diagram of a system with demand allocation based on multiple emissions rates, according to some embodiments.

Referring now to FIG. 26, a block diagram of a system 2600 is shown, according to some embodiments. The system 2600 includes a first subsystem 2602, a second subsystem 2604, and a controller 2606. The system 2600 can be a portion of or implemented in conjunction with the various other system and methods described herein. The first subsystem 2602 and the second subsystem 2604 can be separate units of equipment, separate groups of equipment (e.g., subplants), elements of the same unit of equipment, etc.

As shown in FIG. 26, the first subsystem 2602 receives electricity from grid 2610, which includes electricity sources (e.g., power plants, etc.) and electricity transmission equipment. The first subsystem 2602 is configured to produce a resource (shown as "generated resource") by consuming electricity. That is, the first subsystem 2602 uses electrical power to produce the resource. The resource may include, for example, any of the resources previously described (e.g., hot thermal energy, cold thermal energy, etc.). In one example, the first subsystem 2602 is a heat recovery chiller configured to provide heating and cooling (e.g., in the form of hot water and cold water) by consuming electricity. In another example, the first subsystem 2602 is or includes a resistive heater configured to transform electrical power into heat (e.g., an electric boiler that generates hot water, an electric furnace that generates hot air, a resistive space heater that directly heats a building zone, etc.). The generated resource is hot thermal energy (e.g., hot water, steam, hot air, etc.) in these examples, but could be any other resource depending on the particular type of equipment within the first subsystem 2602.

As shown in FIG. 26, the system 2600 is also shown as receiving a fuel. The fuel may be or include any type of substance or material that creates carbon emissions when consumed or combusted. For example, the fuel may be a fossil fuel, natural gas, oil or any oil-based product, gasoline, diesel, coal, ethanol, biofuel, biomass, wood, or any other substance or material which creates carbon emissions when consumed or combusted, or any combination thereof (e.g., mixtures of gasoline and ethanol, natural gas with additives, mixtures of various oil products, etc.). In particular, the second subsystem 2604 is configured to produce the same generated resource as the first subsystem 2602 by consuming the fuel received by the second subsystem 2604. For example, the second subsystem 2604 may burn, combust, etc. the fuel and use the released energy as heat to produce hot water, steam, hot air, etc. In some embodiments, the second subsystem 2604 uses the fuel to generate mechanical or electrical power and uses the mechanical or electrical power to produce the generated resource. Consumption of the fuel by the second subsystem 2604 results in carbon emissions from the second subsystem 2604.

In some examples, the second subsystem 2604 is a boiler configured to produce hot water. As another example, the second subsystem 2604 is a furnace configured to produce hot air. As another example, the second subsystem 2604 is a gas-fired fireplace or other element configured produce heat transferred directly to a building space. In some embodiments, the second subsystem 2604 includes any type of equipment that consumes the fuel on site (e.g., locally within the building or facility being heated, within a central plant or central energy facility that provides hot thermal energy to one or more buildings, etc.) and produces carbon emissions as a result.

As shown FIG. 26, the first subsystem 2602 and the second subsystem 2604 are configured to produce the same resource, shown as the generated resource. Production of the generated resource by the combination of the first subsystem 2602 and the second subsystem 2604 serves a demand for the generated resource, for example a demand from a building for the generated resource, a demand from a subplant of a central plant for the generated resource, or some other demand for the generated resource. The generated resource can directly serve an end goal (e.g., can be provided to a building to satisfy the building's demand for the generated resource) or can be further processed and used by downstream equipment (e.g., can serve as an intermediate resource produced and consumed within a central energy facility or central plant).

The system 2600 thereby provides an option to satisfy demand for the generated resource by operating the first subsystem (and thus consuming electricity from the grid 2610), by operating the second subsystem 2604 (and thus consuming the fuel), or some combination thereof. The controller 2606 is configured to allocate predicted demand for the generated resource between the first subsystem 2602 and the second subsystem 2604, for example by determining, for each time step over an optimization period, a first amount of the generated resource to be produced by the first subsystem 2602 and a second amount of the generated resource to be produced by the second subsystem 2604.

The controller 2606 is configured to allocate demand between the first subsystem 2602 and the second subsystem 2604 based on multiple carbon emissions rates, in particular based on different rates of carbon emissions associated with operating of the first subsystem 2602 and the second subsystem 2604. The first subsystem 2602 received electricity from grid 2610 which receives at least a portion of the electricity from carbon-emitting electricity sources (e.g., fuel burning power plants). As detailed above, the rate of carbon emissions associated with the electricity consumed from the grid 2610 may be characterized based on a marginal operating emissions rate. The controller 2606 may obtain the marginal operating emissions rate for the electricity received from the grid 2610 and use the marginal operating emissions rate in allocating demand across the first subsystem and the second subsystem. For example, the controller 2606 may use the marginal operating emission rate in combination with a model (subplant curve, efficiency factor, etc.) that indicates amounts of electricity required by the first subsystem 2602 to produce amounts of the generated resource. The controller 2606 can thereby assign an amount of carbon emissions to a decision variable indicating an amount of the generated resource to be produced by the first subsystem 2602.

The controller 2606 is also configured to account for carbon emissions emitted locally from the second subsystem 2604. The second subsystem 2604 is configure to emit an amount of carbon emissions that can be modeled by the controller 2606 as a function of the amount of fuel consumed by the second subsystem 2604 and/or as a function of an amount of the generated resource produced by the second subsystem 2604. For example, the amount of carbon emissions by the second subsystem 2604 can be modelled as a fixed rate multiplied by an amount of the generated resourced produced by the second subsystem. The controller 2606 can thereby assign an amount of carbon emissions to a decision variable indicating an amount of the generated resource to be produced by the first subsystem 2602.

The controller 2606 can execute an optimization process subject to a constraint that requires a predicted demand for the generated resource to be equal to a portion of the predicted demand allocated to the first subsystem plus a portion of the predicted demand allocated to the second subsystem. The portions allocated to the first subsystem 2602 and the second subsystem 2604 may be the decision variables of the optimization process. The optimization process operates to select the allocation that minimizes an objective function that accounts for (1) a cost of purchasing the electricity to be used to produce the portion of the predicted demand for the generated resource allocated to the first subsystem, (2) a penalty for carbon emissions associated with the electricity used to produce the portion of the predicted demand for the generated resource allocated to the first subsystem, (3) a cost of purchasing the fuel to be used to produce the portion of the predicted demand for the generated resource allocated to the second subsystem, and (4) a penalty for carbon emissions resulting from consuming the fuel to produce the portion of the predicted demand for the generated resource allocated to the first subsystem.

While this is one example of an objective function that can be used in the optimization process, it is contemplated that the objective function is not limited to cost optimization and can account for any of a variety of control objectives in addition to cost (e.g., by adding additional terms in the objective function) or in place of cost (e.g., by substituting cost terms with other terms that account for other control objectives). Some examples of other control objectives include carbon emissions as the primary control objective, disease transmission, occupant comfort, equipment maintenance cost, equipment reliability, or any other control objective which may be desirable to optimize in a building. These and other examples of additional control objectives and corresponding objective functions are described in detail in U.S. patent application Ser. No. 17/576,615 filed Jan. 14, 2022, the entire disclosure of which is incorporated by reference herein.

In the embodiments involving predicted demand, the optimization process plans allocations over a future time period. In other examples, the controller 2606 makes real-time decisions to operate the first subsystem 2602 and the second subsystem 2604 based at least in part on real-time emission rates associated with the first subsystem 2602 and the second subsystem 2604.

In one example scenario, the first subsystem 2602 is an electric water heater that uses electricity to produce hot water and the second subsystem 2604 is a natural gas water heater that burns natural gas to produce hot water (e.g., integrated into a unified equipment unit, separate subplants). The controller 2606 operates to allocate demand for hot water between the electric water heater and the natural gas water heater. In many locations and scenarios, the utility costs associated with purchasing natural gas per are lower than the costs of purchasing electricity (e.g., per unit of hot water production). However, in scenarios where the grid includes at least some renewable energy sources or carbon capture technologies, the emissions rate associated with operation of the electric water heater can often be lower than the emissions rate associated with burning natural gas at the second subsystem 2604. In such scenarios, the controller 2606 can operate to determine how and when to use the first subsystem 2602 and the second subsystem 2604 to make trade-offs between utility costs and carbon emissions. For example, the controller 2606 may allocate a higher portion to the first subsystem 2602 when the grid's marginal operating emissions rate is low (e.g., midday when solar energy is highly available) as compared to when the grid's marginal operating emissions rate is high (e.g., at night), in order to achieve the greatest carbon savings for each increase in electricity costs. Various such examples are possible.

Although the examples above reference carbon emissions, the teachings herein can be adapted for any type of pollution including acid gas, mercury, toxic metals, nickel, arsenic, chromium, sulfur dioxide, NOR, particulate matter, hydrofluorocarbons, etc. for example with rates of carbon emissions discussed above replaced or enhanced by rates of emissions of such other pollutant(s).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system, comprising:
a first subsystem configured to produce a resource by consuming electricity;
a second subsystem configured to produce the resource by consuming a fuel; and
a controller configured to:
determine an allocation of a predicted demand for the resource over a future time period between the first subsystem and the second subsystem based on a first carbon emissions rate associated with off-site production of the electricity and a second carbon emissions rate associated with on-site consumption of the fuel; and
control the first subsystem and the second subsystem to produce the resource in accordance with the allocation during the future time period.

2. The system of claim 1, wherein the first subsystem comprises a heat recovery chiller, the second subsystem comprises a hot water generator, and the resource is hot water.

3. The system of claim 2, further comprising a thermal energy storage system configured to store the hot water produced by the heat recovery chiller and the hot water generator.

4. The system of claim 1, wherein the controller is configured to determine the allocation by optimizing an objective function comprising:
a utility cost term accounting for purchases of the electricity and the fuel for the future time period; and
an emissions term based on the first carbon emissions rate and the second carbon emissions rate.

5. The system of claim 1, wherein the first carbon emissions rate is a marginal operating emissions rate.

6. A method for operating a first subsystem configured to produce a resource by consuming electricity and a second subsystem configured to produce the resource by consuming a fuel, the method comprising:
determining an allocation of a predicted demand for the resource over a future time period between the first subsystem and the second subsystem based on a first carbon emissions rate associated with off-site production of the electricity and a second carbon emissions rate associated with on-site consumption of the fuel; and
controlling the first subsystem and the second subsystem during the future time period to produce the resource in accordance with the allocation.

7. The method of claim 6, wherein the first subsystem comprises a heat recovery chiller, the second subsystem comprises a hot water generator, and the resource is hot water.

8. The method of claim 7, further comprising controlling a thermal energy storage system to store at least a portion of the hot water produced by the heat recovery chiller and the hot water generator.

9. The method of claim 6, wherein determining the allocation comprises optimizing an objective function comprising:
a utility cost term accounting for purchases of the electricity and the fuel for the future time period; and
an emissions term based on the first carbon emissions rate and the second carbon emissions rate.

10. The method of claim 9, further comprising weighting the emissions term relative to the utility cost term using a user-selected weight.

11. The method of claim 9, wherein the emissions term comprises a price of carbon offsets.

12. The method of claim 6, wherein the first carbon emissions rate is a marginal operating emissions rate of a utility grid.

13. The method of claim 12, further comprising predicting time-varying values of the marginal operating emissions rate for the future time period, wherein the allocation comprises allocating building loads based on the time-varying values.

14. The method of claim 6, wherein determining the allocation comprises performing an optimization subject to a constraint defined based on the first carbon emissions rate and the second carbon emissions rate.

15. A system comprising one or more processors and computer-readable media storing program instructions, that, when executed by the one or more processors, cause the one or more processors to perform operations comprising:
allocating a building load for a future time period between a first subsystem configured to produce a resource by consuming electricity and a second subsystem configured to produce the resource by consuming a fuel based on a first emissions rate associated with off-site production of the electricity and a second emissions rate associated with on-site consumption of the fuel; and
controlling the first subsystem and the second subsystem during the future time period in accordance with the allocated building load.

16. The system of claim 15, wherein the resource is hot water, the first subsystem comprises a heat recovery chiller, and the second subsystem comprises a hot water generator.

17. The system of claim 15, wherein the first emissions rate and the second emissions rate are carbon emissions rates.

18. The system of claim 15, wherein the first emissions rate is a marginal operating emissions rate of a utility grid.

19. The system of claim 18, the operations further comprising predicting time-varying values of the marginal operating emissions rate for the future time period, wherein allocating the building load is based on the time-varying values.

* * * * *